(12) United States Patent
Nishikawa et al.

(10) Patent No.: US 8,217,374 B2
(45) Date of Patent: Jul. 10, 2012

(54) PROJECTION OPTICAL SYSTEM AND PROJECTION-TYPE IMAGE DISPLAY APPARATUS

(75) Inventors: Jun Nishikawa, Tokyo (JP); Toshihiro Sunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 172 days.

(21) Appl. No.: 10/583,607

(22) PCT Filed: Oct. 21, 2005

(86) PCT No.: PCT/JP2005/019399
§ 371 (c)(1), (2), (4) Date: Jun. 20, 2006

(87) PCT Pub. No.: WO2006/043666
PCT Pub. Date: Apr. 27, 2006

(65) Prior Publication Data
US 2007/0184368 A1  Aug. 9, 2007

(30) Foreign Application Priority Data
Oct. 21, 2004 (JP) ................................ 2004-306986
Aug. 18, 2005 (JP) ................................ 2005-237856

(51) Int. Cl.
*G01G 1/00* (2006.01)

(52) U.S. Cl. ...................... 250/504 R; 359/731; 430/30

(58) Field of Classification Search ............... 250/504 R
See application file for complete search history.

(56) References Cited

U.S. PATENT DOCUMENTS
4,812,028 A 3/1989 Matsumoto
(Continued)

FOREIGN PATENT DOCUMENTS
EP 1 220 538 7/2002
(Continued)

OTHER PUBLICATIONS

Supplementary European Search Report issued from the European Patent Office on Jun. 27, 2008, in related European Patent Application No. 05795593.

(Continued)

*Primary Examiner* — Phillip A Johnston
(74) *Attorney, Agent, or Firm* — Finnegan, Henderson, Farabow, Garrett & Dunner, L.L.P.

(57) ABSTRACT

There is a need for providing a projection optical system that is appropriate for maintaining high resolution with low distortion, miniaturizing a reflector, decreasing the number of reflectors, and decreasing the depth and the bottom (or top) of a display used for a rear projection television, for example. The projection optical system according to the invention enlarges and projects images from a primary image surface existing at a reducing side to a secondary image surface existing at an enlarging side. The projection optical system has a first optical system L11 and a second optical system L12. The first optical system L11 forms an intermediate image (position II) of the primary image surface. The second optical system L12 has a concave reflector AM1 that forms the secondary image surface resulting from the intermediate image. A light beam travels from the center of the primary image surface and to the center of the secondary image surface and crosses an optical axis. The light beam is reflected on the concave reflector, crosses the optical axis again, and reaches the secondary image surface.

7 Claims, 66 Drawing Sheets

U.S. PATENT DOCUMENTS

| | | | |
|---|---|---|---|
| 5,871,266 | A | 2/1999 | Negishi et al. |
| 6,233,024 | B1 * | 5/2001 | Hiller et al. .................... 348/744 |
| 6,619,804 | B2 * | 9/2003 | Davis et al. ..................... 353/98 |
| 6,719,430 | B2 * | 4/2004 | Cotton et al. ................... 353/69 |
| 7,015,489 | B2 | 3/2006 | Singer et al. |
| 7,048,388 | B2 | 5/2006 | Takaura et al. |
| 2002/0085181 | A1 | 7/2002 | Davis et al. |
| 2004/0156117 | A1 | 8/2004 | Takaura et al. |
| 2006/0126032 | A1 | 6/2006 | Takaura et al. |

FOREIGN PATENT DOCUMENTS

| | | |
|---|---|---|
| JP | 05-080418 | 4/1993 |
| JP | 05-100312 | 4/1993 |
| JP | A 2000-208396 | 7/2000 |
| JP | 2001-255462 | 9/2001 |
| JP | A 2001-264634 | 9/2001 |
| JP | 2002-040326 | 2/2002 |
| JP | 2004-258620 | 9/2004 |
| JP | 2005-084576 | 3/2005 |
| KR | 2002-0076159 | 6/2004 |
| WO | WO 01/06295 | 1/2001 |
| WO | WO 01/51979 | 7/2001 |

OTHER PUBLICATIONS

Office Action issued from the European Patent Office on Feb. 13, 2009, in related European Patent Application No. 05 795 593 (3 pages).

Office Action mailed Dec. 9, 2011, from the Japanese Patent Office in Japanese Application No. JP 2006-543096.

Abstract of Japanese Application Publication No. JP-2004-258620.

English-language translation of First Consequent Examination Report issued by Indian Patent Office in corresponding Indian Application No. 333/DELNP/06 on Sep. 17, 2009 (2 pages).

Office Action issued May 26, 2011 in corresponding JP2006/543096.

English-language translation of JP 2000-208396 (Jul. 28, 2000).

English-language translation of JP 2001-264634 (Sep. 26, 2001).

Notice of Allowance in U.S. Appl. No. 12/424,845, mailed Jul. 29, 2011.

Office Action in U.S. Appl. No. 12/424,845, mailed Feb. 10, 2011.

* cited by examiner

| COORDINATES ON DISPLAY ELEMENT | | |
|---|---|---|
| | x | y |
| ① | 0.00 | -6.20 |
| ② | 3.36 | -6.20 |
| ③ | 6.72 | -6.20 |
| ④ | 0.00 | -8.09 |
| ⑤ | 3.36 | -8.09 |
| ⑥ | 6.72 | -8.09 |
| ⑦ | 0.00 | -9.98 |
| ⑧ | 3.36 | -9.98 |
| ⑨ | 6.72 | -9.98 |
| ⑩ | 0.00 | -11.87 |
| ⑪ | 3.36 | -11.87 |
| ⑫ | 6.72 | -11.87 |
| ⑬ | 0.00 | -13.76 |
| ⑭ | 3.36 | -13.76 |
| ⑮ | 6.72 | -13.76 |

COORDINATES ON DISPLAY ELEMENT

|  | x | y |
|---|---|---|
| ① | 0.00 | -6.20 |
| ② | 3.36 | -6.20 |
| ③ | 6.72 | -6.20 |
| ④ | 0.00 | -8.09 |
| ⑤ | 3.36 | -8.09 |
| ⑥ | 6.72 | -8.09 |
| ⑦ | 0.00 | -9.98 |
| ⑧ | 3.36 | -9.98 |
| ⑨ | 6.72 | -9.98 |
| ⑩ | 0.00 | -11.87 |
| ⑪ | 3.36 | -11.87 |
| ⑫ | 6.72 | -11.87 |
| ⑬ | 0.00 | -13.76 |
| ⑭ | 3.36 | -13.76 |
| ⑮ | 6.72 | -13.76 |

- TV DISTORTION DIAGRAM
- EVALUATION SURFACE:SCREEN

COORDINATES ON DISPLAY ELEMENT

| | x | y |
|---|---|---|
| ① | 0.00 | -6.20 |
| ② | 3.36 | -6.20 |
| ③ | 6.72 | -6.20 |
| ④ | 0.00 | -8.09 |
| ⑤ | 3.36 | -8.09 |
| ⑥ | 6.72 | -8.09 |
| ⑦ | 0.00 | -9.98 |
| ⑧ | 3.36 | -9.98 |
| ⑨ | 6.72 | -9.98 |
| ⑩ | 0.00 | -11.87 |
| ⑪ | 3.36 | -11.87 |
| ⑫ | 6.72 | -11.87 |
| ⑬ | 0.00 | -13.76 |
| ⑭ | 3.36 | -13.76 |
| ⑮ | 6.72 | -13.76 |

| COORDINATES ON DISPLAY ELEMENT | | |
|---|---|---|
| | x | y |
| ① | 0.00 | -7.55 |
| ② | 3.87 | -7.55 |
| ③ | 7.75 | -7.55 |
| ④ | 0.00 | -9.73 |
| ⑤ | 3.87 | -9.73 |
| ⑥ | 7.75 | -9.73 |
| ⑦ | 0.00 | -11.91 |
| ⑧ | 3.87 | -11.91 |
| ⑨ | 7.75 | -11.91 |
| ⑩ | 0.00 | -14.08 |
| ⑪ | 3.87 | -14.08 |
| ⑫ | 7.75 | -14.08 |
| ⑬ | 0.00 | -16.26 |
| ⑭ | 3.87 | -16.26 |
| ⑮ | 7.75 | -16.26 |

| COORDINATES ON DISPLAY ELEMENT | | |
|---|---|---|
| | x | y |
| ① | 0.00 | -6.20 |
| ② | 3.36 | -6.20 |
| ③ | 6.72 | -6.20 |
| ④ | 0.00 | -8.09 |
| ⑤ | 3.36 | -8.09 |
| ⑥ | 6.72 | -8.09 |
| ⑦ | 0.00 | -9.98 |
| ⑧ | 3.36 | -9.98 |
| ⑨ | 6.72 | -9.98 |
| ⑩ | 0.00 | -11.87 |
| ⑪ | 3.36 | -11.87 |
| ⑫ | 6.72 | -11.87 |
| ⑬ | 0.00 | -13.76 |
| ⑭ | 3.36 | -13.76 |
| ⑮ | 6.72 | -13.76 |

| COORDINATES ON DISPLAY ELEMENT | | |
|---|---|---|
| | x | y |
| ① | 0.00 | -5.81 |
| ② | 3.38 | -5.81 |
| ③ | 6.75 | -5.81 |
| ④ | 0.00 | -7.71 |
| ⑤ | 3.38 | -7.71 |
| ⑥ | 6.75 | -7.71 |
| ⑦ | 0.00 | -9.61 |
| ⑧ | 3.38 | -9.61 |
| ⑨ | 6.75 | -9.61 |
| ⑩ | 0.00 | -11.87 |
| ⑪ | 3.38 | -11.51 |
| ⑫ | 6.75 | -11.51 |
| ⑬ | 0.00 | -13.41 |
| ⑭ | 3.38 | -13.41 |
| ⑮ | 6.75 | -13.41 |

- TV DISTORTION DIAGRAM
- EVALUATION SURFACE:SCREEN

COORDINATES ON DISPLAY ELEMENT

|  | x | y |
|---|---|---|
| ① | 0.00 | -6.20 |
| ② | 3.36 | -6.20 |
| ③ | 6.72 | -6.20 |
| ④ | 0.00 | -8.09 |
| ⑤ | 3.36 | -8.09 |
| ⑥ | 6.72 | -8.09 |
| ⑦ | 0.00 | -9.98 |
| ⑧ | 3.36 | -9.98 |
| ⑨ | 6.72 | -9.98 |
| ⑩ | 0.00 | -11.87 |
| ⑪ | 3.36 | -11.87 |
| ⑫ | 6.72 | -11.87 |
| ⑬ | 0.00 | -13.76 |
| ⑭ | 3.36 | -13.76 |
| ⑮ | 6.72 | -13.76 |

| COORDINATES ON DISPLAY ELEMENT | | |
|---|---|---|
| | x | y |
| ① | 0.00 | -0.77 |
| ② | 3.87 | -0.77 |
| ③ | 7.75 | -0.77 |
| ④ | 0.00 | -2.95 |
| ⑤ | 3.87 | -2.95 |
| ⑥ | 7.75 | -2.95 |
| ⑦ | 0.00 | -5.13 |
| ⑧ | 3.87 | -5.13 |
| ⑨ | 7.75 | -5.13 |
| ⑩ | 0.00 | -7.30 |
| ⑪ | 3.87 | -7.30 |
| ⑫ | 7.75 | -7.30 |
| ⑬ | 0.00 | -9.48 |
| ⑭ | 3.87 | -9.48 |
| ⑮ | 7.75 | -9.48 |

COORDINATES ON DISPLAY ELEMENT

| | x | y |
|---|---|---|
| ① | 0.00 | -6.20 |
| ② | 3.86 | -6.20 |
| ③ | 6.72 | -6.20 |
| ④ | 0.00 | -8.09 |
| ⑤ | 3.86 | -8.09 |
| ⑥ | 6.72 | -8.09 |
| ⑦ | 0.00 | -9.98 |
| ⑧ | 3.86 | -9.98 |
| ⑨ | 6.72 | -9.98 |
| ⑩ | 0.00 | -11.87 |
| ⑪ | 3.86 | -11.87 |
| ⑫ | 6.72 | -11.87 |
| ⑬ | 0.00 | -13.76 |
| ⑭ | 3.86 | -13.76 |
| ⑮ | 6.72 | -13.76 |

SPOT DIAGRAM (WHITE)
WITH 1.45mm SCALE (EQUIVALENT TO 7μm×2 ON DISPLAY ELEMENT)
- EVALUATION SURFACE:SCREEN
- THE xy COORDINATES CORRESPOND TO THOSE ON THE DISPLAY ELEMENT COORDINATE (x,y)=(0,0) SIGNIFIES THE OPTICAL AXIS
- WAVELENGTHS USED 656.3nm, 620.0nm, 587.6nm, 546.1nm, 460.0nm, 435.8nm

FIELD POSITION
1.00, 1.00
0.128,-0.26 DG ⑮

0.50, 1.00
.0301,-0.12 DG ⑭

0.00, 1.00
0.000,-.080 DG ⑬

1.00, 0.86
.0330,-.058 DG ⑫

0.50, 0.86
-.013,.0466 DG ⑪

0.00, 0.86
0.000,.0798 DG ⑩

1.00, 0.73
-.039,.0576 DG ⑨

0.50, 0.73
-.046,0.138 DG ⑧

0.00, 0.73
0.000,0.163 DG ⑦

1.00, 0.59
-.093,0.112 DG ⑥

0.50, 0.59
-.072,0.173 DG ⑤

0.00, 0.59
0.000,0.192 DG ④

1.00, 0.45
-0.13,0.123 DG ③

0.50, 0.45
-.091,0.167 DG ②

0.00, 0.45
0.000,0.182 DG ①

1.45 MM

DEFOCUSING  0.00000

PROJECTION OPTICAL SYSTEM AND PROJECTION-TYPE IMAGE DISPLAY APPARATUS

TECHNICAL FIELD

The present invention relates to a new projection optical system and a new projection-type image display apparatus. More specifically, the invention relates to a technology that maintains high resolution with low distortion, provides a small depth, and decreases the bottom (or top) of a screen.

BACKGROUND ART

Recently, there is an increasing demand for rear projection televisions. The rear projection television has the feature of flat television represented by LCD (Liquid Crystal Display) direct-view television and PDP (Plasma Display Panel). Compared to these televisions, the rear projection television provides a system that enlarges and projects an image display element as large as approximately one inch. Consequently, the rear projection television is available at low costs. The rear projection television is relatively easily compliant with demands for high image quality of full HD (high definition) signal levels represented by BS (Broadcasting Satellite) digital broadcasting and terrestrial digital broadcasting.

On the other hand, the rear projection television is mounted with a light source, an illumination optical system, and a projection optical system. The rear projection television uses a large-diameter rear mirror to project images onto a screen. FIG. 62 shows a well-known projection method so that an optical axis a travels through the center of an image display element b and a screen c. According to such method, it is principally very difficult to decrease a depth d and a size e of the bottom of a display at the same time.

In addition, there is available an optical system that obliquely projects images onto the screen (hereafter referred to as oblique projection) so as to enlarge projected images and thin the rear projection television (to decrease the depth).

For example, JP-A No. 100312/1993 proposes the projection optical system that uses a wide-angle lens having a large field angle. The projection optical system is provided with an image display element and a screen shifted from the projection optical system's optical axis and uses the end of the field angle for oblique projection.

As proposed in JP-A No. 80418/1993, the first projection optical system intermediately forms image light based on a light bulb. The second projection optical system enlarges and projects the image on a screen. Optical axes of the respective projection optical systems are appropriately tilted for oblique projection. A recently proposed projection optical system uses a reflector for oblique projection so as to prevent chromatic aberration from occurring in accordance with tendency toward wide angles.

The projection optical system shown in domestic re-publication of PCT international publication for patent applications WO01/006295 mainly uses a refracting optical system g and an optical system composed of a convex reflector f to implement oblique projection. FIG. 63 outlines the optical system shown in domestic re-publication of PCT international publication for patent applications WO01/006295.

JP-A No. 40326/2002 discloses the projection optical system having no chromatic aberration using four reflectors i (concave), j (convex), k (convex), and l (convex) arranged in order from an image display panel h (see FIG. 64).

The optical systems shown in these patent gazettes are rotationally symmetric about the optical axis and perform oblique projection using part of the super-wide angle optical system.

JP-A No. 255462/2001 proposes the oblique projection optical system using an off-axial optical system. The projection optical system uses the off-axial optical system to correct trapezoidal distortion. In addition, the projection optical system forms an intermediate image between multiple reflectors m and reflector n to limit the reflector size (see FIG. 65).

As shown in domestic re-publication of PCT international publication for patent applications WO01/006295, the projection optical system is composed of combination of the convex reflector f and the refracting optical system g. Compared to a configuration using only the refracting optical system, the proposed projection optical system facilitates removal of the chromatic aberration and enlargement of angles. On the contrary, one reflector is used for most part of the divergence. The refractive power needs to be decreased to some extent so as to appropriately correct the distortion and the image surface aberration. The projection optical system inevitably tends to enlarge the convex reflector f and increase the sag amount. This not only makes the manufacture of convex reflectors difficult, but also heightens a display bottom portion (see reference symbol e in FIG. 62). In addition, applying this projection optical system to a rear projection television increases the depth (see reference symbol d in FIG. 62).

The projection optical system shown in JP-A No. 40326/2002 has no refracting optical system and principally causes no chromatic aberration. Since no absorption occurs due to a lens, it is possible to provide an optical system capable of high brightness. Since only reflectors are used to configure the system, however, the system tends to be very susceptive to the surface accuracy and the assembly accuracy of each reflector and increase manufacturing costs. Since multiple reflectors i through l are vertically arranged, the bottom of the display (see reference symbol e in FIG. 62) heightens. Increasing a projection angle for a lower profile enlarges the reflectors, especially the last reflector l, making the manufacture of reflectors difficult. Applying this projection optical system to a rear projection television further enlarges the bottom of the display.

The projection optical system described in JP-A No. 255462/2001 uses an intermediate imaging surface and has an advantage of widening the angle and decreasing the reflector. On the contrary, the reflector is decentered to cause decentering aberration. The remaining decentered reflectors are used to correct the decentering aberration. At least three reflectors are needed. Applying this projection optical system to a rear projection television still leaves a difficulty in miniaturizing the bottom of the display. Further, the reflectors are not rotationally symmetric, but are configured to form a freely curved surface. The projection optical system tends to be very susceptive to the surface accuracy and the assembly accuracy, make the manufacture difficult, and increase manufacturing costs.

The present invention has been made in consideration of the foregoing. It is therefore an object of the present invention to provide a projection optical system that is appropriate for maintaining high resolution with low distortion, miniaturizing a reflector, decreasing the number of reflectors, and decreasing the depth and the bottom (or top) of a display used for a rear projection television, for example.

DISCLOSURE OF THE INVENTION

To solve the above-mentioned problem, a projection optical system according to the invention includes: a first optical system that forms an intermediate image of a primary image surface existing at a reducing side; and a second optical system having a concave reflector that forms a secondary image surface existing at an enlarging side according to the intermediate image. A light beam travels from the center of the primary image surface to the center of the secondary image surface, crosses an optical axis of the first optical system, reflects on the concave reflector, crosses the optical axis again, and reaches the secondary image surface.

To solve the above-mentioned problem, a projection-type image display apparatus according to the invention includes: a light source; modulation means for modulating and outputting light radiated from the light source based on a video signal; and a projection optical system for enlarged projection from a primary image surface toward the modulation means to a secondary image surface toward a screen. The projection optical system includes: a first optical system that forms an intermediate image of the primary image surface; and a second optical system having a concave reflector that forms the secondary image surface according to the intermediate image. A light beam travels from the center of the primary image surface to the center of the secondary image surface, crosses an optical axis of the first optical system, reflects on the concave reflector, crosses the optical axis again, and reaches the secondary image surface.

According to the invention, the light beam travels from the center of the primary image surface to the center of the secondary image surface and crosses the optical axis of the first optical system. The light beam is then reflected on the concave reflector, crosses the optical axis again, and reaches the secondary image surface. Following this light path, for example, the second optical system upward outputs light that is formed on the secondary image surface from the approximately horizontally disposed first optical system. The second optical system only needs to converge a slightly spreading light flux from a point on the intermediate image for the first optical system onto a point on the secondary image surface. Small optical parts can be used to realize the second optical system. Let us consider that the projection optical system is used to construct a projection-type image display apparatus. In this case, for example, the second optical system may upward (or downward) output light that is formed on the secondary image surface from the approximately horizontally disposed first optical system. In this manner, it is possible to greatly decrease a space needed for the optical system that is disposed at the bottom (or top) of the screen.

A projection optical system according to the invention is constructed for enlarged projection from a primary image surface existing at a reducing side to a secondary image surface existing at an enlarging side and includes: a first optical system that forms an intermediate image of the primary image surface; and a second optical system having a concave reflector that forms the secondary image surface according to the intermediate image. A light beam travels from the center of the primary image surface to the center of the secondary image surface, crosses an optical axis of the first optical system, reflects on the concave reflector, crosses the optical axis again, and reaches the secondary image surface.

A projection-type image display apparatus according to the invention includes: a light source; modulation means for modulating and outputting light radiated from the light source based on a video signal; and a projection optical system for enlarged projection from a primary image surface toward the modulation means to a secondary image surface toward a screen. The projection optical system includes: a first optical system that forms an intermediate image of the primary image surface; and a second optical system having a concave reflector that forms the secondary image surface according to the intermediate image. A light beam travels from the center of the primary image surface to the center of the secondary image surface, crosses an optical axis of the first optical system, reflects on the concave reflector, crosses the optical axis again, and reaches the secondary image surface.

In the projection optical system according to the invention, the light beam travels from the center of the primary image surface to the center of the secondary image surface and crosses the optical axis of the first optical system. The light beam is then reflected on the concave reflector, crosses the optical axis again, and reaches the secondary image surface. Following this light path, the first optical system once forms an intermediate imaging surface. The concave reflector is disposed after the intermediate imaging surface to form an image on the secondary image surface again. There is no need for a large concave reflector. It is possible to provide a large display that is appropriately corrected for aberration and exhibits sufficient optical performance.

The projection-type image display apparatus according to the invention uses the projection optical system to project an image formed by the modulation means onto the screen. Accordingly, the projection-type image display apparatus can not only have a low profile and miniaturize the bottom (or top) of the screen, but also display an enlarged image that is appropriately corrected for aberration and exhibits sufficient optical performance.

BEST MODE FOR CARRYING OUT THE INVENTION

Figure 7:
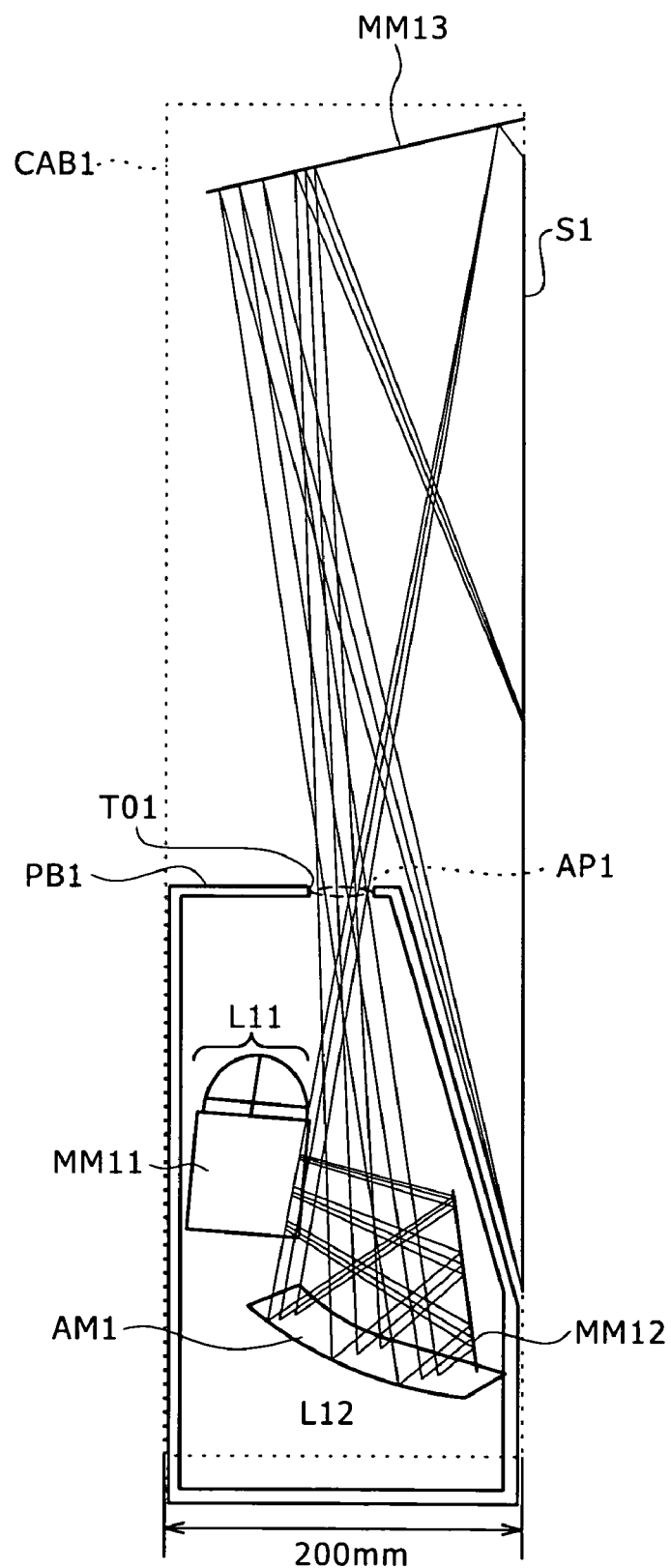
FIG. 7 is a side view.
Figure 8:
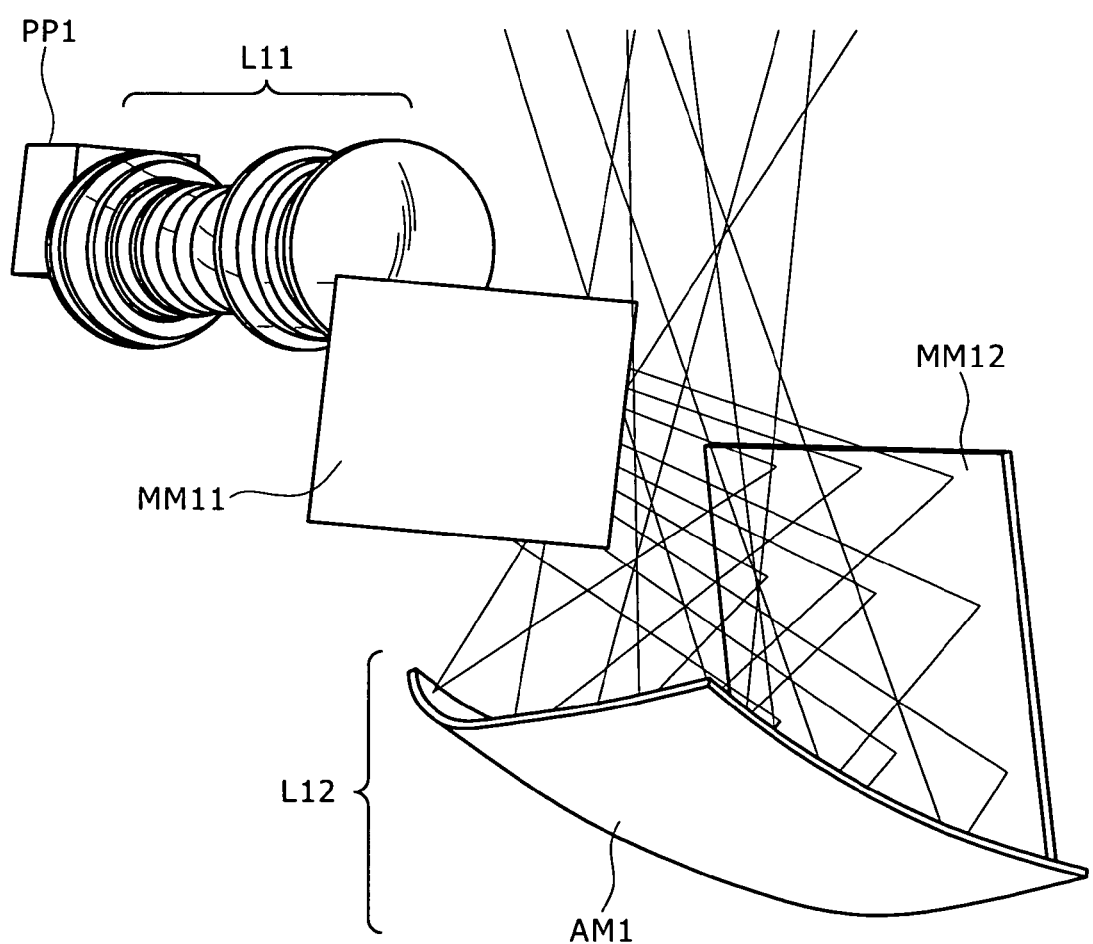
FIG. 8 is an enlarged perspective view showing the projection optical system.
Figure 19:
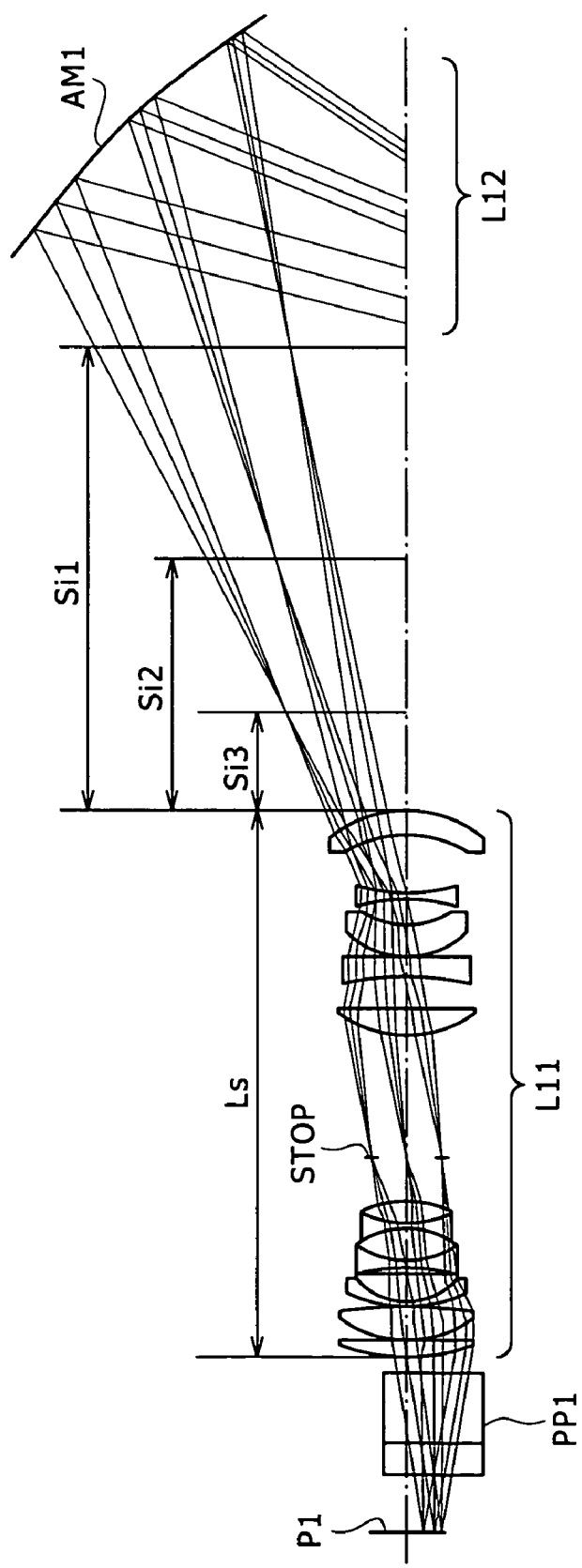
FIG. 19 shows correspondence between conditional equation (1) and associated portions in the projection optical system according to the first embodiment.
Figure 21:
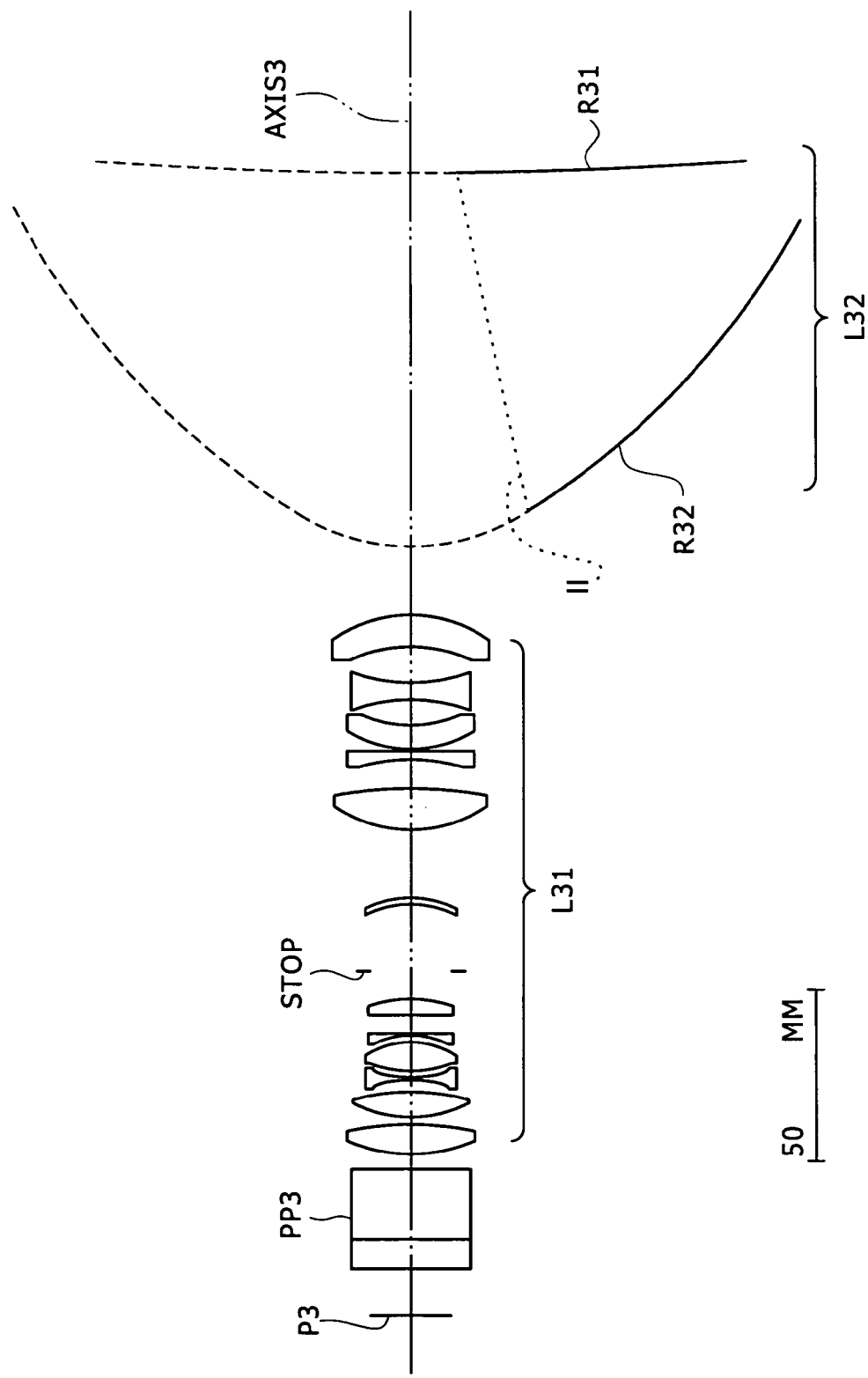
FIG. 21 is an enlarged view of the projection optical system.
Figure 61:
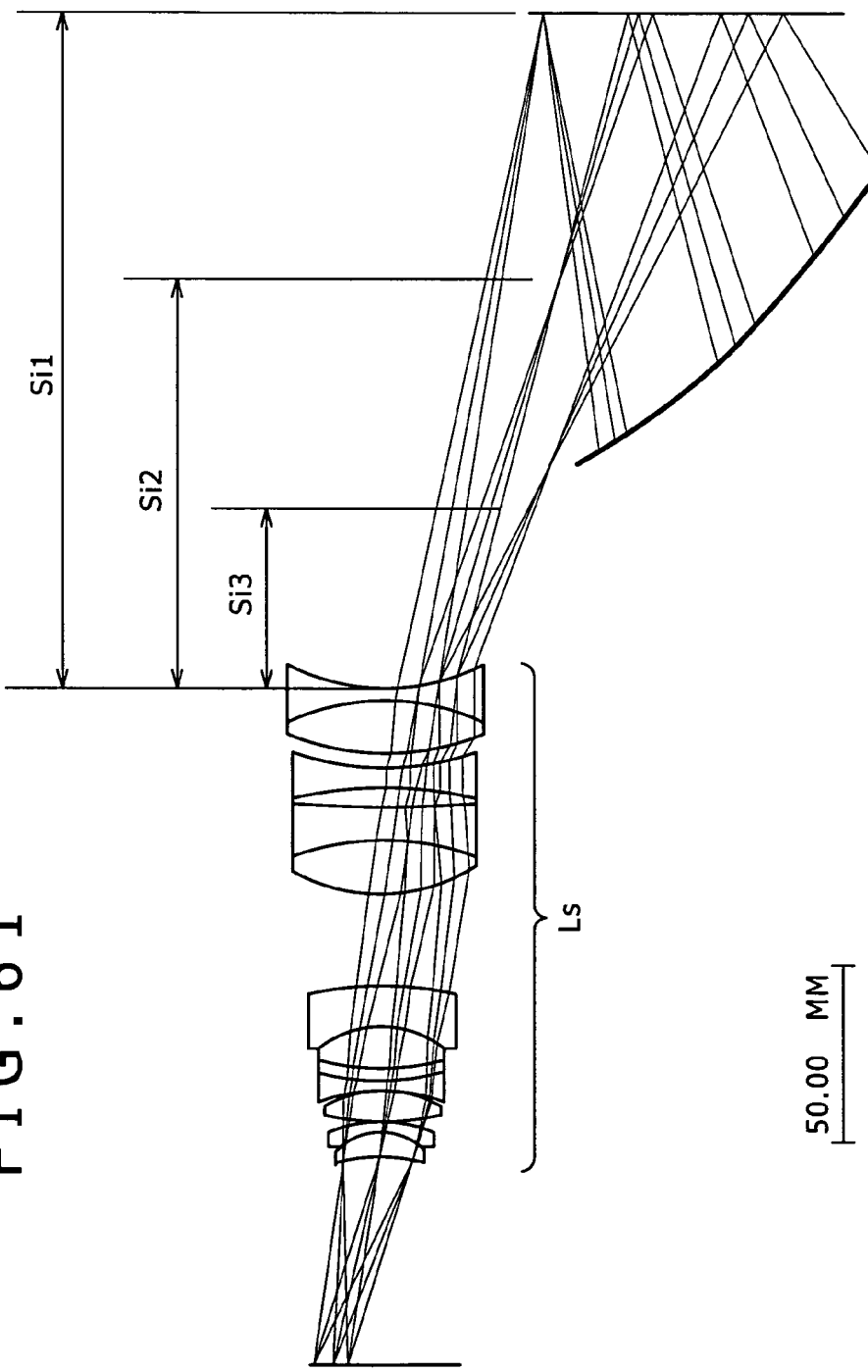
FIG. 61 shows correspondence between conditional equation (1) and associated portions in the projection optical system according to the fourth embodiment.
Figure 62:
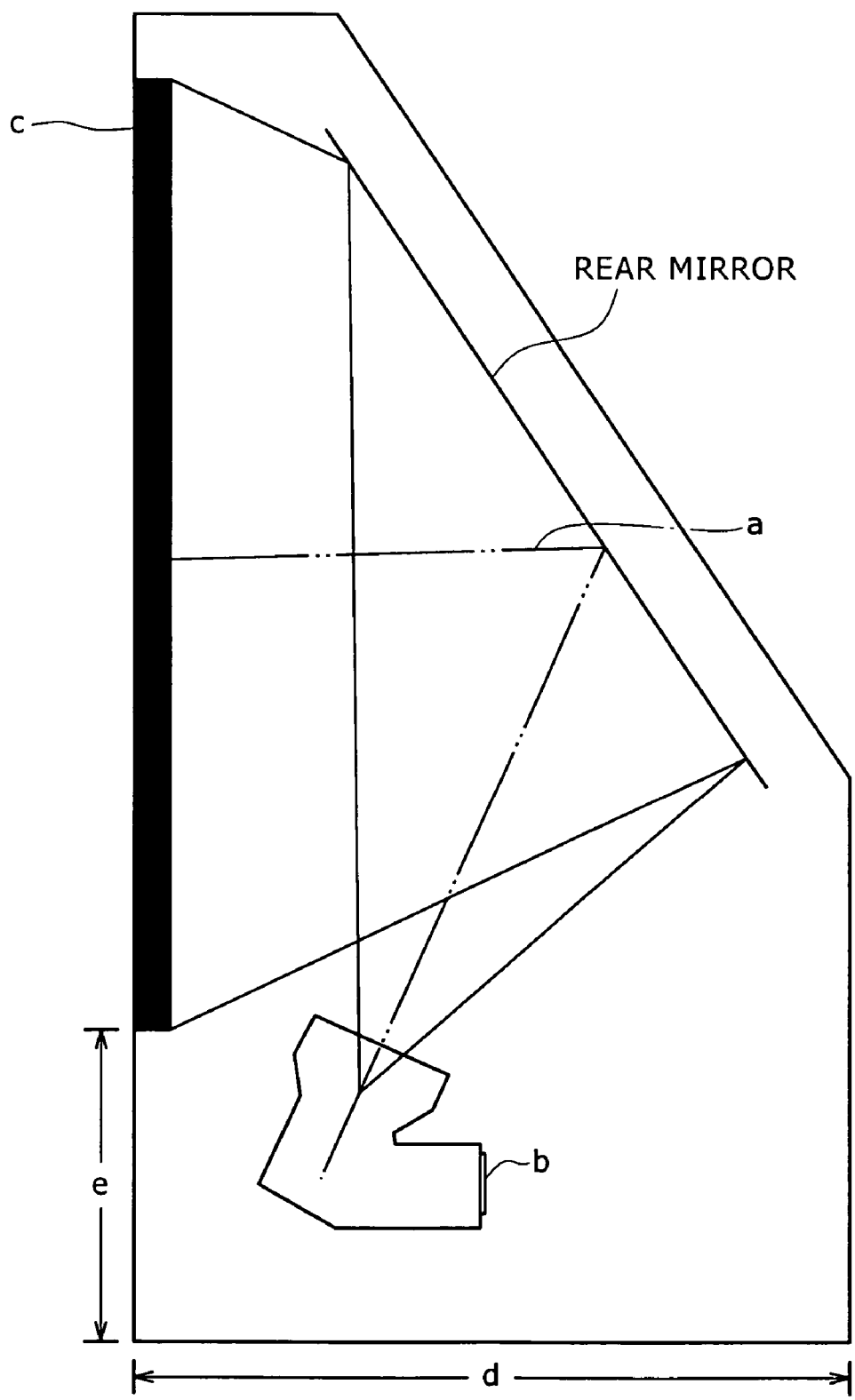
FIG. 62 outlines the general configuration of a well-known rear projection television.
Figure 63:
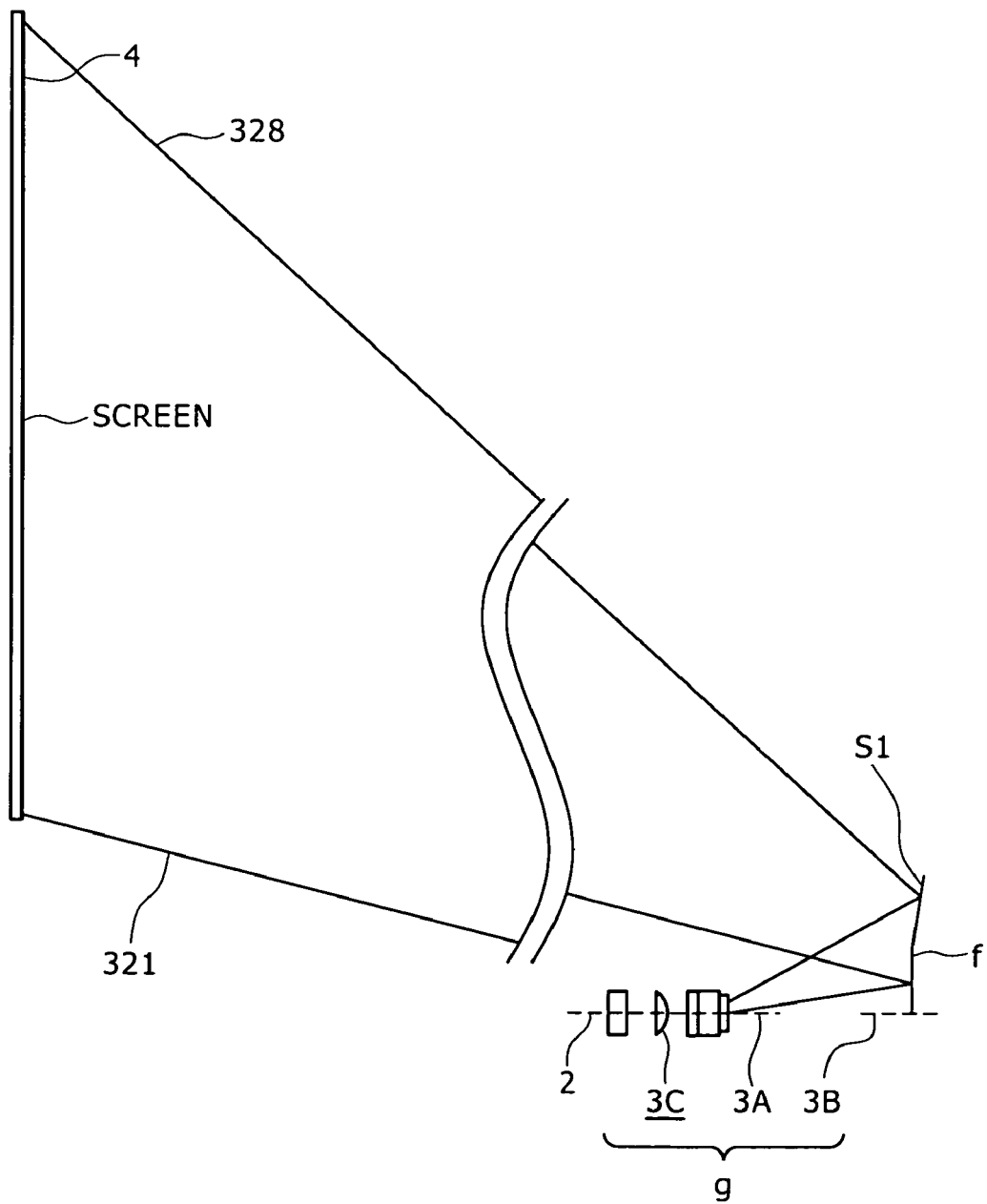
FIG. 63 outlines the projection optical system shown in domestic re-publication of PCT international publication for patent applications WO01/006295.
Figure 64:
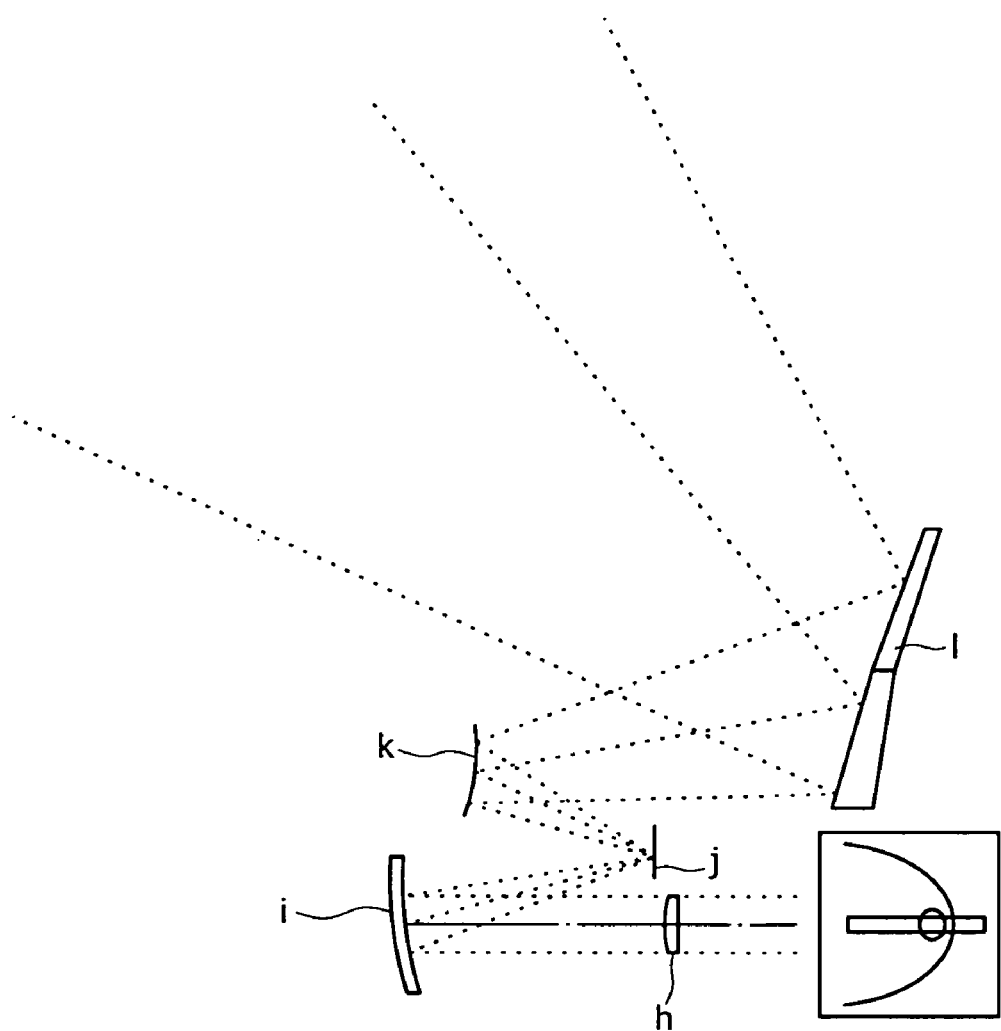
FIG. 64 outlines the projection optical system shown in JP-A No. 40326/2002.
Figure 65:
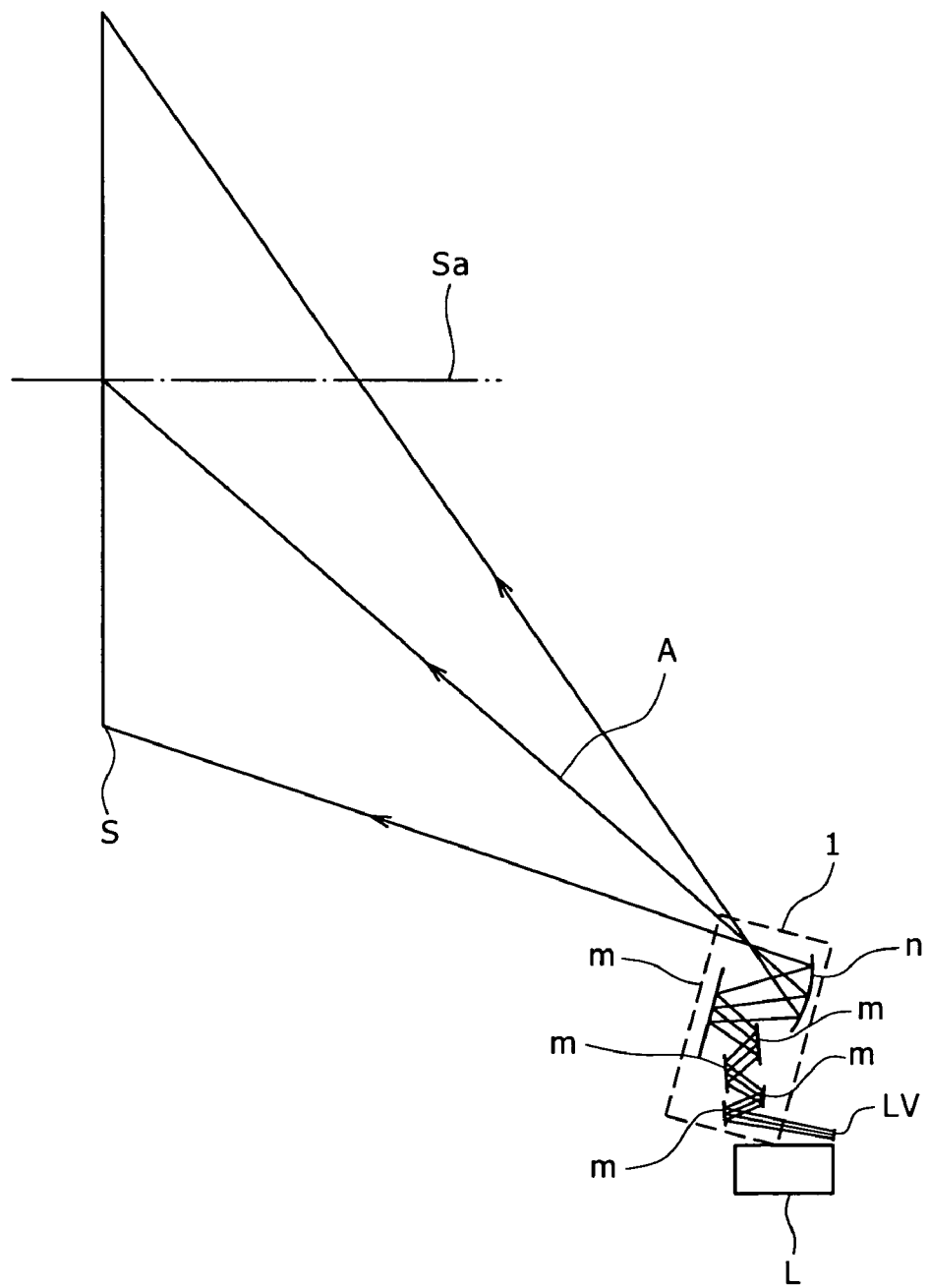
FIG. 65 outlines the projection optical system shown in JP-A No. 255462/2001.

The following describes the best mode for carrying out the projection optical system and the projection-type image display apparatus according to the invention with reference to the accompanying drawings (see FIGS. 19, 21, and 61 for the projection optical system and FIGS. 7 and 8 for the projection-type image display apparatus).

The projection optical system according to the invention enlarges and projects images from a primary image surface existing at a reducing side to a secondary image surface existing at an enlarging side. The projection optical system has a first optical system and a second optical system. The first optical system has a concave reflector that forms an intermediate image of the primary image surface. The second optical system forms the secondary image surface resulting from the intermediate image. A light beam travels from the center of the primary image surface to the center of the secondary image surface and crosses an optical axis. The light beam is reflected on the concave reflector, crosses the optical axis again, and reaches the secondary image surface. To summarize the image formation, the first optical system forms an intermediate image of the primary image surface. The concave reflector then converges the image to form a pupil that is formed as the secondary image surface. The first optical system generates an intermediate image at a low magnification.

The second optical system enlarges the intermediate image and forms it as the secondary image surface at a specified magnification.

The optical system described in domestic re-publication of PCT international publication for patent applications WO01/006295 provides the convex reflector with an effect of enlarging images. In this case, decreasing the convex reflector's curvature vignettes the light beam. The use of only one convex reflector cannot increase the enlargement factor. Increasing the convex reflector's curvature makes the aberration correction difficult and disables the sufficient optical performance from being obtained. To avoid this problem, multiple convex reflectors may be used to distribute the power and decrease the curvature of each convex reflector. However, a space large enough to dispose the multiple convex reflectors further increases the optical system size.

When a concave reflector is used, by contrast, decreasing the curvature hardly vignettes a light beam. The convex reflector or the concave reflector widens the field angle as follows depending on whether they are positioned before or after the pupil.

(A) Between the pupil position and an image formation position (secondary image surface), the convex reflector widens the field angle.

(B) Between an image formation position (intermediate image) and the pupil position, the concave reflector widens the field angle.

Even when the concave reflector is used, however, there may be many optical surfaces between the pupil position and the secondary image surface. In such case, the optical surfaces must receive the light beam widened by the concave reflector. These optical surfaces enlarge the optical system. For this reason, the concave reflector needs to be placed to the side of the secondary image surface. Accordingly, the projection optical system according to the invention uses a first optical system to once generate an intermediate image. The concave reflector is subsequently placed to form the image as the secondary image surface. A concave reflecting mirror is appropriately positioned so as to form the pupil immediately after the concave reflector. In this manner, the concave reflector is prevented from being enlarged.

In the projection optical system according to the invention, it is preferable to construct the first and second optical systems whose surfaces are rotationally symmetric about a common optical axis. Each constructive surface can be formed easily compared to a freely curved surface or an off-axial surface. It is possible to reduce manufacturing costs and increase the surface accuracy of each constructive surface. As a result, the excellent optical performance is easily available.

When only a single-sided concave reflector is used to construct the second optical system, it is possible to decrease the number of components and further save the space and costs. A concave or convex reflector can be placed before and after the concave reflector so as to further improve the aberration correction.

The first optical system is configured to form an intermediate image toward the primary image surface rather than toward the concave reflector of the second optical system. In this manner, it is possible to prevent the concave reflector from being enlarged and form a large secondary image surface that is appropriately corrected for aberration and exhibits sufficient optical performance. When the first optical system forms an intermediate image, particular attention needs to be paid to a tendency to increase a distance between the primary image surface and the intermediate image. Increasing this distance also enlarges the optical system. It is necessary to decrease the distance between the first optical system and the intermediate image. As a target, it is desirable to satisfy conditional equation (1) below:

$$Si/Ls < 2 \quad (1)$$

where Ls is the length of the first optical system, and Si is the distance between the first optical system and the intermediate image.

When the left-hand side of the conditional equation (1) is greater than or equal to 2, the distance between the primary image surface and the second optical system becomes long. The optical system remains large even when an intermediate plane mirror is used to shorten the distance.

The projection optical system according to the invention constructs a pupil between the concave reflector and the secondary image surface to efficiently guide a light path. For this purpose, conditional equation (2) below must be satisfied:

$$S12 > |R|/2 \quad (2)$$

where $|R|/2$ is the focal distance of the concave surface, and S12 is the distance between the last surface of the first optical system and the concave reflector along the optical axis.

When the optical system has a reflector on the concave reflector's primary or secondary image surface, conditional equation (3) below must be satisfied:

$$SR12 > |R|/2 \quad (3)$$

where SR12 is the distance between the concave reflector and the preceding or succeeding reflector along the optical axis.

When the projection optical system according to the invention is disposed under a screen that forms the secondary image surface, a light beam close to the optical axis reaches the bottom of the screen and a light beam distant from the optical axis reaches the top thereof. That is, a light beam close to the optical axis causes a nearby image formation position. A light beam distant from the optical axis causes a far image formation position. In order to form an image on the screen without curving the input signal, the system needs to be configured so as to decrease the concave reflector's paraxial curvature in accordance with separation from the optical axis. That is, it is necessary to provide a region satisfying conic constant $K \leq -1$. It is especially desirable to be approximate to a paraboloidal surface ($K = -1$) or a hyperbolic curve ($K < -1$).

It is effective for the projection optical system according to the invention to use a rotationally symmetric and aspheric surface. In particular, the image surface curvature can be freely controlled. This makes it possible to decrease the number of lenses and reduce an F value (the number of apertures). The low-cost and high-quality projection optical system can be realized.

The rotationally symmetric and aspheric shape is defined by equation 1 as follows.

$$Z = (h^2/r)/\{1 + \sqrt{(1-(1+K)h^2/r^2)}\} + A4 \cdot h^4 + A6 \cdot h^6 + A8 \cdot h^8 + \ldots \quad \text{[Equation 1]}$$

where
Z: Sag amount of the aspheric surface
h: Vertical height against the optical axis
r: Paraxial curvature radius
K: conic constant, and
Ai: Aspheric coefficient of degree i.

It may be effective for the projection optical system according to the invention to use a rotationally symmetric and aspheric surface containing an aspheric coefficient of odd-numbered degree. In this case, equation 2 below defines the shape of the rotationally symmetric and aspheric surface.

$$Z = (h^2/r)/\{1 + \sqrt{(1-(1+K)h^2/r^2)}\} + $$
$$A1 \cdot h + A2 \cdot h^2 + A3 \cdot h^3 + A4 \cdot h^4 + A5 \cdot h^5 + $$
$$A6 \cdot h^6 + A7 \cdot h^7 + A8 \cdot h^8 + A9 \cdot h^9 + \cdots$$

[Equation 2]

As shown in equation 2 above, the aberration of even-numbered degree occurs due to the term of odd-numbered degree, i.e., distance h from the optical axis. When there is the term of $h^3$, for example, the two-dimensional image surface curvature or distortion aberration occurs. When the concave reflector is provided with an appropriate aspheric coefficient, the distortion aberration can be more appropriately controlled than using the aspheric surface according to equation 1 above.

The projection-type image display apparatus according to the invention includes a light source, modulation means, and a projection optical system. The modulation means modulates and outputs the light radiated from the light source based on a video signal. The projection optical system enlarges and projects images from the primary image surface at the modulation means side to the secondary image surface at the screen side. The projection optical system includes first and second optical systems. The first optical system forms an intermediate image of the primary image surface. The second optical system has a concave reflector that forms the secondary image surface composed of the intermediate image. A light beam travels from the center of the primary image surface to the center of the secondary image surface, and crosses the optical axis of the first optical system. The light beam is further reflected on the concave reflector, crosses the optical axis again, and reaches the secondary image surface.

The projection-type image display apparatus according to the invention uses the projection optical system according to the invention to project an image formed by the modulation means on the screen. The projection-type image display apparatus according to the invention can not only have a low profile and miniaturize the bottom (or top) of the screen, but also display an enlarged image that is appropriately corrected for aberration and exhibits sufficient optical performance.

Let us consider using a transmissive screen. The screen is arranged at the front of a cabinet. The cabinet includes the light source, the modulation means, and the projection optical system. The projection optical system enlarges and projects images onto the transmissive screen from the rear. In this manner, it is possible to construct a rear projection television showing an external view similar to that of a flat television using a low-profile liquid crystal panel or PDP.

Further, let us suppose that the projection optical system is provided at the bottom of the cabinet. On the top of the cabinet, there may be provided a plane mirror that reflects light output from the projection optical system and deflects the light so as to reach the transmissive screen. In this manner, the projection-type image display apparatus can be further slimmed.

When the second optical system forms a pupil for the intermediate image onto the secondary image surface, the pupil may be formed outside a light flux traveling from the plane mirror to the transmissive screen surface. This increases the freedom of directing the light path in the cabinet. In addition, it is possible to provide a shielding unit having an aperture at the pupil position where the light flux is most stopped down between the second optical system and the secondary image surface. This makes it easy to protect the projection optical system against dust and outside light.

The light beam travels from the center of the primary image surface to the center of the secondary image surface and crosses the optical axis within a vertical plane. It may be preferable to provide reflection means that reflects the light beam between the first and second optical systems and deflects the light beam within a horizontal plane. Provision of the reflection means makes it possible to dispose the optical axis of an optical member constructing the first optical system parallel to the screen surface. The projection-type image display apparatus according to the invention can be further miniaturized along the depth direction, i.e., can be further slimmed.

Figure 66:
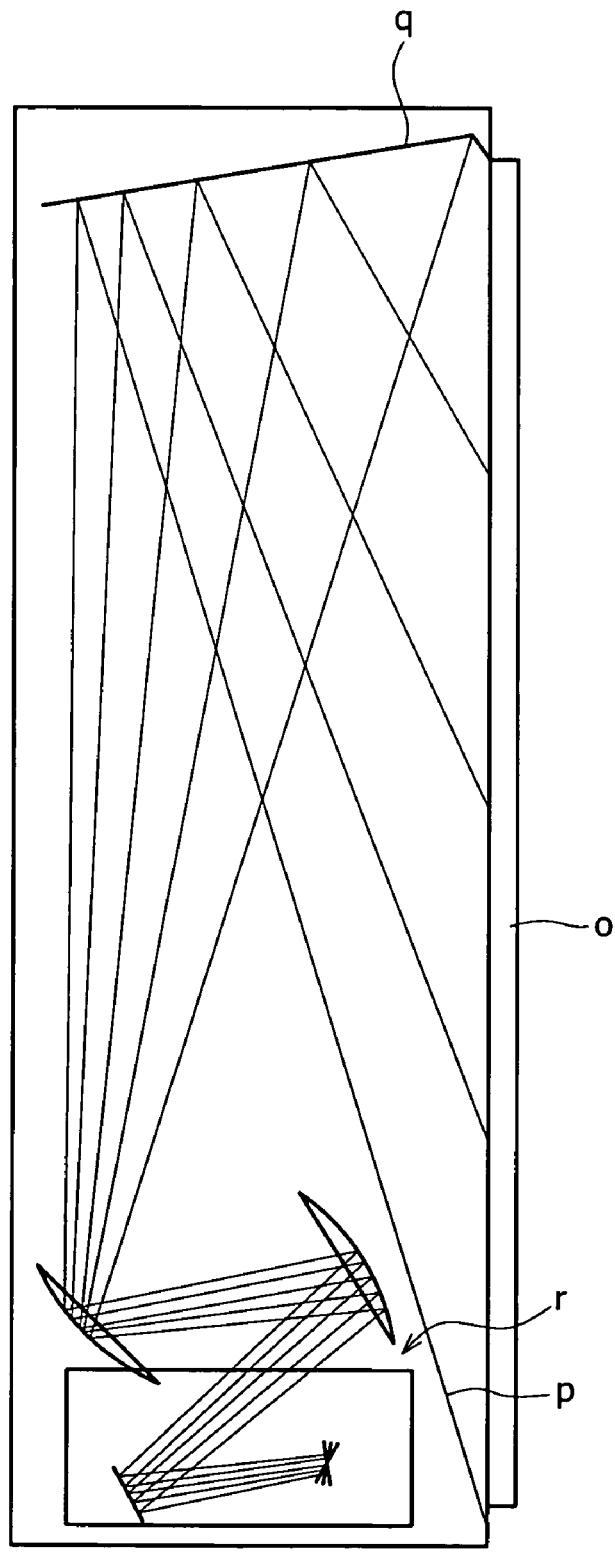
FIG. 66 outlines the projection optical system shown in JP-A No. 84576/2005.

According to the projection-type image display apparatus described in JP-A No. 84576/2005 (see FIG. 66), plane mirror q is disposed so that outmost light p almost parallel reflects against screen o. In addition, projection optical system r is disposed opposite plane mirror q (e.g., at the bottom when plane mirror q is positioned to the top). In this manner, the depth is decreased (slimmed) and the bottom (or top) of screen o is reduced.

According to the projection-type image display apparatus described in JP-A No. 84576/2005, however, plane mirror q is disposed so that the outmost light beam almost parallel reflects against screen o. In addition, projection optical system r is disposed opposite plane mirror q. In this manner, the depth is slimmed and the bottom (or top) of the display is reduced. When an attempt is made to further slim the projection-type image display apparatus by keeping the bottom (or top) of the display small, it is necessary to slightly enlarge an angle of outmost light beam p against screen o. The projection optical system as shown in JP-A No. 84576/2005 uses many curved-surface reflectors and therefore decreases the freedom of bending the light path. The depth of the projection optical system cannot be decreased. It is difficult to further slim the projection optical system.

The projection-type image display apparatus according to the invention is provided with at least one plane reflector for directing the light path after reflected on the concave reflector. When the plane reflector is positioned immediately before the screen, light beams are reflected from the plane reflector to the screen. Of these light beams, the outmost light beam passes through a position most distant from the screen. Let us assume that the outmost light beam forms angle θ against the screen. The projection-type image display apparatus according to the invention can be further slimmed by satisfying conditional equation (4) 0.6>tan θ>0.05.

The following describes embodiments and numeric value examples of the projection optical system and the projection-type image display apparatus according to the invention in further detail with reference to the accompanying drawings and tables.

FIRST EMBODIMENT

Figure 1:
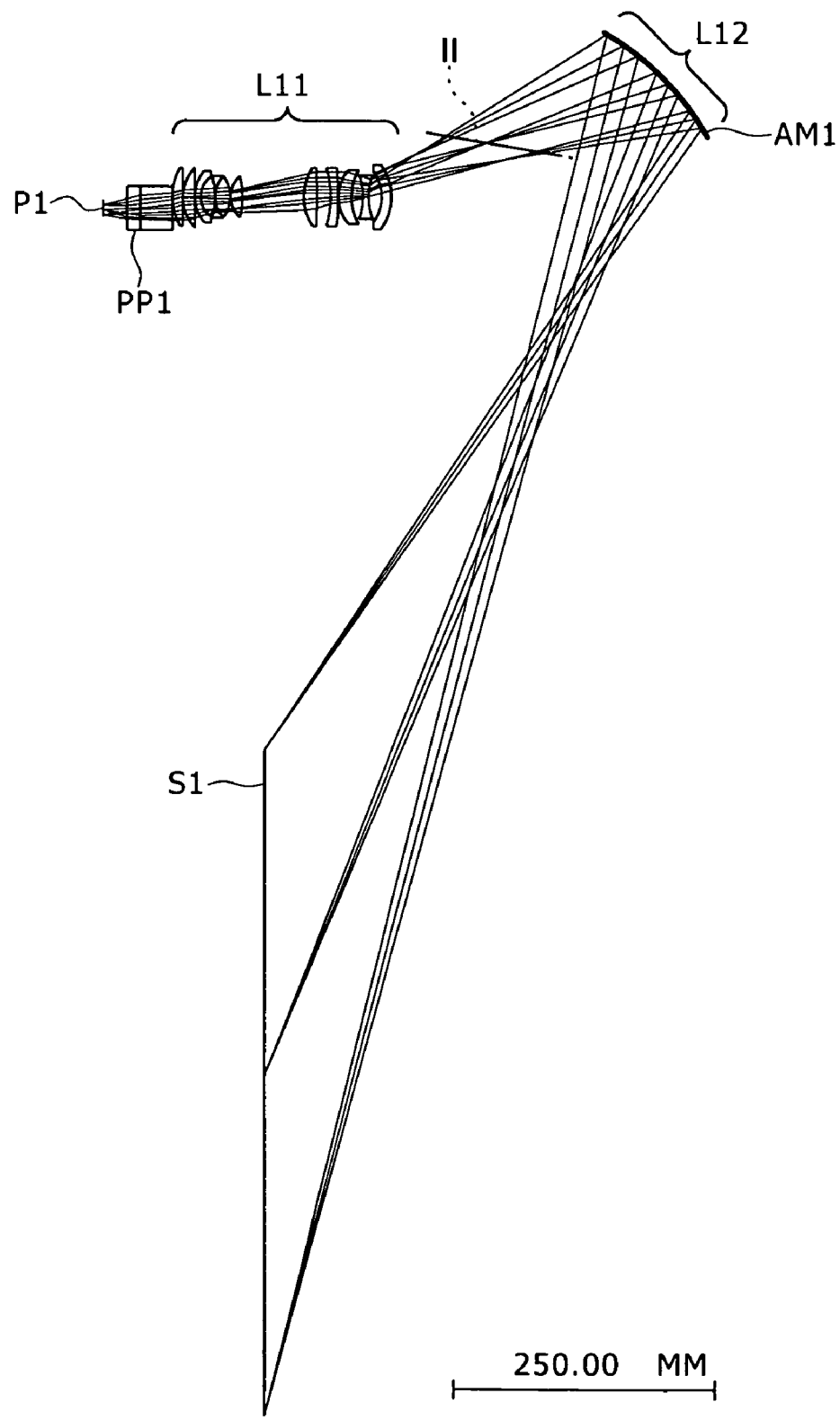
FIG. 1, as well as FIGS. 2 through 9, shows a first embodiment and outlines a projection optical system used for a projection-type image display apparatus.
Figure 2:
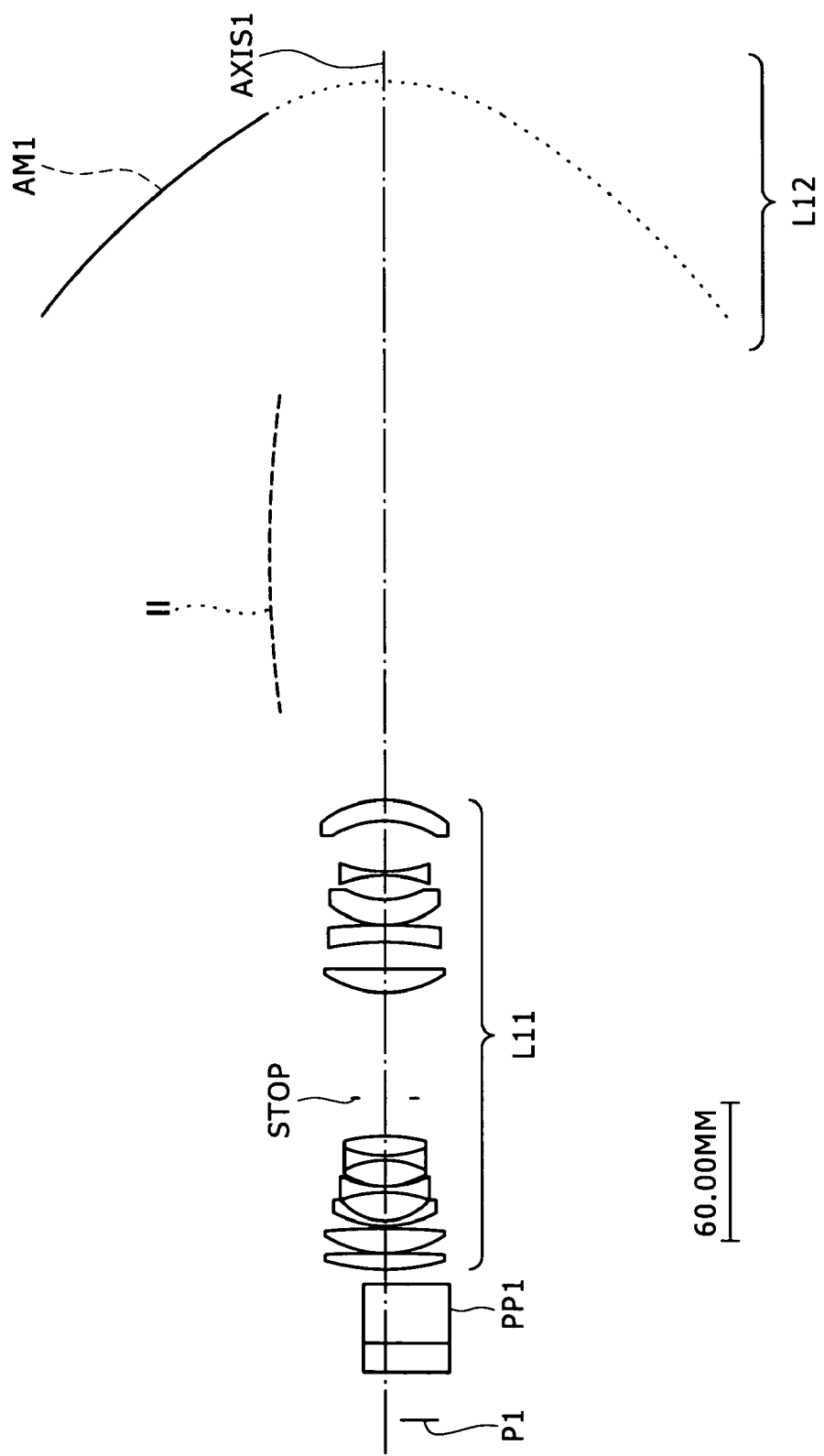
FIG. 2 is an enlarged view of the projection optical system.

FIG. 1 outlines the entire optical system of a projector (projection-type image display apparatus) using the projection optical system according to a first embodiment of the invention. FIG. 2 shows an enlarged view of the projection optical system.

In the diagram illustrating the first embodiment, P1 denotes an image display element as the modulation means. Based on a video signal, the image display element P1 modulates the light emitted from a light source (not shown) to form the primary image surface. The image display element P1 can represent a reflective or transmissive dot-matrix liquid crystal panel, a digital micro mirror device (DMD), and the like. In the diagram, PP1 denotes a polarizing beam splitter (PBS), a 4P prism, a TIR (Total Internal Reflector) prism, and the like. STOP denotes a diaphragm. While the projector needs an illumination optical system to illuminate the image display element P1, the illumination optical system is omitted from FIGS. 1, 2, and the other diagrams showing the first embodiment.

L11 denotes a first optical system composed of a refracting optical element. L12 denotes a second optical system composed of a concave reflector AM1. The projection optical system is composed of the first optical system L11 and the second optical system L12 and guides the light (primary image surface) image-modulated by the image display element P1 to the screen S1 to form an image (secondary image surface) on the screen S1. That is, the first optical system L11 forms an intermediate image at position II in FIG. 2. The image is then reflected on a concave reflector AM1 of the second optical system L12 to form a pupil image that is then formed on the screen S1. As shown in FIG. 2, the respective optical surfaces of the projection optical system are rotationally symmetric about an optical axis AXIS1. In FIG. 2, a broken line indicates an unused and therefore removed part of the concave reflector AM1 of the second optical system L12.

Table 1 shows data for numeric value example 1 of applying specific numeric values to the projection optical system according to the first embodiment. In the following tables, surface numbers are provided in ascending order like 1, 2, 3, and so on from the primary image surface (display device) to the secondary image surface (projected image surface). No surface number is given to the diaphragm. "INF" in the curvature radius row indicates that the corresponding surface is flat. The refractive index and the Abbe number are applicable to the glass used for the primary image surface containing the flat surface and to the e-line (546.1 nm). The inch size indicates the size of a diagonal line contained in the projected image surface. "E" represents the base-10 exponential notation indicating an aspheric coefficient.

TABLE 1

| Screen diagonal: | | | 52.7 inches | |
| Numeric aperture at the display element side: | | | 0.204 | |

| Surface number | | Curvature radius | Interval | Glass (e-line refractive index/Abbe number) |
|---|---|---|---|---|
| Display element surface | | INF | 22.100 | |
| 1 | | INF | 12.000 | 1.83962/42.8 |
| 2 | | INF | 27.300 | 1.51872/64.0 |
| 3 | | INF | 6.050 | |
| 4 | | 81.82639 | 6.359 | 1.48914/70.2 |
| 5 | | −1254.73767 | 0.300 | |
| 6 | | 43.89754 | 11.831 | 1.48914/70.2 |
| 7 | | −198.97423 | 0.200 | |
| 8 | | 43.61635 | 2.303 | 1.83930/37.1 |
| 9 | | 25.81806 | 12.032 | 1.48914/70.2 |
| 10 | | −131.45439 | 1.656 | |
| 11 | | −61.19711 | 1.947 | 1.81184/33.0 |
| 12 | | 30.63239 | 11.922 | 1.49845/81.2 |
| 13 | | −31.42185 | 0.200 | |
| 14 | | −32.45023 | 1.725 | 1.81184/33.0 |
| 15 | | 36.45838 | 8.480 | 1.85505/23.6 |
| 16 | | −58.84008 | 17.579 | |
| Diaphragm | | INF | 47.218 | |
| 17 | | 43.97454 | 10.553 | 1.57125/55.8 |
| 18 | | −1904.72192 | 12.159 | |
| 19 | Aspheric surface | −1403.57952 | 7.000 | 1.49357/57.8 |
| 20 | Aspheric surface | 135.84325 | 0.300 | |
| 21 | | 32.78514 | 12.508 | 1.58913/61.3 |
| 22 | | 44.75799 | 9.839 | |
| 23 | | −56.04514 | 2.033 | 1.83930/37.1 |
| 24 | | 43.91998 | 22.513 | |
| 25 | | −49.88309 | 9.344 | 1.49357/57.8 |
| 26 | Aspheric surface | −40.64674 | 320.000 | |
| 27 | Aspheric surface | −85.89587 | −439.276 | Reflector |
| Projected image surface | | INF | | |

| S19 | K | 2679.3838430 | | | | | | | |
| | A4 | −1.27105E−05 | A6 | 1.10518E−08 | A8 | −4.79662E−12 | | | |
| S20 | K | −65.0537440 | | | | | | | |
| | A4 | −1.04155E−05 | A6 | 9.26604E−09 | A8 | −5.80805E−12 | | | |
| S26 | K | −1.1618060 | | | | | | | |
| | A4 | −1.08919E−06 | A6 | −9.68945E−10 | A8 | 6.42182E−13 | | | |
| S27 | K | −2.6454840 | | | | | | | |
| | A4 | −1.17532E−07 | A6 | 6.31776E−12 | A8 | −2.93186E−16 | A10 | 8.80773E−21 |
| | A12 | −1.55073E−25 | A14 | 1.18177E−30 | | | | |

According to numeric value example 1, the image display element P1 has an aspect ratio of 16:9, contains 1920×1080 pixels, and sizes to 0.61 inches. The image display element P1 is enlarged to 52.7 inches for projection. The numeric aperture toward an object is 0.204 (equivalent to F number 2.5). The pixel size is approximately 7 μm on the image display element P1 and approximately 0.608 mm on the screen S1.

Figure 3:
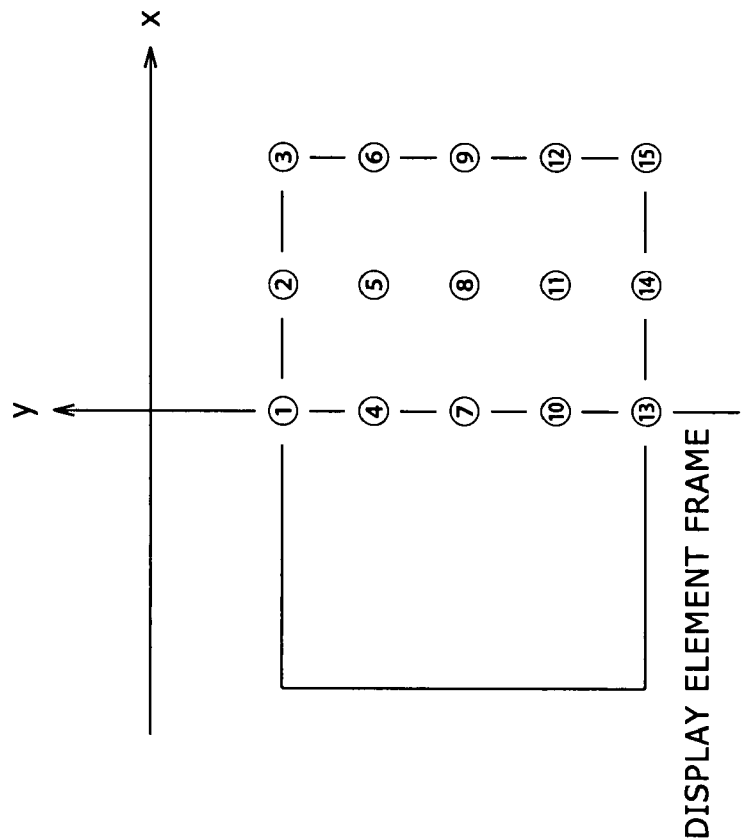
FIG. 3 shows evaluation points on an image display element.
Figure 4:
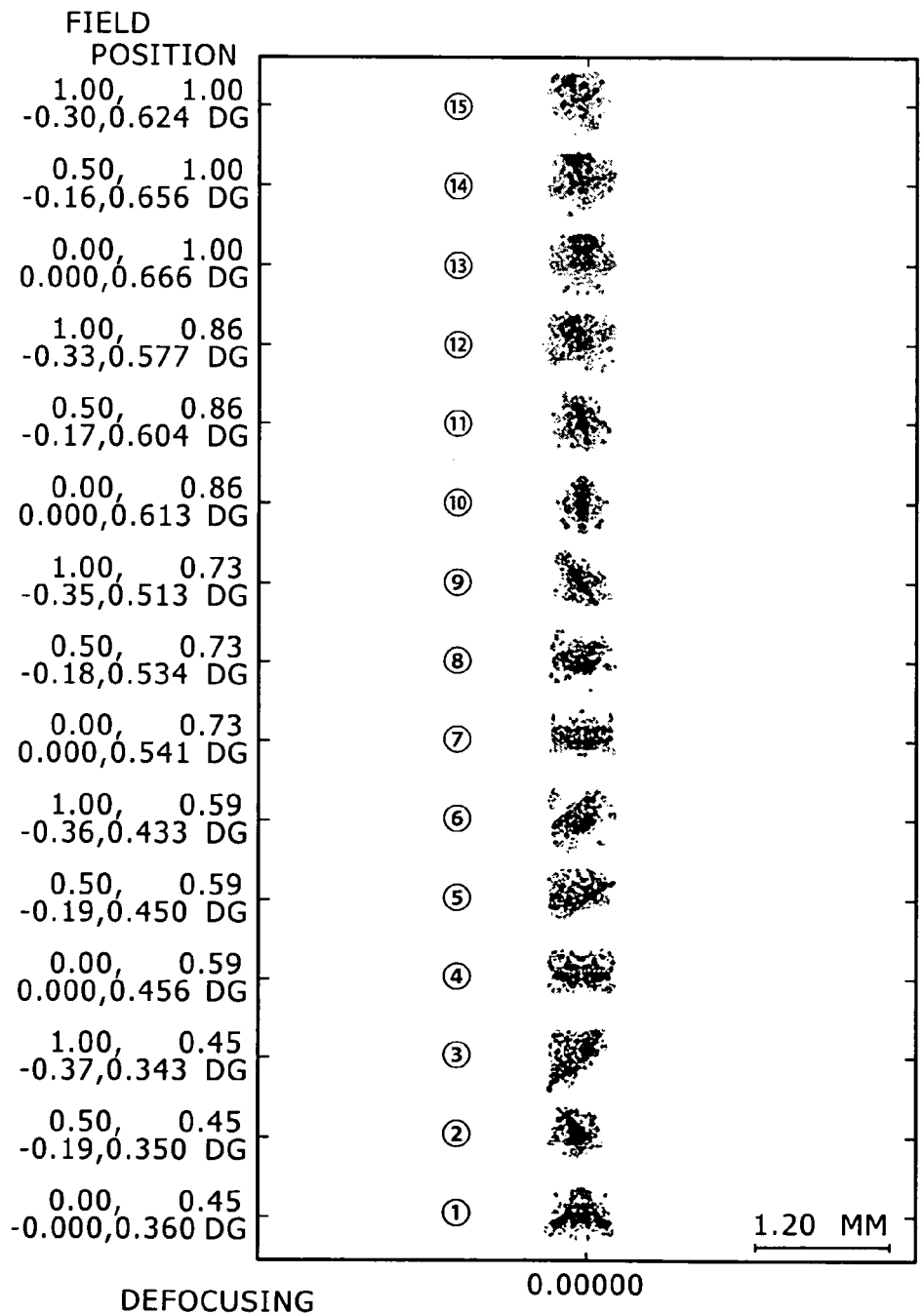
FIG. 4 is a spot diagram showing light radiated from the evaluation points shown in FIG. 3 onto a screen.
Figure 5:
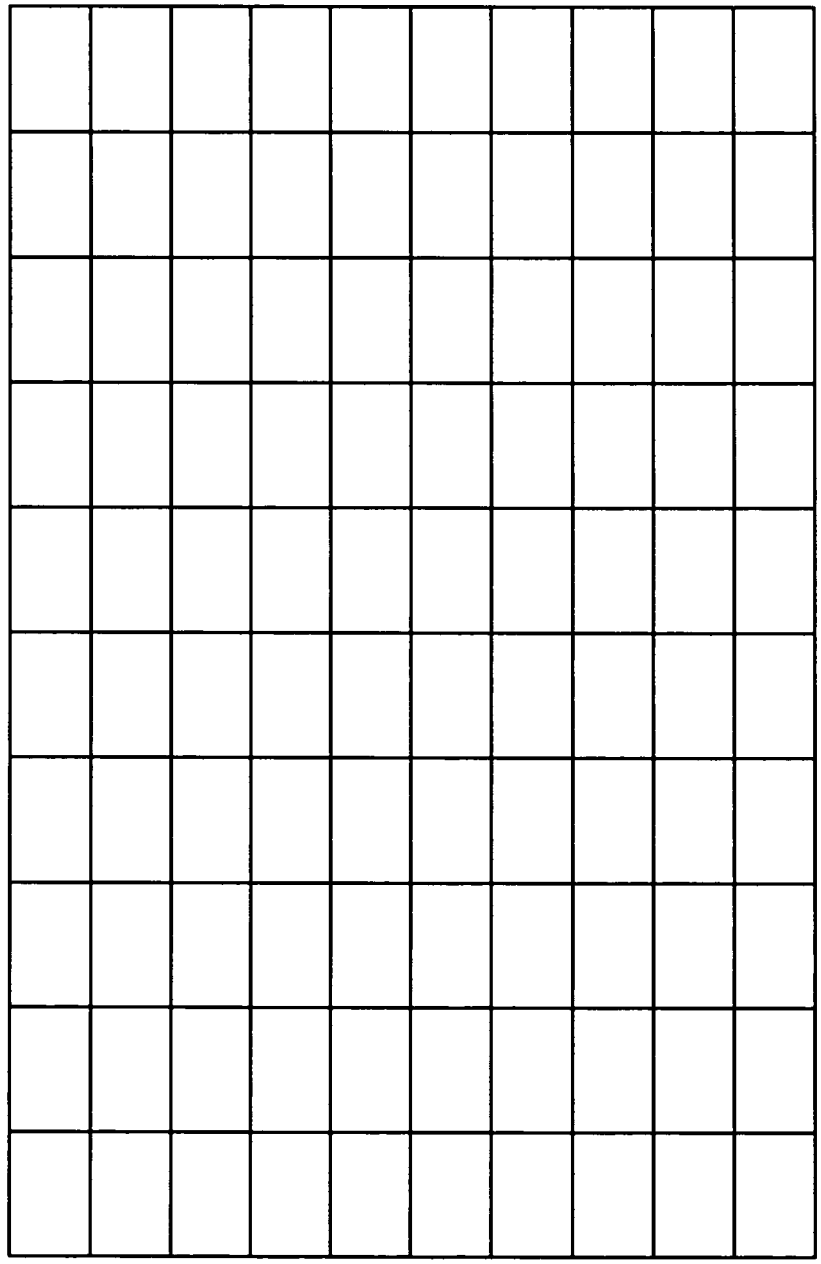
FIG. 5 shows distortion on the screen.

FIG. 4 shows a spot diagram for the projection optical system according to numeric value example 1. FIG. 5 shows distortion. Field angles (1) through (15) shown in the spot diagram are respectively generated from positions (1) through (15) on the image display element P1 shown in FIG. 3. Reference wavelengths are 656.28 nm, 620.0 nm, 546.07 nm, 460.0 nm, and 435.84 nm and are given weights 2, 2, 3, 2, 1, respectively. The scale for FIG. 4 is twice as large as one pixel on the screen S1. As shown in FIG. 4, the sufficient image formation capability results. As shown in FIG. 5, no remarkable image distortion is found and the sufficient capability results.

Figure 6:
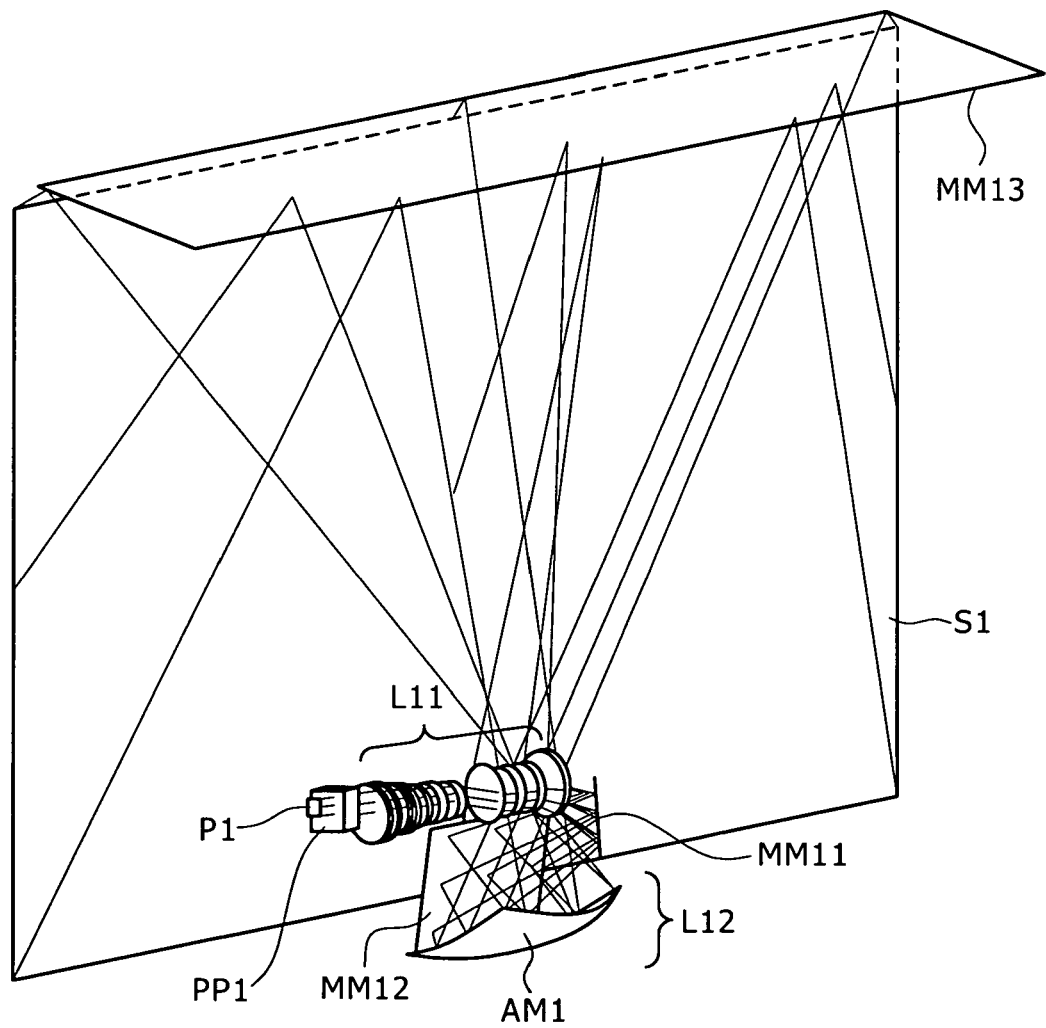
FIG. 6, as well as FIGS. 7 through 9, shows a configuration example of a rear projection television together with part of light trajectories and provides a perspective view, viewed from the rear of the screen.

To dispose the projection optical system according to numeric value example 1 inside the cabinet CAB1 of the rear projection television, the projection optical system needs to be compacted by folding the light path on plane mirrors MM11, MM12, and MM13 as shown in FIGS. 6 and 7. FIGS. 6 and 7 show constructions of elaborately folding the light path by disposing the plane mirror MM13 between the projection optical system and the screen S1 and the plane mirrors MM11 and MM12 between the first optical system L11 and the second optical system L12. The light beam travels from the center of the primary image surface to the center of the secondary image surface and crosses the optical axis within a vertical plane. In this case, the plane mirrors MM11 and MM12 reflect the light beam between the first optical system and the concave reflector AM1 for the second optical system and deflect the light beam within a horizontal plane. When the projection optical system is disposed at the bottom of the cabinet, for example, the plane mirror MM13 is disposed at the top of the cabinet CAB1, reflects the light output from the projection optical system, and deflects the light so as to reach the screen S1.

Figure 9:
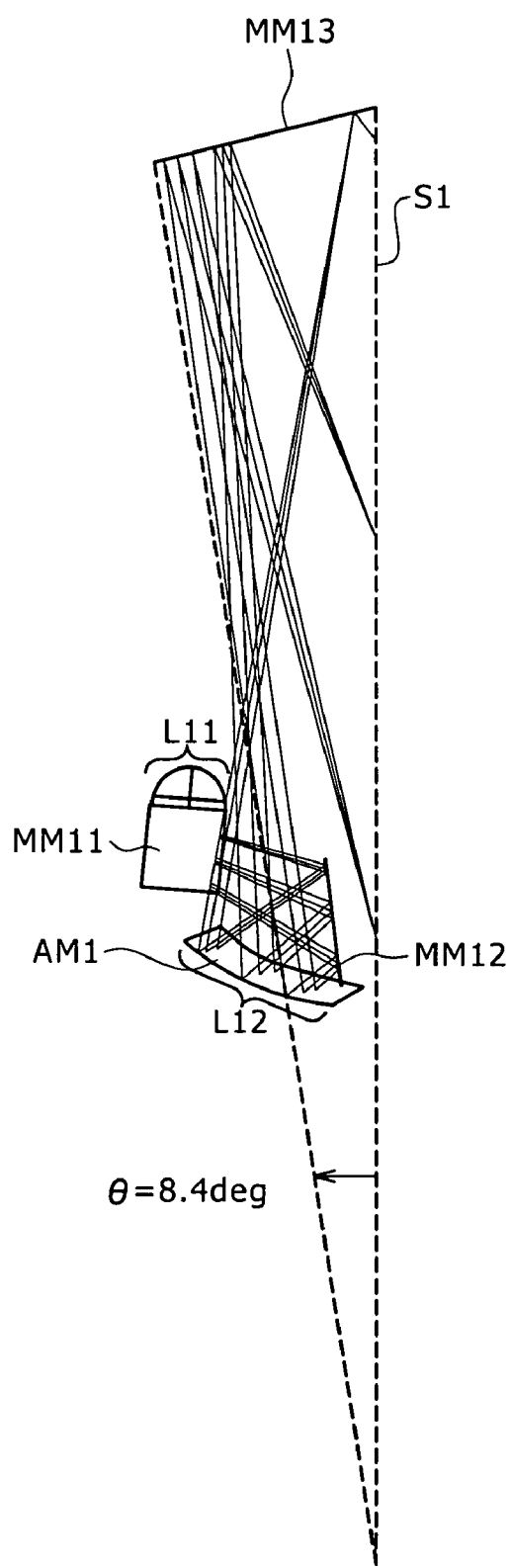
FIG. 9 shows an angle between the screen and an outmost light beam in light flux directed to the screen from a mirror placed immediately in front of the screen.

FIG. 7 is a side view. As shown in FIG. 9, the plane mirror MM13 is used to fold the light path so that the outmost light beam forms angle θ of approximately 8.4 degrees against the screen. In this manner, the apparatus thickness can be 200 mm or less and the display bottom portion can be small.

FIG. 8 partially enlarges the projection optical system in FIGS. 6 and 7.

The projection-type image display apparatus according to the first embodiment is compacted by folding the light path using the plane mirrors MM11, MM12, and MM13. The invention is not limited to the above-mentioned method of folding the light path. For example, it may be preferable to dispose a plane mirror in the first optical system L11. Further, another plane mirror can be disposed between the plane mirror MM13 and the concave reflector AM1.

The second optical system L12 forms a pupil AP1 (i.e., a portion where the light flux is converged) that forms an intermediate image for the first optical system L11 on the screen S1. The pupil AP1 is formed outside the light flux from the plane mirror MM13 to the entire surface of the screen S1. When the projection optical system is disposed in this manner, it is possible to provide a shielding box PB between a light flux directed from the second optical system L12 to the plane mirror MM13 and a light flux directed from the plane mirror MM13 to the entire surface of the screen S1 so that the light flux directed to the screen S1 passes through an approximately minimum aperture TO1. The shielding box PB1 can protect the projection optical system (i.e., the first optical system L11 and the second optical system L12) against dust without blocking off the projected video light. Further, the shielding box PB1 blocks off outside light entering into the cabinet from the screen S1. For example, the shielding box PB1 can prevent the outside light from being reflected on the concave reflector AM1 or the like of the second optical system L12 to become stray light and degrade the contrast of the video projected on the screen S1.

SECOND EMBODIMENT

Figure 10:
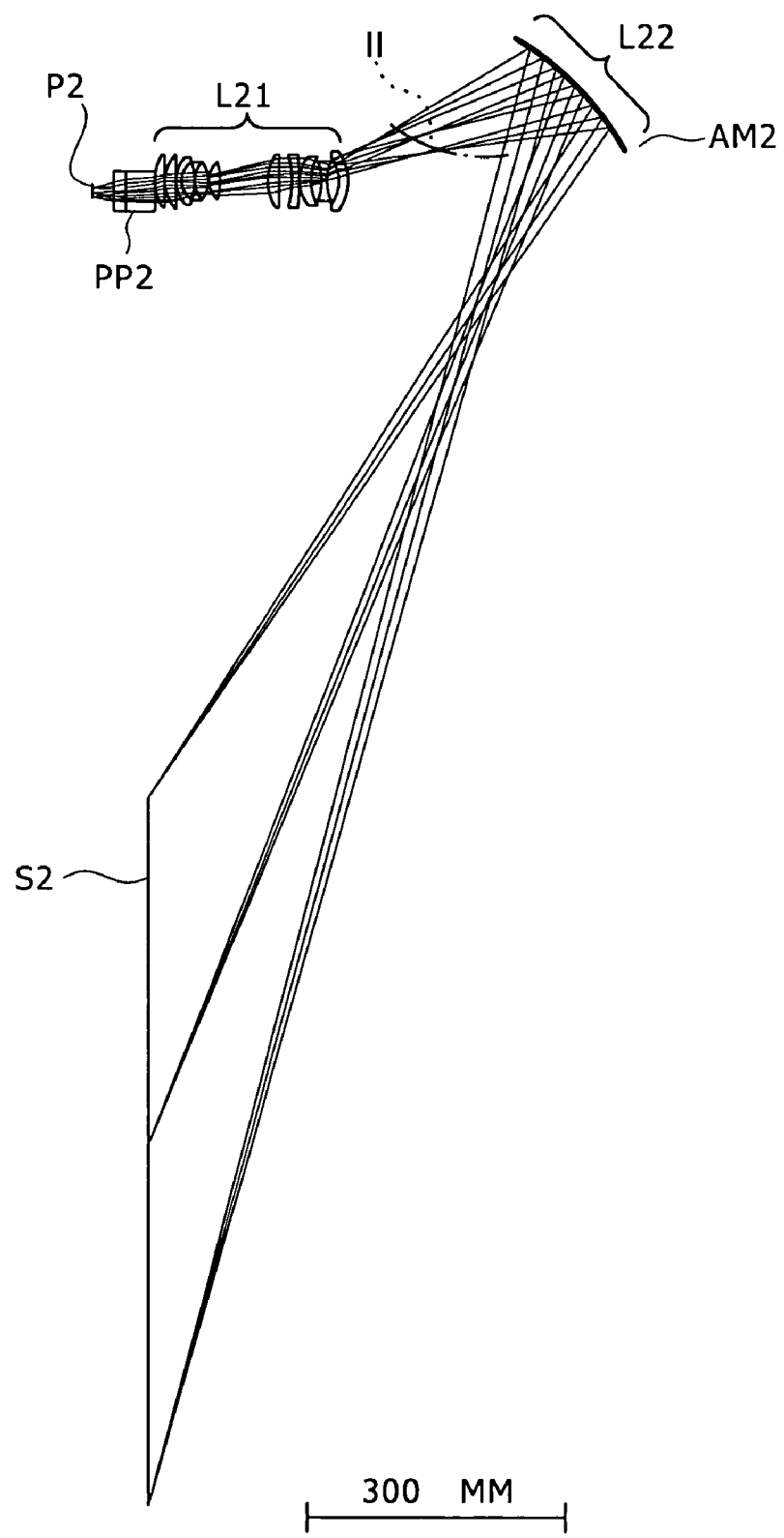
FIG. 10, as well as FIGS. 11 through 18, shows a second embodiment and outlines a projection optical system used for a projection-type image display apparatus.
Figure 11:
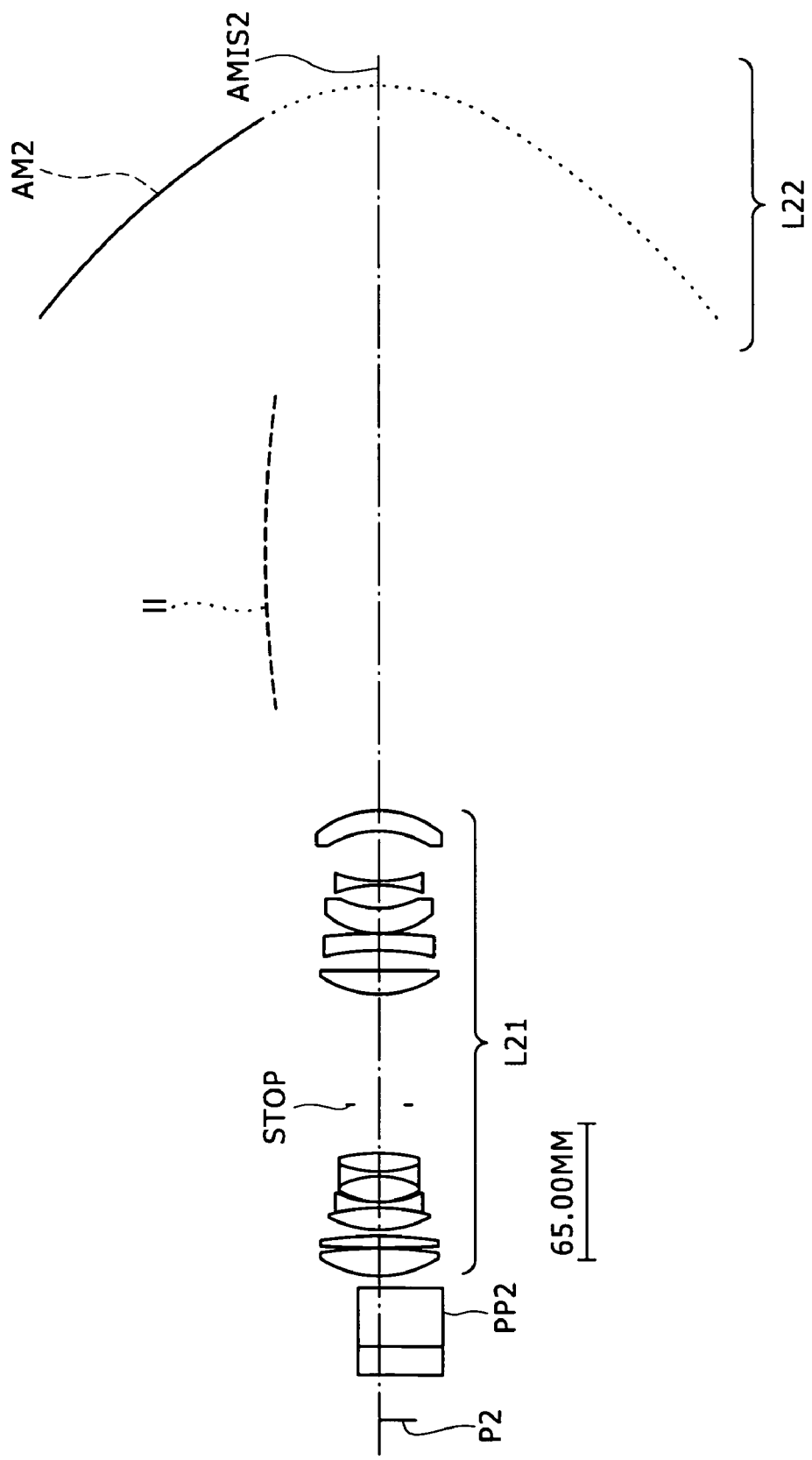
FIG. 11 is an enlarged view of the projection optical system.

FIG. 10 outlines the entire optical system of a projector (projection-type image display apparatus) using the projection optical system according to a second embodiment of the invention. FIG. 11 shows an enlarged view of the projection optical system.

In the diagram illustrating the second embodiment, P2 denotes an image display element as the modulation means. Based on a video signal, the image display element P2 modulates the light emitted from a light source (not shown) to form the primary image surface. The image display element P2 can represent a reflective or transmissive dot-matrix liquid crystal panel, a digital micro mirror device (DMD), and the like. In the diagram, PP2 denotes a polarizing beam splitter (PBS), a 4P prism, a TIR (Total Internal Reflector) prism, and the like. STOP denotes a diaphragm. While the projector needs an illumination optical system to illuminate the image display element P2, the illumination optical system is omitted from FIGS. 10, 11, and the other diagrams showing the second embodiment.

L21 denotes a first optical system composed of a refracting optical element. L22 denotes a second optical system composed of a concave reflector AM2. The projection optical system is composed of the first optical system L21 and the second optical system L22 and guides the light (primary image surface) image-modulated by the image display element P2 to the screen S2 to form an image (secondary image surface) on the screen S2. That is, the first optical system L21 forms an intermediate image at position II in FIGS. 10 and 11. The image is then reflected on a reflector AM2 of the second optical system L22 to form a pupil image that is then formed on the screen S2. As shown in FIG. 11, the respective optical surfaces of the projection optical system are rotationally symmetric about an optical axis AXIS2. In FIG. 11, a broken line indicates an unused and therefore removed part of the concave reflector AM2 of the second optical system L22.

Table 2 shows data for numeric value example 2 of applying specific numeric values to the projection optical system according to the second embodiment.

TABLE 2

| Screen diagonal: | | 67.9 inches | |
|---|---|---|---|
| Numeric aperture at the display element side: | | 0.204 | |
| Surface number | Curvature radius | Interval | Glass (e-line refractive index/Abbe number) |
| Display element surface | INF | 22.100 | |
| 1 | INF | 12.000 | 1.83962/42.8 |
| 2 | INF | 27.300 | 1.51872/64.0 |
| 3 | INF | 6.050 | |

TABLE 2-continued

| | | | | |
|---|---|---|---|---|
| 4 | | 48.02646 | 12.579 | 1.48914/70.2 |
| 5 | | −149.37820 | 0.300 | |
| 6 | | 470.90347 | 4.869 | 1.48914/70.2 |
| 7 | | −141.59099 | 2.024 | |
| 8 | | 51.42610 | 8.429 | 1.49845/81.2 |
| 9 | | −121.51292 | 1.377 | |
| 10 | | −70.77524 | 2.158 | 1.81184/33.0 |
| 11 | | 31.36886 | 12.970 | 1.49845/81.2 |
| 12 | | −34.28097 | 0.200 | |
| 13 | | −34.24547 | 1.872 | 1.81184/33.0 |
| 14 | | 39.69278 | 8.724 | 1.85505/23.6 |
| 15 | | −67.65941 | 22.810 | |
| Diaphragm | | INF | 47.690 | |
| 16 | | 41.92112 | 11.966 | 1.48914/70.2 |
| 17 | | −287.76955 | 7.924 | |
| 18 | Aspheric surface | 1611.33087 | 7.000 | 1.49357/57.8 |
| 19 | Aspheric surface | 118.54047 | 0.300 | |
| 20 | | 32.60197 | 14.000 | 1.48914/70.2 |
| 21 | | 41.37986 | 10.096 | |
| 22 | | −50.40323 | 2.005 | 1.77621/49.4 |
| 23 | | 44.94476 | 20.707 | |
| 24 | | −52.51332 | 10.000 | 1.49357/57.8 |
| 25 | Aspheric surface | −42.31242 | 325.000 | |
| 26 | Aspheric surface | −87.00193 | −547.789 | Reflector |
| Projected image surface | | INF | 0.000 | |

| | | | | | | | | |
|---|---|---|---|---|---|---|---|---|
| S18 | K | −51177.61327 | | | | | | |
| | A4 | −1.27130E−05 | A6 | 9.95420E−09 | A8 | −3.65754E−12 | | |
| S19 | K | −69.92292 | | | | | | |
| | A4 | −9.59429E−06 | A6 | 7.57585E−09 | A8 | −3.71822E−12 | | |
| S25 | K | −1.018512 | | | | | | |
| | A4 | −8.25367E−07 | A6 | −1.07783E−09 | A8 | 5.13364E−13 | | |
| S26 | K | −2.619353 | | | | | | |
| | A4 | −1.08108E−07 | A6 | 5.56005E−12 | A8 | −2.48459E−16 | A10 | 7.20728E−21 |
| | A12 | −1.22716E−25 | A14 | 9.07427E−31 | | | | |

The image display element P2 has an aspect ratio of 16:9, contains 1920×1080 pixels, and sizes to 0.61 inches. The image display element P2 is enlarged to 67.9 inches for projection. The numeric aperture toward an object is 0.204 (equivalent to Fnumber 2.5). The pixel size is approximately 7 μm on the image display element P2 and approximately 0.783 mm on the screen S2.

Figure 12:
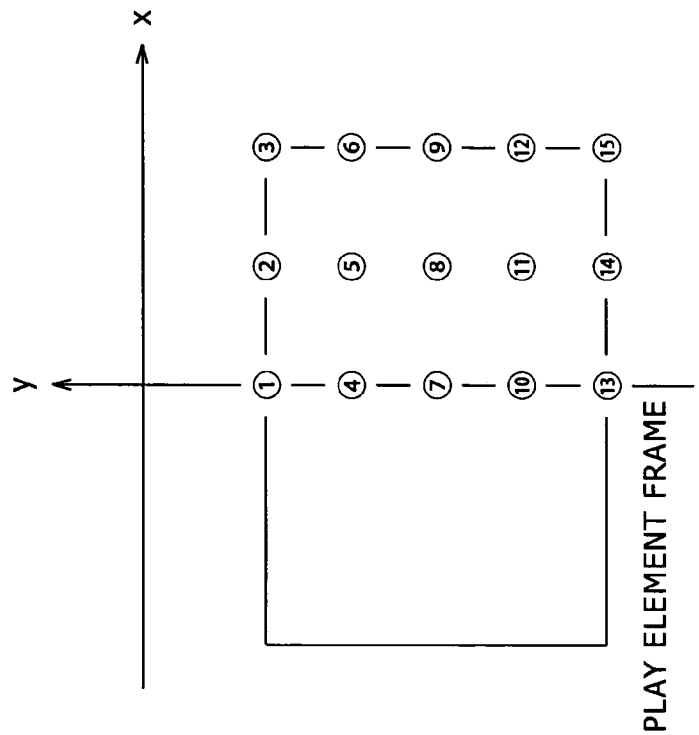
FIG. 12 shows evaluation points on an image display element.
Figure 13:
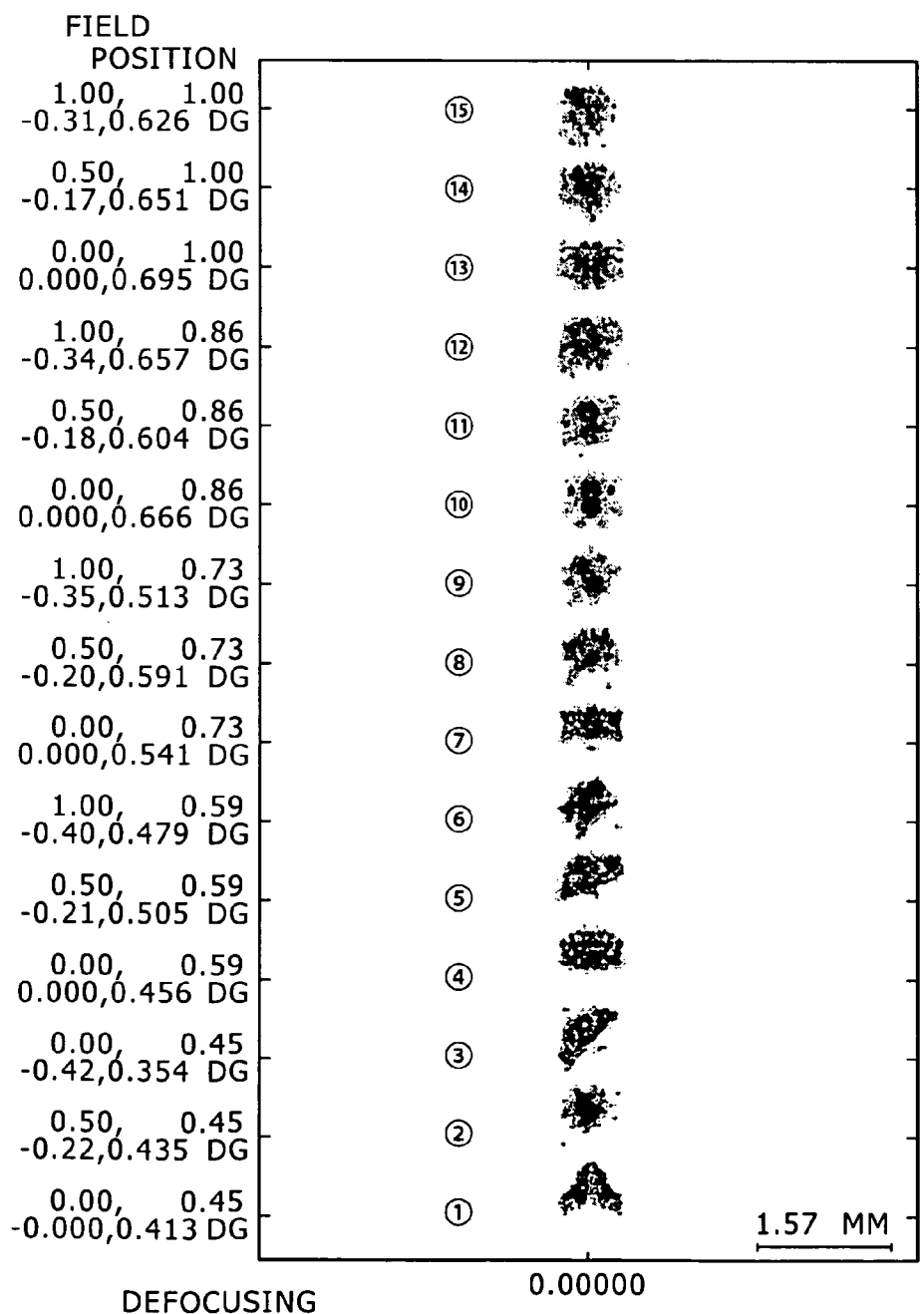
FIG. 13 is a spot diagram showing light radiated from the evaluation points shown in FIG. 12 onto a screen.
Figure 14:
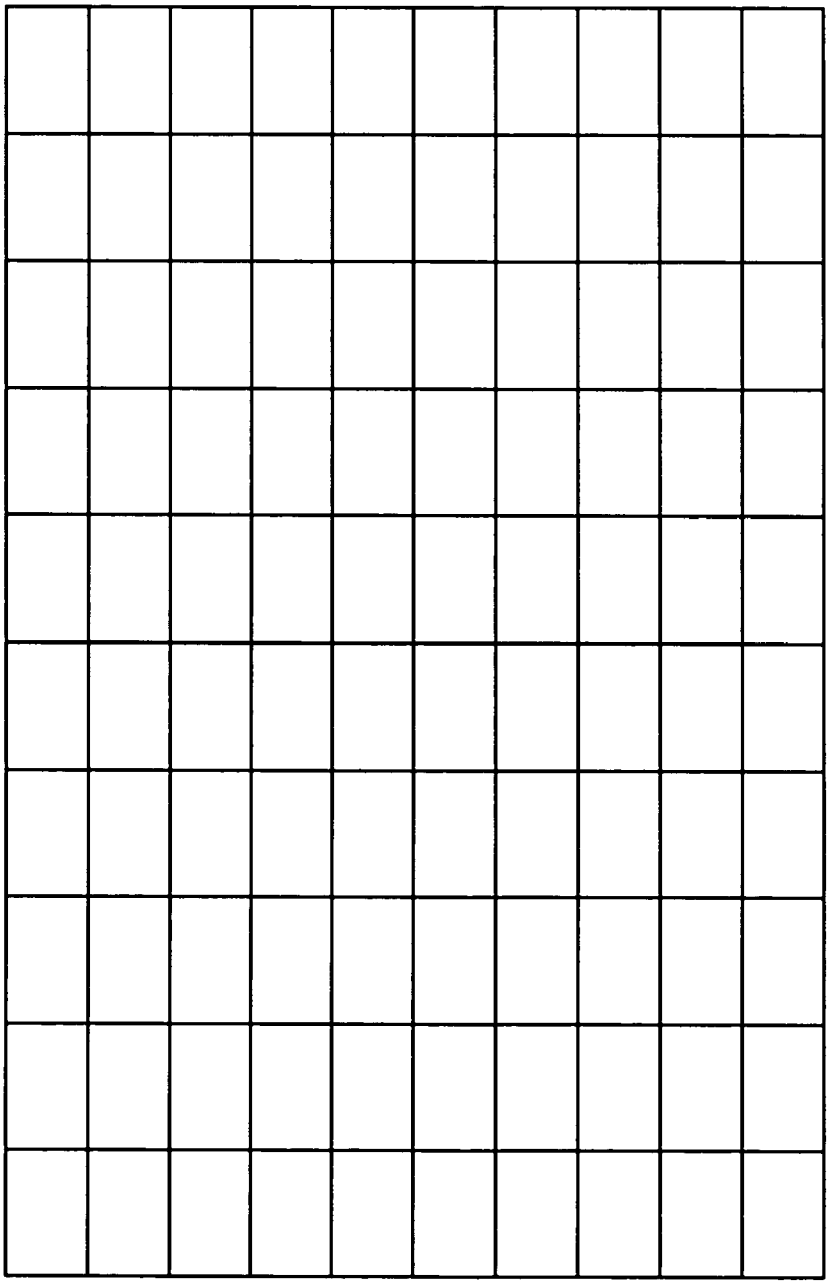
FIG. 14 shows distortion on the screen.

FIG. 13 shows a spot diagram according to numeric value example 2. FIG. 14 shows distortion. Field angles (1) through (15) shown in the spot diagram are respectively generated from positions (1) through (15) on the image display element P2 shown in FIG. 12. Reference wavelengths are 656.28 nm, 620.0 nm, 546.07 nm, 460.0 nm, and 435.84 nm and are given weights 2, 2, 3, 2, 1, respectively. The scale for FIG. 13 is twice as large as one pixel on the screen S2. As shown in FIG. 13, the sufficient image formation capability results. As shown in FIG. 14, no remarkable image distortion is found and the sufficient capability results.

Figure 15:
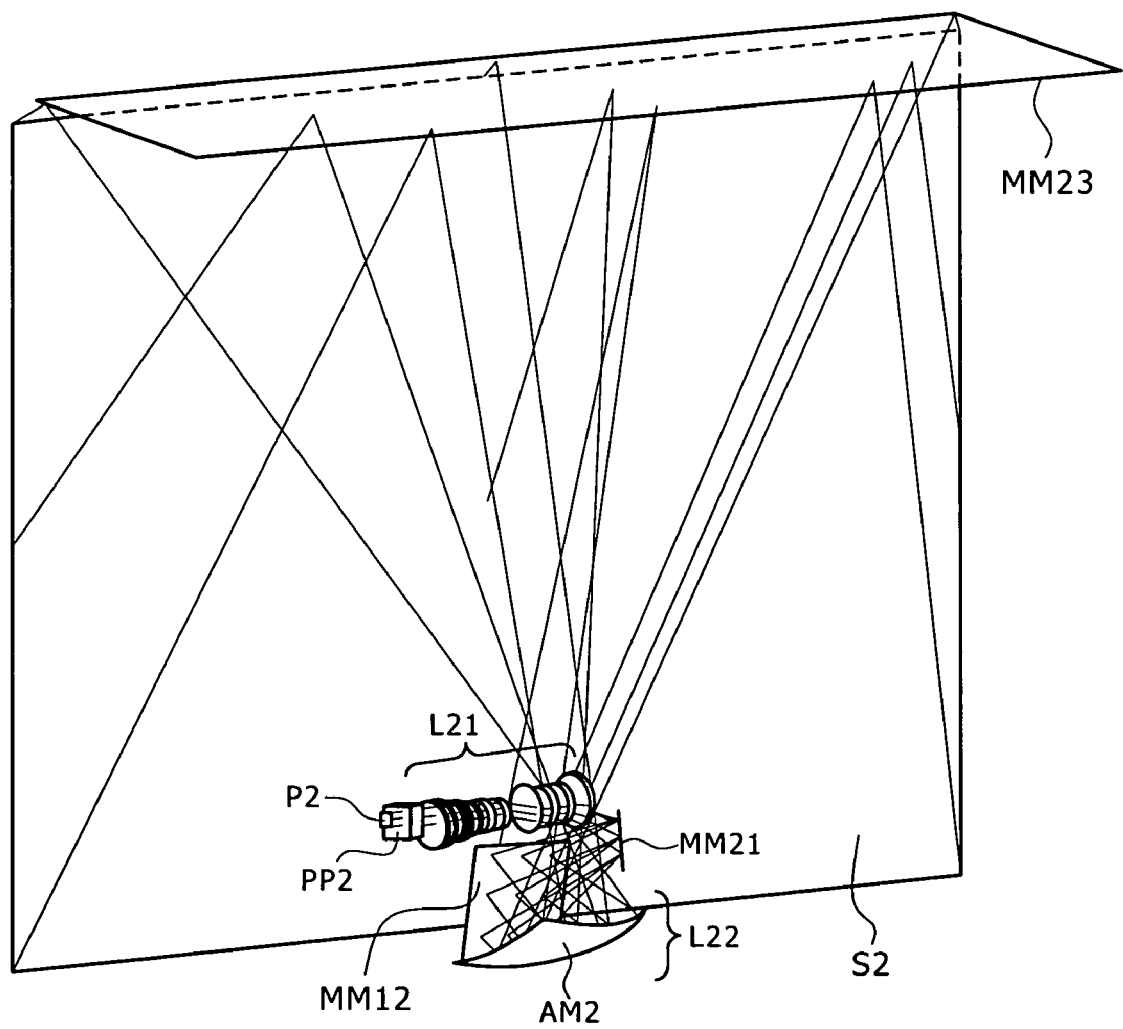
FIG. 15, as well as FIGS. 16 through 18, shows a configuration example of a rear projection television together with part of light trajectories and provides a perspective view, viewed from the rear of the screen.
Figure 16:
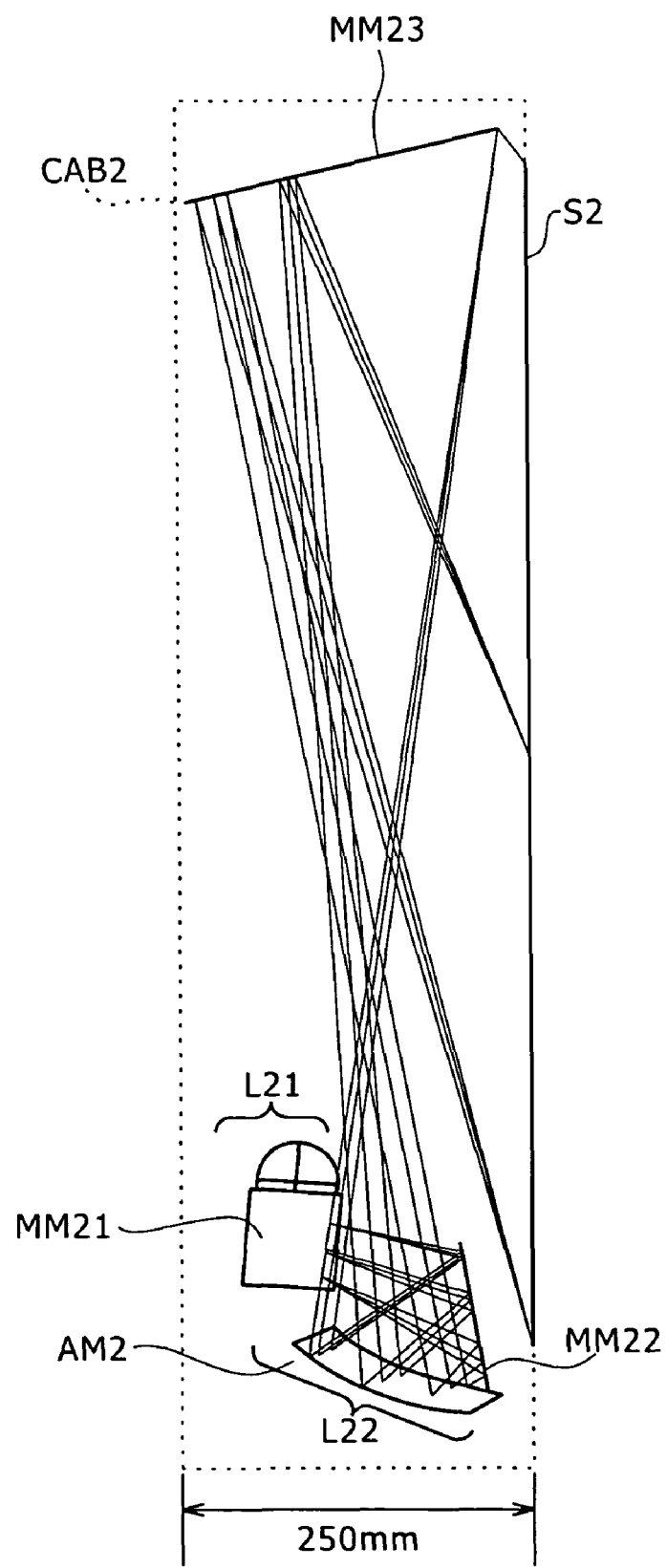
FIG. 16 is a side view.

To dispose the projection optical system according to numeric value example 2 inside the cabinet CAB2 of the rear projection television, the projection optical system needs to be compacted by folding the light path on plane mirrors MM21, MM22, and MM23 as shown in FIGS. 15 and 16. FIGS. 15 and 16 show constructions of elaborately folding the light path by disposing the plane mirror MM23 between the projection optical system and the screen S2 and the plane mirrors MM21 and MM22 between the first optical system L21 and the second optical system L22.

Figure 18:
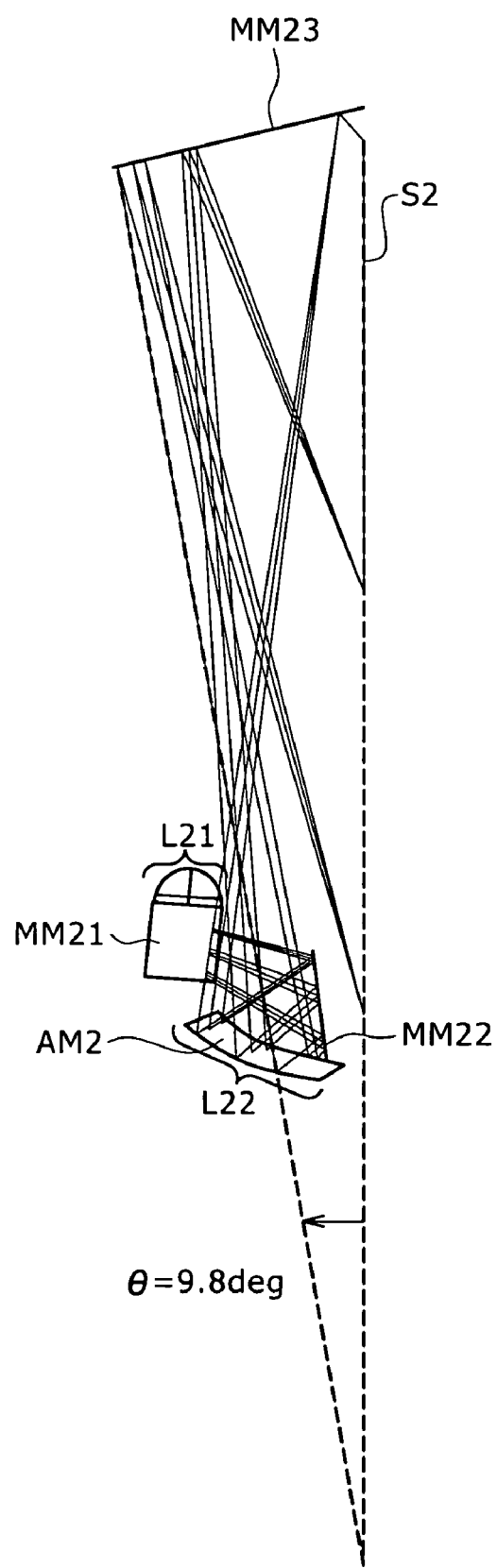
FIG. 18 shows an angle between the screen and an outmost light beam in light flux directed to the screen from a mirror placed immediately in front of the screen.

FIG. 16 is a side view. As shown in FIG. 18, the plane mirror MM23 is used to fold the light path so that the outmost light beam forms angle θ of approximately 9.8 degrees against the screen. In this manner, the apparatus thickness can be 250 mm or less and the display bottom portion can be small. Angle θ formed between the outmost light beam and the screen preferably ranges between 2.9 and 31.0 degrees equivalent to tan θ ranging between 0.05 and 0.6.

Figure 17:
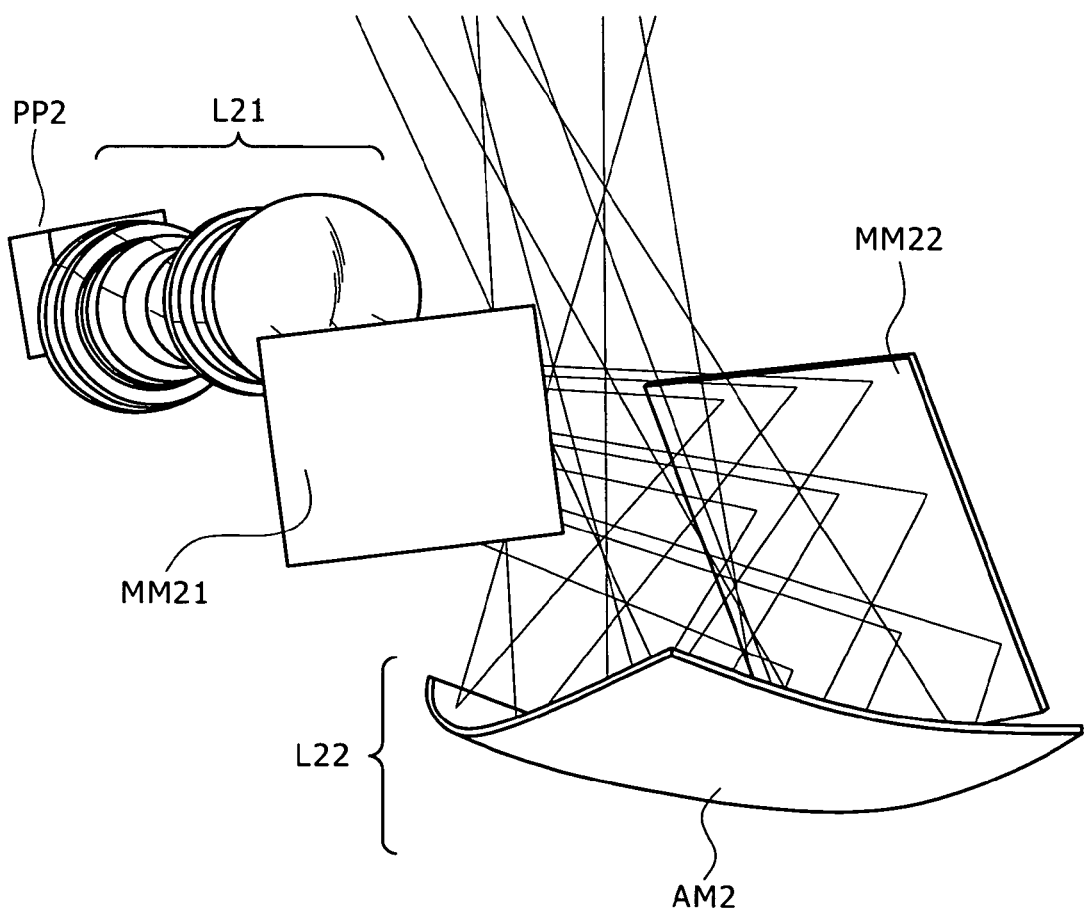
FIG. 17 is an enlarged perspective view showing the projection optical system.

FIG. 17 partially enlarges the projection optical system in FIGS. 15 and 16.

The projection-type image display apparatus according to the second embodiment is compacted by folding the light path using the plane mirrors MM21, MM22, and MM23. The invention is not limited to the above-mentioned method of folding the light path. For example, it may be preferable to dispose a plane mirror in the first optical system L21. Further, another plane mirror can be disposed between the plane mirror MM23 and the concave reflector AM2.

Obviously, the second embodiment can also use the shielding means as described in the first embodiment. A pupil according to the second optical system L22 is positioned outside the outmost light beam of a light flux traveling from the plane mirror MM23 to the screen S2. There is no interference between the light flux traveling from the projection optical system to the plane mirror MM23 and the light flux traveling from the plane mirror MM23 to the screen S2. In addition, the light flux is converged on the pupil.

Table 3 lists corresponding values for conditional equations (1) and (2) according to numeric value examples 1 and 2.

TABLE 3

Data associated with conditional equations

| | Numeric value example 1 | Numeric value example 2 | Remarks |
|---|---|---|---|
| Si1 | 185 | 190 | Distance between the last surface of the first optical system and intermediate image (1) in FIG. 3 or 12 |
| Si2 | 102 | 106 | Distance between the last surface of the first optical system and intermediate image (7) in FIG. 3 or 12 |
| Si3 | 38 | 41 | Distance between the last surface of the first optical system and intermediate image (13) in FIG. 3 or 12 |
| Ls | 210 | 210 | Total length of the first optical system |
| R | −85.896 | −87.002 | Paraxial curvature of the concave reflector |
| K | −2.645 | −2.619 | Conic constant of the concave reflector |
| Si1/Ls | 0.88 | 0.90 | Si/Ls <2 |
| Si2/Ls | 0.49 | 0.50 | Si/Ls <2 |
| Si3/Ls | 0.18 | 0.20 | Si/Ls <2 |
| |R|/2 | 42.948 | 43.501 | S12 >|R|/2 |
| S12 | 320 | 325 | |

Table 3 shows that both numeric value examples 1 and 2 satisfy conditional equations (1) and (2).

FIG. 19 shows intermediate image positions for the first optical system L11 according to the above-mentioned embodiment 1. In FIG. 19, Si1, Si2, and Si3 denote distances between the first optical system L11 and intermediate image positions corresponding to the lowest, meddle, and highest field angles on the screen, respectively. The positions correspond to points (1), (7), and (13) in FIG. 3. The distances are Si1≈185 mm, Si2≈102 mm, and Si3≈38 mm. Length Ls of the first optical system L11 is 210 mm and satisfies conditional equation (1). Both numeric value examples 1 and 2 satisfy conditional equation (2) (see Table 3).

THIRD EMBODIMENT

Figure 20:
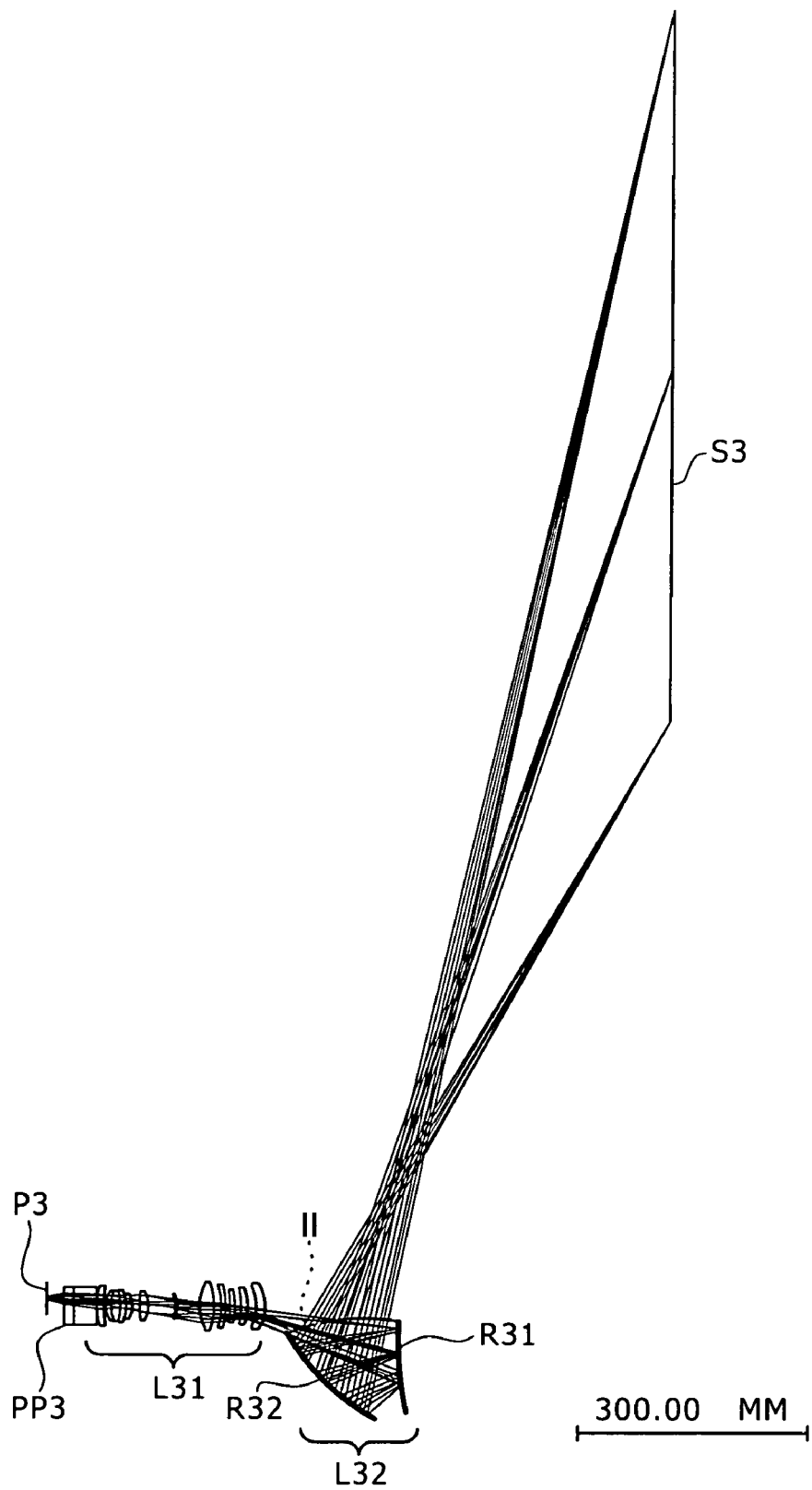
FIG. 20, as well as FIGS. 21 through 27, shows a third embodiment and outlines a projection optical system used for a projection-type image display apparatus.

FIG. 20 outlines the entire optical system of a projector (projection-type image display apparatus) using the projection optical system according to a third embodiment of the invention. FIG. 21 shows an enlarged view of the projection optical system.

In the diagram illustrating the third embodiment, P3 denotes an image display element as the modulation means. Based on a video signal, the image display element-P3 modulates the light emitted from a light source (not shown) to form the primary image surface. The image display element P3 can represent a reflective or transmissive dot-matrix liquid crystal panel, a digital micro mirror device (DMD), and the like. In the diagram, PP3 denotes a polarizing beam splitter (PBS), a dichroic prism, a TIR (Total Internal Reflector) prism, and the like. STOP denotes a diaphragm. While the projector needs an illumination optical system to illuminate the image display element P3, the illumination optical system is omitted from FIGS. 20, 21, and the other diagrams showing the third embodiment.

L31 denotes a first optical system composed of a refracting optical element. L32 denotes a second optical system composed of reflectors R31 and R32. In this case, R31 denotes a convex reflector toward the primary image surface and R32 denotes a concave reflector AM1 in the order of a light beam path from the image display element P3. The projection optical system is composed of the first optical system L31 and the second optical system L32 and guides the light (primary image surface) image-modulated by the image display element P3 to the screen S3 to form an image (secondary image surface) on the screen S3. That is, the first optical system L31 forms an intermediate image at position II in FIGS. 20 and 21. The image is then reflected on reflectors R31 and R32 of the second optical system L32 to form a pupil image that is then formed on the screen S3. As shown in FIG. 21, the respective optical surfaces of the projection optical system are rotationally symmetric about an optical axis AXIS3. In FIG. 21, a broken line indicates an unused and therefore removed part of the reflectors R31 and R32 of the second optical system L32.

Table 4 shows data for numeric value example 3 of applying specific numeric values to the projection optical system according to the third embodiment.

TABLE 4

| F number | F/3.0 | | |
|---|---|---|---|
| Inch size | 73.1" | | |

| | Curvature radius | Interval | Glass (e-line refractive index/Abbe number) |
|---|---|---|---|
| Display element surface | INF | 1.400 | |
| 1 | INF | 20.700 | |
| 2 | INF | 12.000 | 1.83962/42.8 |
| 3 | INF | 27.300 | 1.51872/64.0 |
| 4 | INF | 6.050 | |
| 5 | 54.33486 | 12.294 | 1.49845/81.2 |
| 6 | −89.63152 | 2.549 | |
| 7 | 44.87269 | 9.194 | 1.49845/81.2 |
| 8 | −106.88865 | 4.469 | |
| 9 | −49.15493 | 1.783 | 1.81184/33.0 |
| 10 | 34.57615 | 2.987 | |
| 11 | 39.16911 | 10.719 | 1.49845/81.2 |
| 12 | −32.74038 | 2.658 | |
| 13 | −33.88982 | 1.581 | 1.81184/33.0 |
| 14 | −204.17705 | 7.015 | |

TABLE 4-continued

| | | | | |
|---|---|---|---|---|
| 15 | | −1450.76818 | 5.146 | 1.85505/23.6 |
| 16 | | −47.28023 | 11.550 | |
| Diaphragm | | INF | 26.546 | |
| 17 | | −30.01628 | 1.800 | 1.83962/42.8 |
| 18 | | −40.25509 | 27.966 | |
| 19 | | 46.38086 | 14.898 | 1.59142/61.0 |
| 20 | | −231.41988 | 12.849 | |
| 21 | | −91.96442 | 2.563 | 1.81263/25.3 |
| 22 | | −566.88378 | 0.300 | |
| 23 | | 41.52448 | 10.030 | 1.67340/46.9 |
| 24 | | 62.01431 | 9.000 | |
| 25 | | −70.56814 | 6.851 | 1.80831/46.3 |
| 26 | | 46.59361 | 14.827 | |
| 27 | | −54.43436 | 12.414 | 1.81081/40.5 |
| 28 | | −47.66710 | 171.972 | |
| 29 | Aspheric surface | 1.01174E−05 | −149.000 | Reflector (first mirror) |
| 30 | Aspheric surface | 67.52094 | 485.861 | Reflector (second mirror) |
| Projected image surface | | INF | | |

Aspheric coefficient for surface 29

| | | | | | | |
|---|---|---|---|---|---|---|
| K | −28531.19104 | | | | | |
| A4 | −0.337498E−08 | A6 | 0.665793E−11 | A8 | −0.831931E−15 | A10 | 0.510008E−19 |
| A12 | −0.158764E−23 | A14 | 0.200226E−28 | | | |

Aspheric coefficient for surface 30

| | | | | | | |
|---|---|---|---|---|---|---|
| K | −2.694135 | | | | | |
| A4 | 0.170688E−06 | A6 | −0.116784E−10 | A8 | 0.647442E−15 | A10 | −0.199351E−19 |
| A12 | 0.298396E−24 | A14 | −0.873758E−30 | | | |

According to numeric value example 3, the image display element P3 has an aspect ratio of 16:9, contains 1920×1080 pixels, and sizes to 0.61 inches. The image display element P3 is enlarged to 73.1 inches for projection. The F number is 3. The pixel size is approximately 7 µm on the image display element P3 and approximately 0.845 mm on the screen S3.

Figure 22:
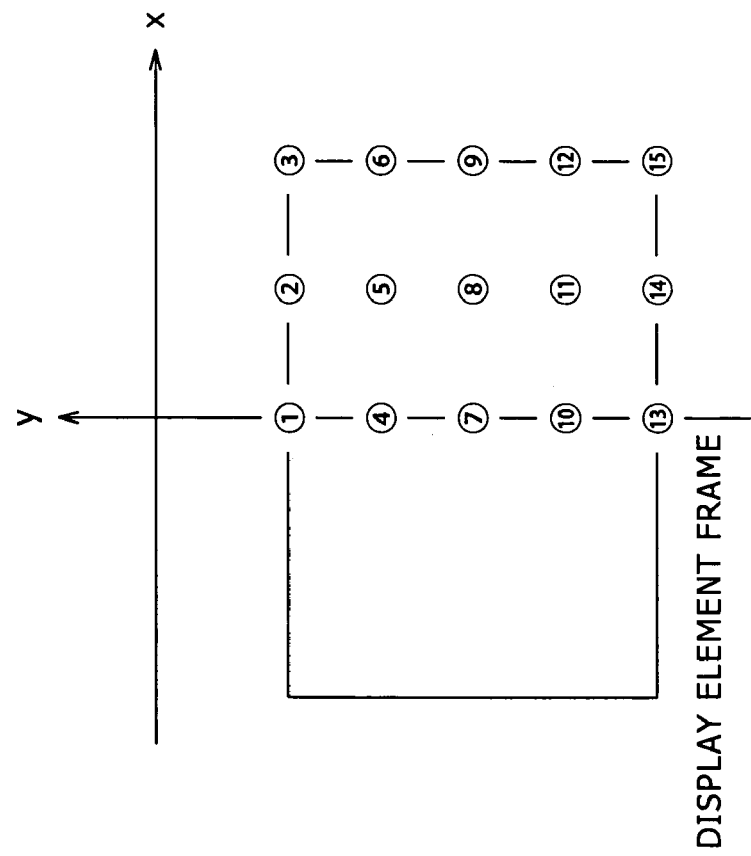
FIG. 22 shows evaluation points on an image display element.
Figure 23:
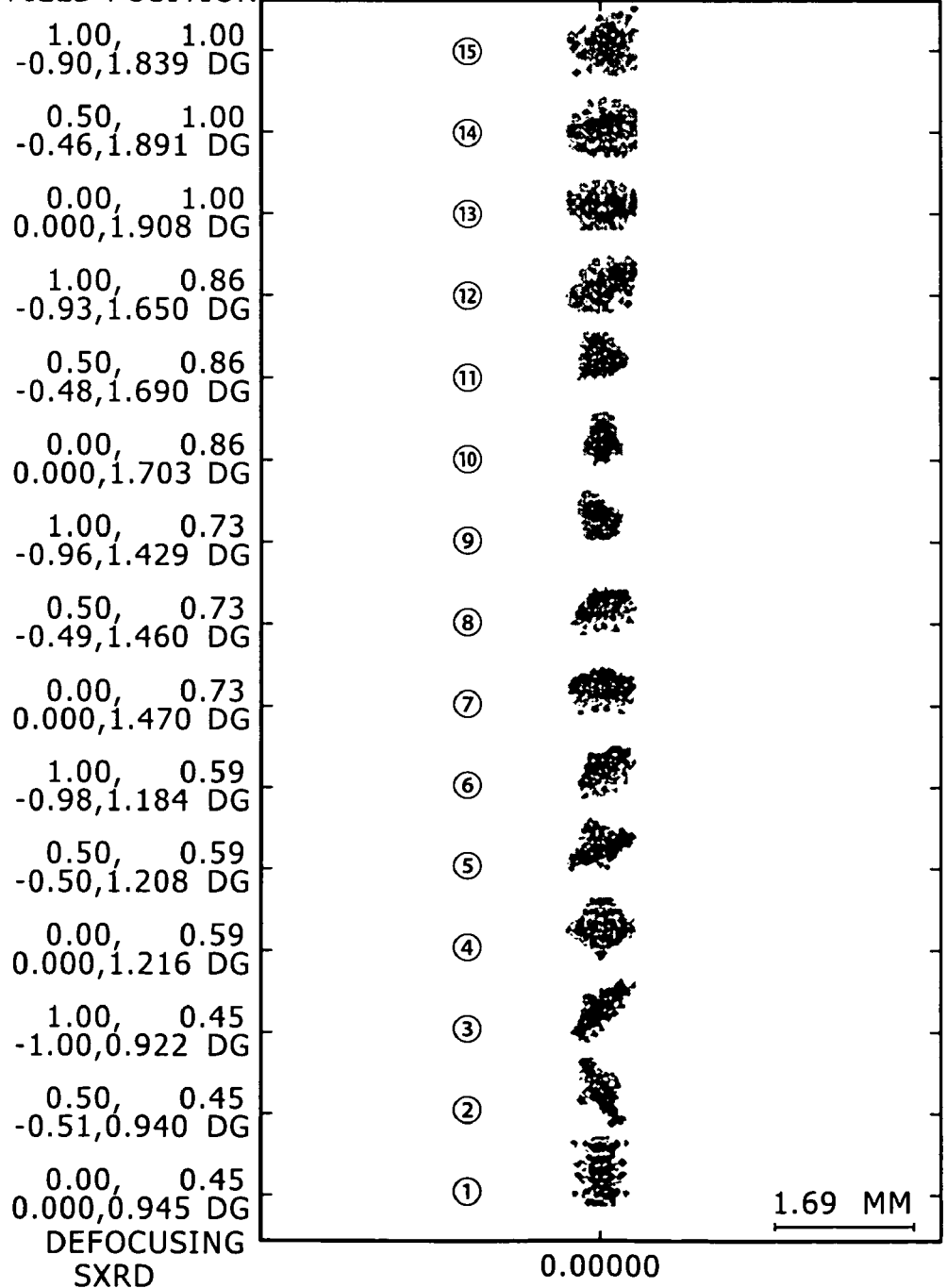
FIG. 23 is a spot diagram showing light radiated from the evaluation points shown in FIG. 22 onto a screen.
Figure 24:
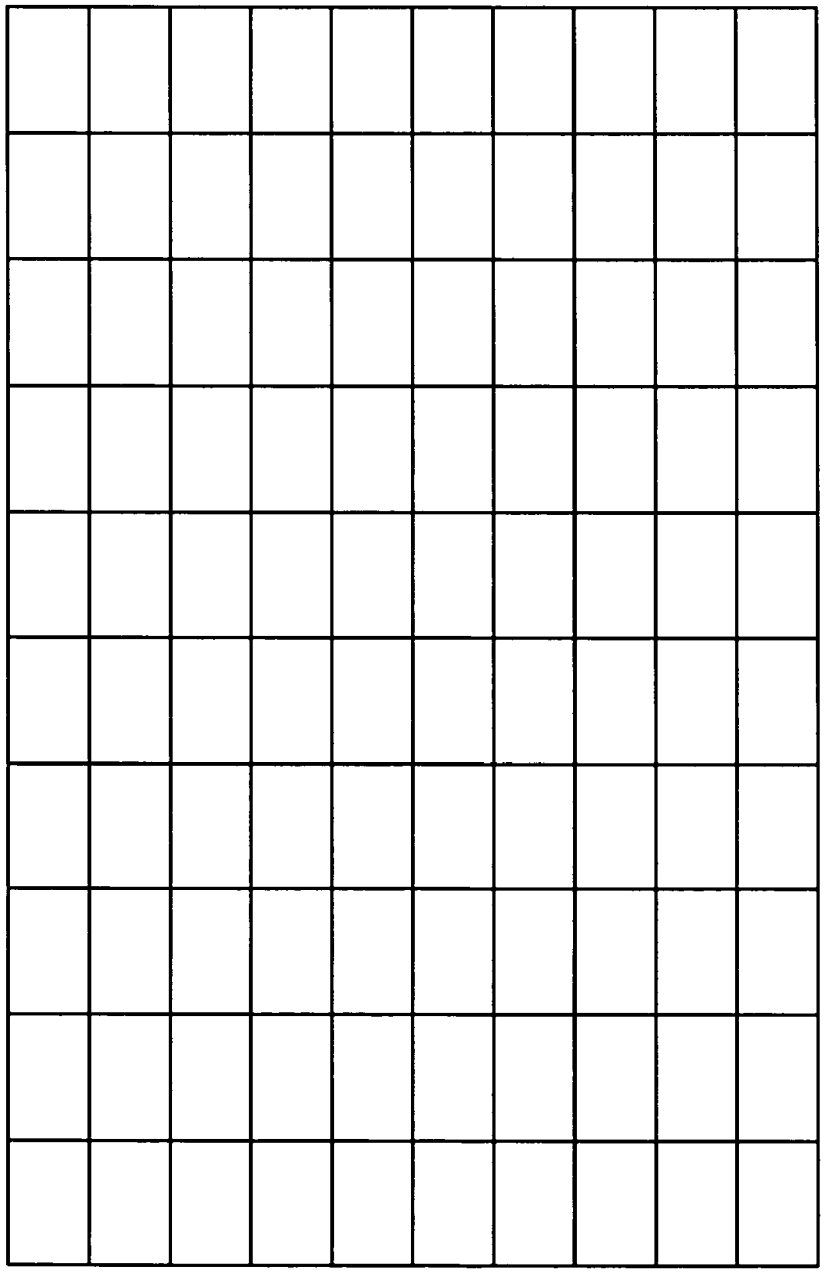
FIG. 24 shows distortion on the screen.

FIG. 23 shows a spot diagram for the projection optical system according to numeric value example 3. FIG. 24 shows distortion. Field angles (1) through (15) shown in the spot diagram are respectively generated from positions (1) through (15) on the image display element P3 shown in FIG. 22. Reference wavelengths are 656.28 nm, 620.0 nm, 587.56 nm, 546.07 nm, 460.0 nm, and 435.84 nm. The scale for FIG. 23 is twice as large as one pixel on the screen S3. As shown in FIG. 23, the sufficient image formation capability results. As shown in FIG. 24, no remarkable image distortion is found and the sufficient capability results.

Figure 25:
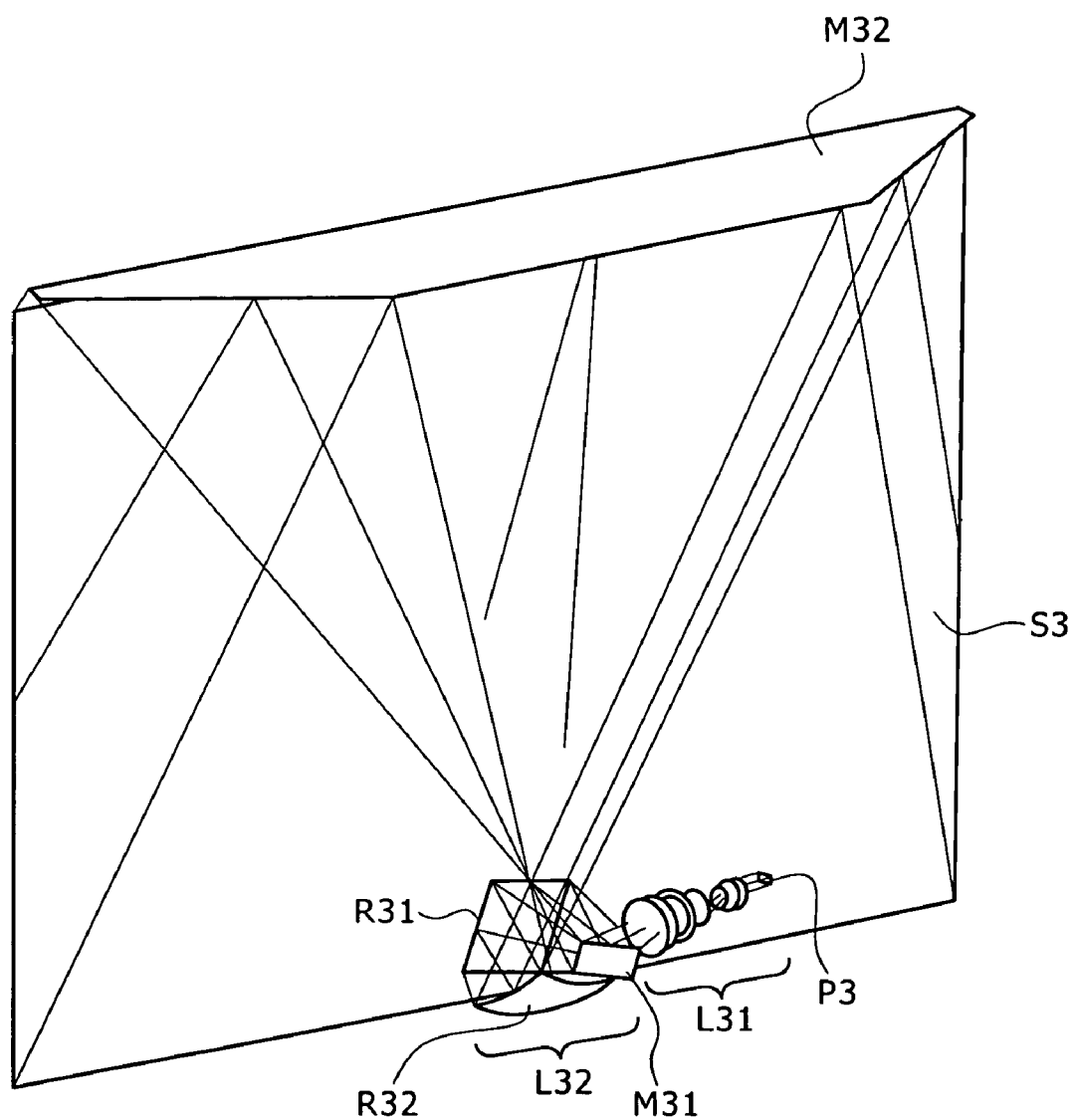
FIG. 25, as well as FIGS. 26 through 27, shows a configuration example of a rear projection television together with part of light trajectories and provides a perspective view, viewed from the rear of the screen.
Figure 26:
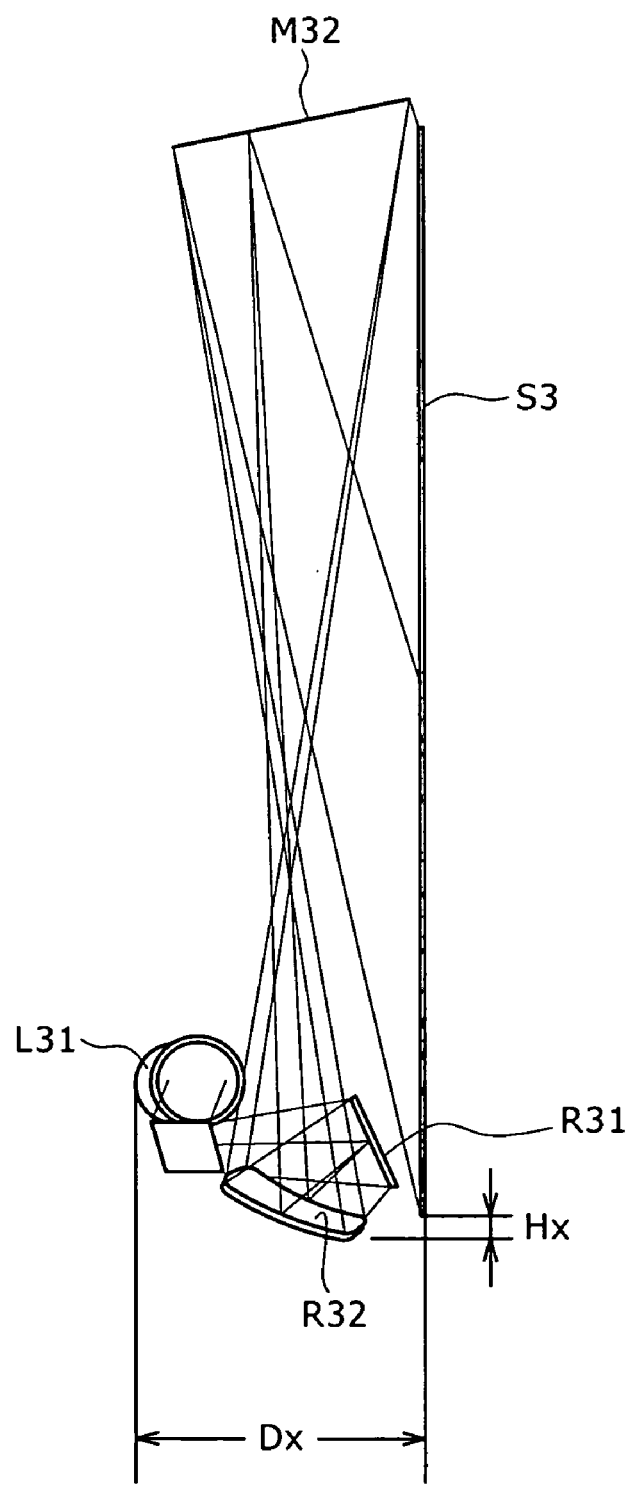
FIG. 26 is a side view.

To dispose the projection optical system according to numeric value example 3 inside the cabinet of the rear projection television, the projection optical system needs to be compacted by folding the light path on plane mirrors MM31 and MM32 as shown in FIGS. 25 and 26. FIGS. 25 and 26 show constructions of elaborately folding the light path by disposing the plane mirror MM32 between the projection optical system and the screen S3 and the plane mirror MM31 between the first optical system L31 and the second optical system L32. The light beam travels from the center of the primary image surface to the center of the secondary image surface and crosses the optical axis within a vertical plane. In this case, the plane mirror MM31 reflects the light beam between the first optical system and the concave reflector for the second optical system and deflects the light beam within a horizontal plane. When the projection optical system is disposed at the bottom of the cabinet, for example, the plane mirror MM32 is disposed at the top of the cabinet, reflects the light output from the projection optical system, and deflects the light so as to reach the screen S3.

Figure 27:
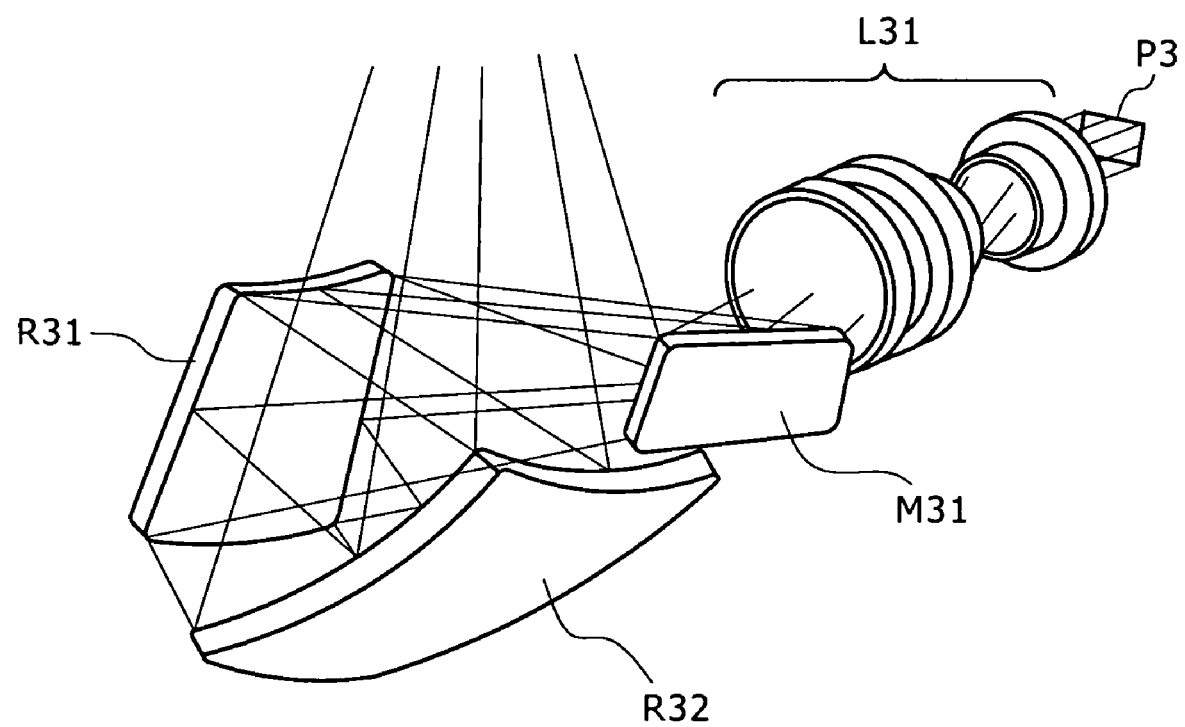
FIG. 27 is an enlarged perspective view showing the projection optical system.

FIG. 27 partially enlarges the projection optical system in FIGS. 25 and 26.

The projection-type image display apparatus according to the third embodiment is compacted by folding the light path using the plane mirrors MM31 and MM32. The invention is not limited to the above-mentioned method of folding the light path. For example, it may be preferable to dispose a plane mirror in the first optical system L31. Further, another plane mirror may be disposed between the plane mirror MM32 and the concave reflector R32.

FIG. 26 is a side view. In this manner, the plane mirrors M31 and M32 fold the light path. When the screen size is 73.1 inches with aspect ratio of 16:9, apparatus thickness (depth) Dx defined for only the optical system becomes smaller than or equal to 250 mm. When dimension Hx is assumed to be a height between the screen bottom and the lowest part of the second optical system L32, Hx becomes smaller than or equal to 50 mm. The display bottom portion can be made small. Further, we found the following as a result of examining the apparatus thickness and the dimension of the display bottom portion with respect to various screen sizes. When the screen size ranges from 46 to 73 inches with aspect ratio of 16:9, the apparatus thickness defined for only the optical system can become smaller than or equal to 250 mm. The height between the screen bottom and the lowest part of the second optical system L32 can be smaller than or equal to 50 mm. An actual apparatus may include this optical system and may be provided with mechanical parts such as a mirror and a cabinet. In such case, the apparatus can realize actual outside dimensions including the thickness of 300 mm or less and the display bottom portion (the height between the screen bottom and the lowest part of the projection optical system) of 100 mm or less.

The second optical system L32 forms a pupil (i.e., a portion where the light flux is converged) that forms an intermediate image for the first optical system L31 on the screen S3. The pupil is formed outside the light flux from the plane mirror M32 to the entire plane of the screen S3. When the projection optical system is disposed in this manner, it is possible to provide a shielding member (not shown, see FIG. 7) such as a shielding box between a light flux directed from the second optical system L32 to the plane mirror M32 and a light flux directed from the plane mirror M32 to the entire surface of the screen S3. The shielding member is provided with an approximately minimum light transmission aperture that allows the light flux directed to the screen S3 to pass through. The shielding member can protect the projection optical system (i.e., the first optical system L31 and the second optical system L32) against dust without blocking off the projected video light. Further, the shielding member blocks off outside light entering into the cabinet from the screen S3. For example, the shielding member can prevent the outside light from being reflected on the concave reflector or the like of the second optical system to become stray light and degrade the contrast of the video projected on the screen S3. The above-mentioned shield effect of the shielding member can be also applied to a fourth embodiment. A similar effect can be applied to projection-type image display apparatuses using projection optical systems according to the fifth to ninth embodiments.

FOURTH EMBODIMENT

Figure 28:
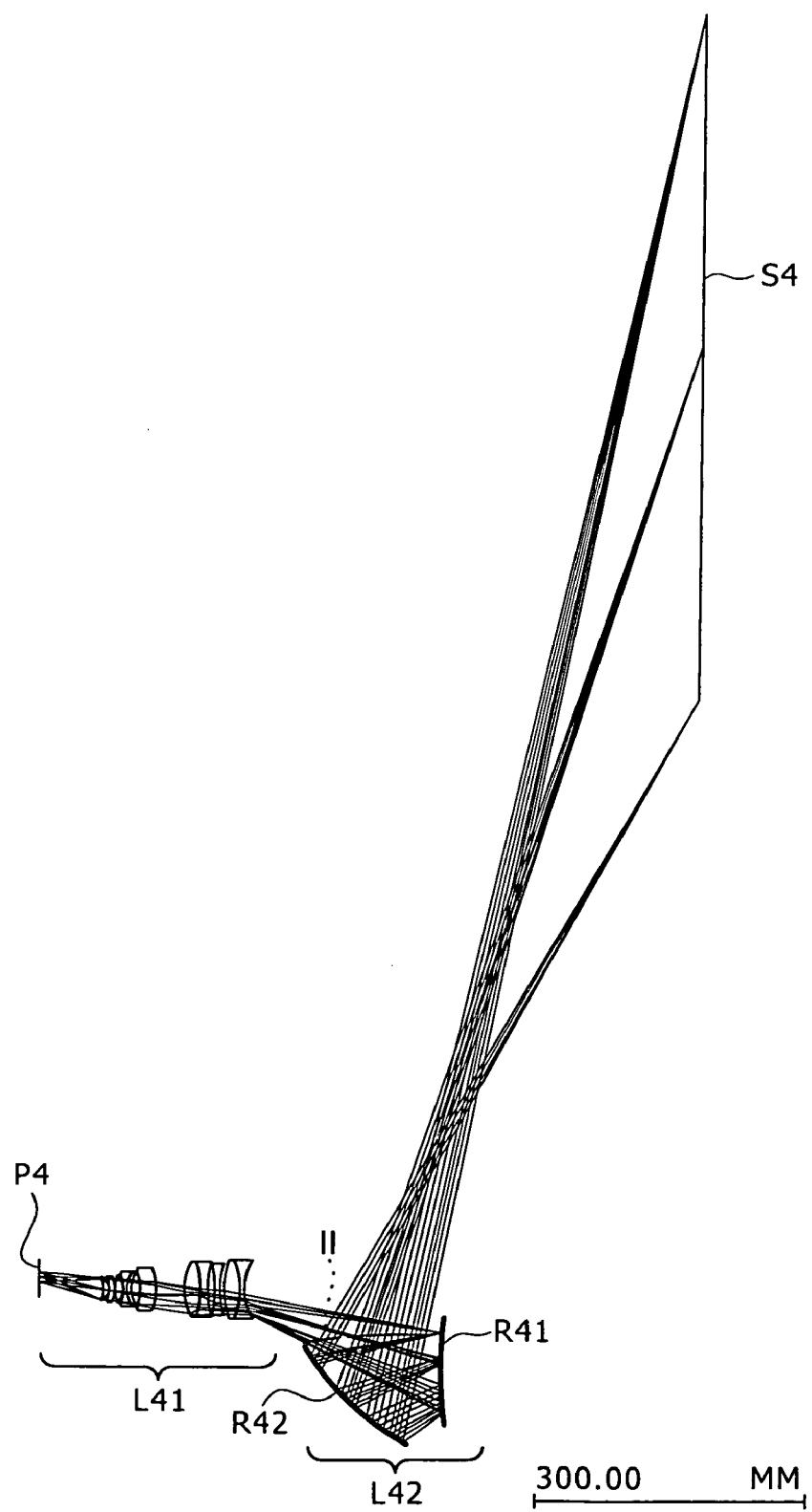
FIG. 28, as well as FIGS. 29 through 35, shows a fourth embodiment and outlines a projection optical system used for a projection-type image display apparatus.
Figure 29:
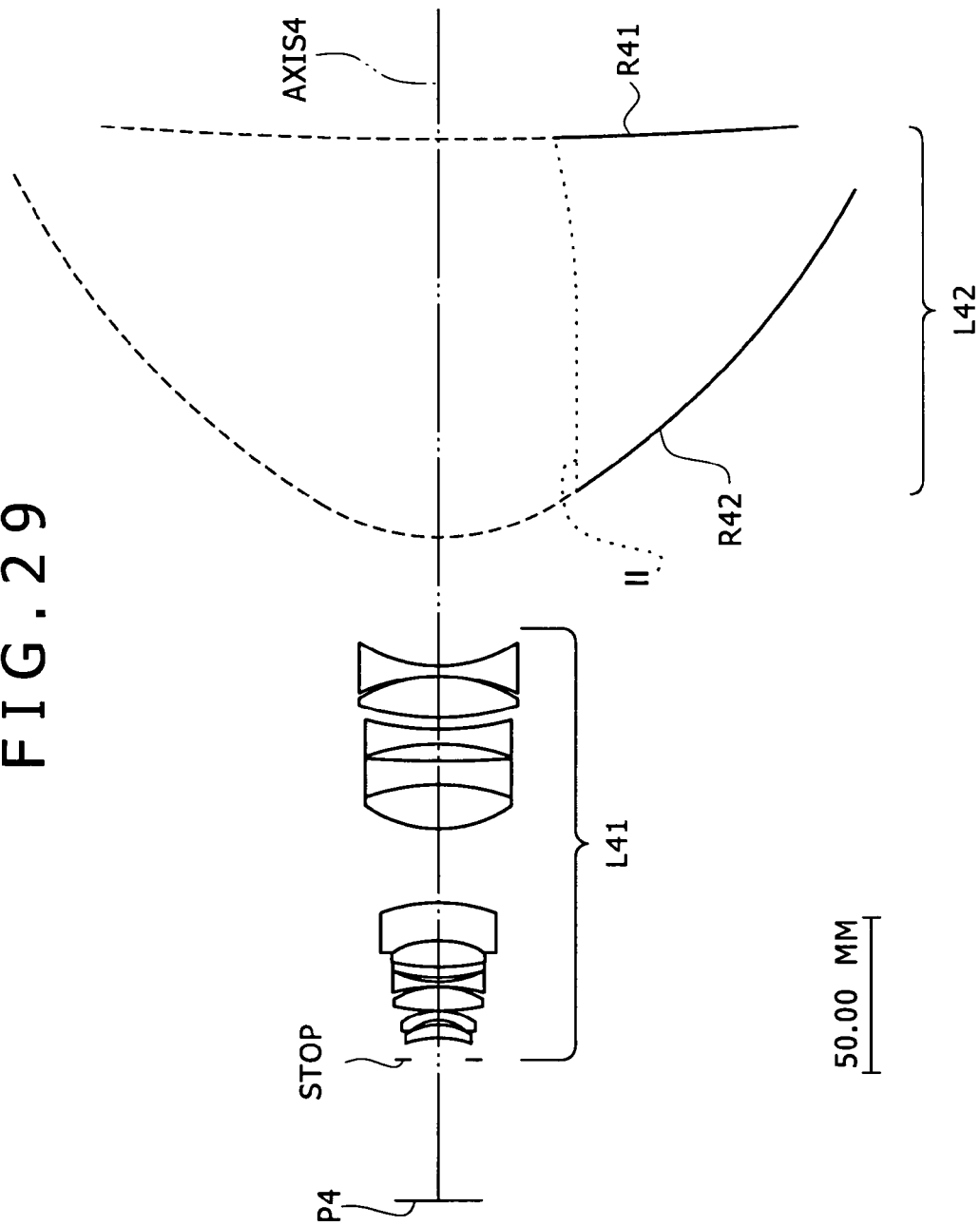
FIG. 29 is an enlarged view of the projection optical system.

FIG. 28 outlines the entire optical system of a projector (projection-type image display apparatus) using the projection optical system according to a fourth embodiment of the invention. FIG. 29 shows an enlarged view of the projection optical system.

In the diagram illustrating the fourth embodiment, P4 denotes an image display element. A primary image surface is formed on the image display element P4. The image display element P4 can represent a digital micro mirror device (DMD). STOP denotes a diaphragm. While the projector needs an illumination optical system to illuminate the image display element P4, the illumination optical system is omitted from FIGS. 28, 29, and the other diagrams showing the fourth embodiment.

L41 denotes a first optical system composed of a refracting optical element. L42 denotes a second optical system composed of reflectors R41 and R42. The projection optical system is composed of the first optical system L41 and the second optical system L42 and guides the light (primary image surface) image-modulated by the image display element P4 to the screen S4 to form an image (secondary image surface) on the screen S4. The first optical system L41 forms an intermediate image at position II in FIGS. 28 and 29. The image is then reflected on reflectors R41 and R42 to form a pupil image that is then formed on the screen S4. As shown in FIG. 29, the respective optical surfaces of the projection optical system are rotationally symmetric about an optical axis AXIS4. In FIG. 29, a broken line indicates an unused and therefore removed part of the reflectors R41 and R42 of the second optical system L42.

Table 5 shows data for numeric value example 4 of applying specific numeric values to the projection optical system according to the fourth embodiment.

TABLE 5

| F number | F/3.0 | | |
|---|---|---|---|
| Inch size | 50" | | |

| | Curvature radius | Interval | Glass (e-line refractive index/Abbe number) |
|---|---|---|---|
| Display element surface | INF | 54 | |
| Diaphragm | INF | 2.000 | |
| 1 | −52.65808 | 5.807 | 1.67000/47.97 |
| 2 | −23.18766 | 0.937 | |
| 3 | −20.50806 | 3.000 | 1.63003/35.48 |
| 4 | −36.35509 | 0.100 | |
| 5 | 60.64965 | 8.053 | 1.49845/81.20 |
| 6 | −33.07412 | 0.100 | |
| 7 | −58.53481 | 3.000 | 1.51978/51.85 |
| 8 | 41.88391 | 0.249 | |
| 9 | 45.54872 | 3.341 | 1.76167/27.31 |
| 10 | 52.75286 | 0.576 | |
| 11 | 69.66878 | 8.817 | 1.49845/81.20 |
| 12 | −32.45941 | 1.122 | |
| 13 | −26.48920 | 12.000 | 1.52033/58.69 |
| 14 | −87.21177 | 26.181 | |
| 15 | 46.33716 | 14.214 | 1.62286/60.10 |
| 16 | −89.13615 | 0.500 | |
| 17 | −84.27186 | 8.911 | 1.67764/31.92 |
| 18 | 185.40020 | 4.858 | |
| 19 | −81.21411 | 5.232 | 1.69416/30.92 |
| 20 | 58.72757 | 5.160 | |
| 21 | 92.26113 | 13.991 | 1.76167/27.31 |
| 22 | −51.22638 | 0.100 | |

TABLE 5-continued

| | | | | |
|---|---|---|---|---|
| 23 | | −60.90220 | 3.000 | 1.52033/58.69 |
| 24 | | 47.28213 | 183.365 | |
| 25 | Aspheric surface | 100.00000 | −140.000 | Reflector (first mirror) |
| 26 | Aspheric surface | 69.81598 | 368.158 | Reflector (second mirror) |
| Projected image surface | | INF | | |

| Aspheric coefficient for surface 25 | | | | |
|---|---|---|---|---|
| K | −3.53735e+006 | | | |
| A4 | −2.02633e−009 | A6  1.58657e−012 | A8  −8.56678e−017 | A10  1.46304e−021 |

| Aspheric coefficient for surface 26 | | | | |
|---|---|---|---|---|
| K | −2.34164e+000 | | | |
| A4 | 1.07990e−007 | A6  −3.97824e−012 | A8  1.26325e−016 | A10  −1.14881e−021 |

A DMD is used as the image display element P4 that has an aspect ratio of 16:9, contains 1280×768 pixels, and sizes to 0.7 inches. The image display element P4 is enlarged to 50 inches for projection on the screen S4. The F number is 3. The pixel size is approximately 12 μm on the image display element P4 and approximately 0.86 mm on the screen. A diaphragm STOP is provided between the image display element P4 and the projection optical system. ON light is reflected on the image display element P4, passes through the diaphragm STOP and the projection optical system, and then reaches the screen S4. The diaphragm STOP interrupts OFF light. The ON light passes through the diaphragm STOP and enters the refracting optical system L41 to form an intermediate image at the position II in FIGS. 28 and 10. The ON light is then reflected on the reflectors R41 and R42 to form a pupil image on the screen.

Figure 30:
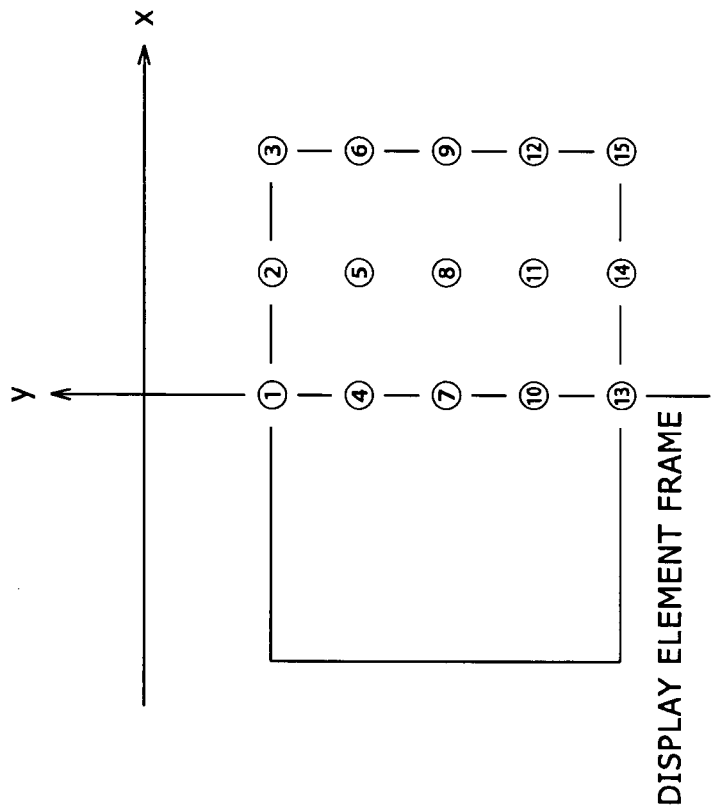
FIG. 30 shows evaluation points on an image display element.
Figure 31:
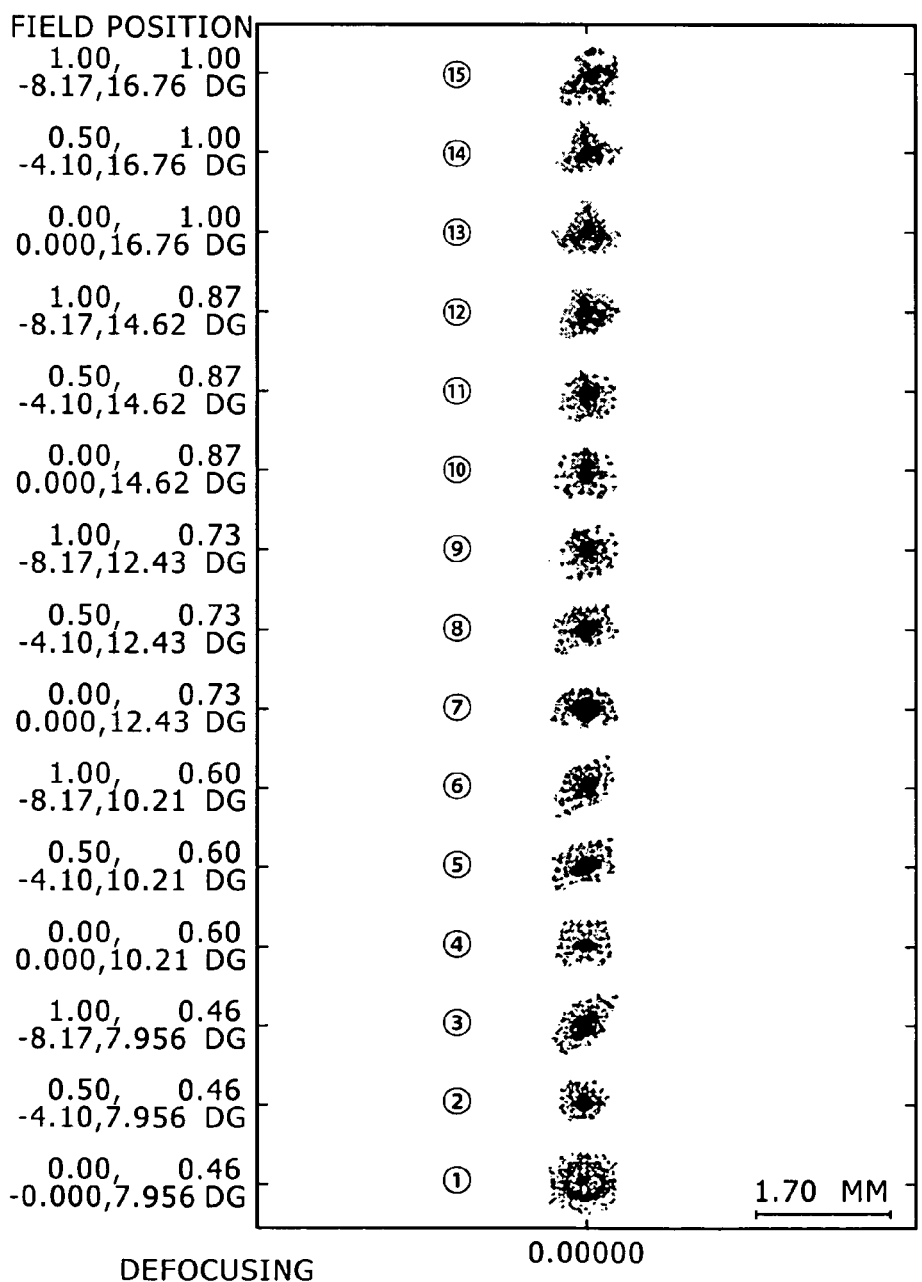
FIG. 31 is a spot diagram showing light radiated from the evaluation points shown in FIG. 30 onto a screen.
Figure 32:
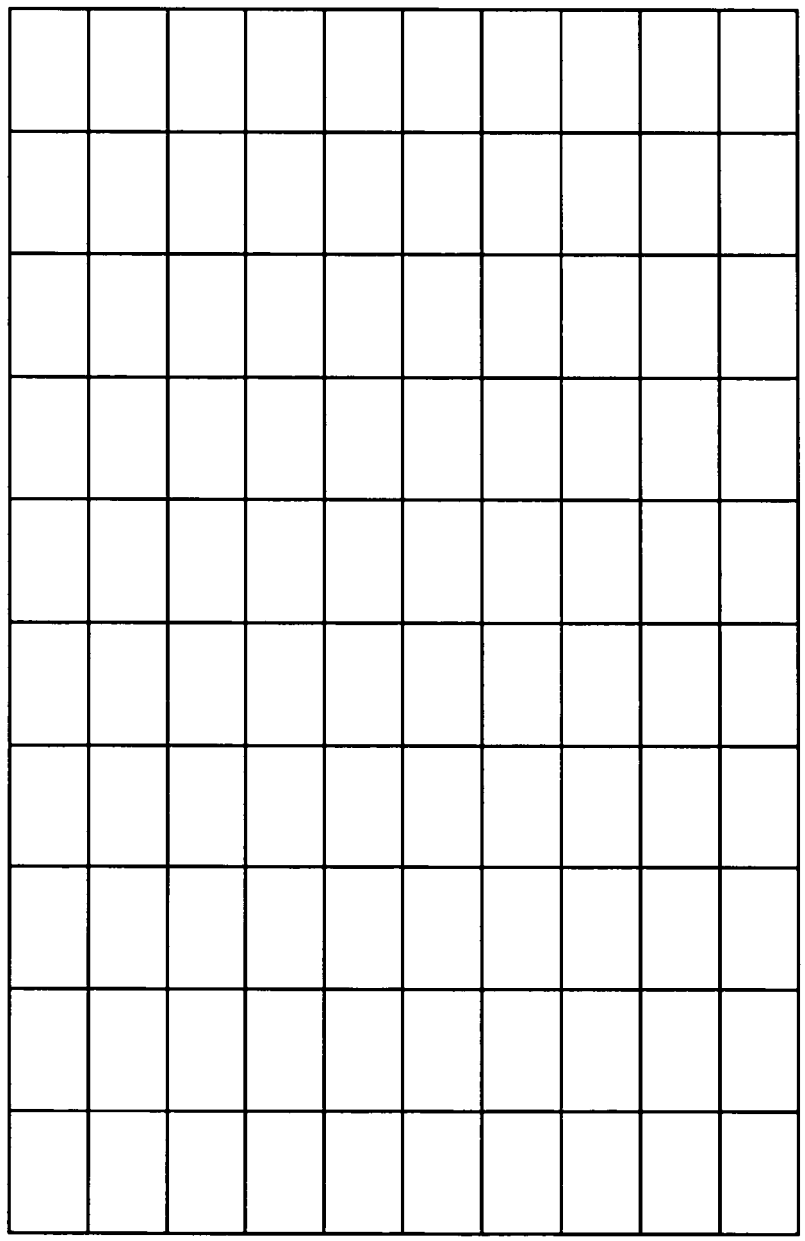
FIG. 32 shows distortion on the screen.

FIG. 31 shows a spot diagram for the projection optical system according to numeric value example 4. FIG. 32 shows distortion. Field angles (1) through (15) shown in the spot diagram are respectively generated from positions (1) through (15) on the image display element P4 shown in FIG. 30. Reference wavelengths are 656.28 nm, 620.0 nm, 587.56 nm, 546.07 nm, 460.0 nm, and 435.84 nm. The scale for FIG. 31 is twice as large as one pixel on the screen. As shown in FIG. 31, the sufficient image formation capability results. As shown in FIG. 32, no remarkable image distortion is found and the sufficient capability results.

Figure 33:
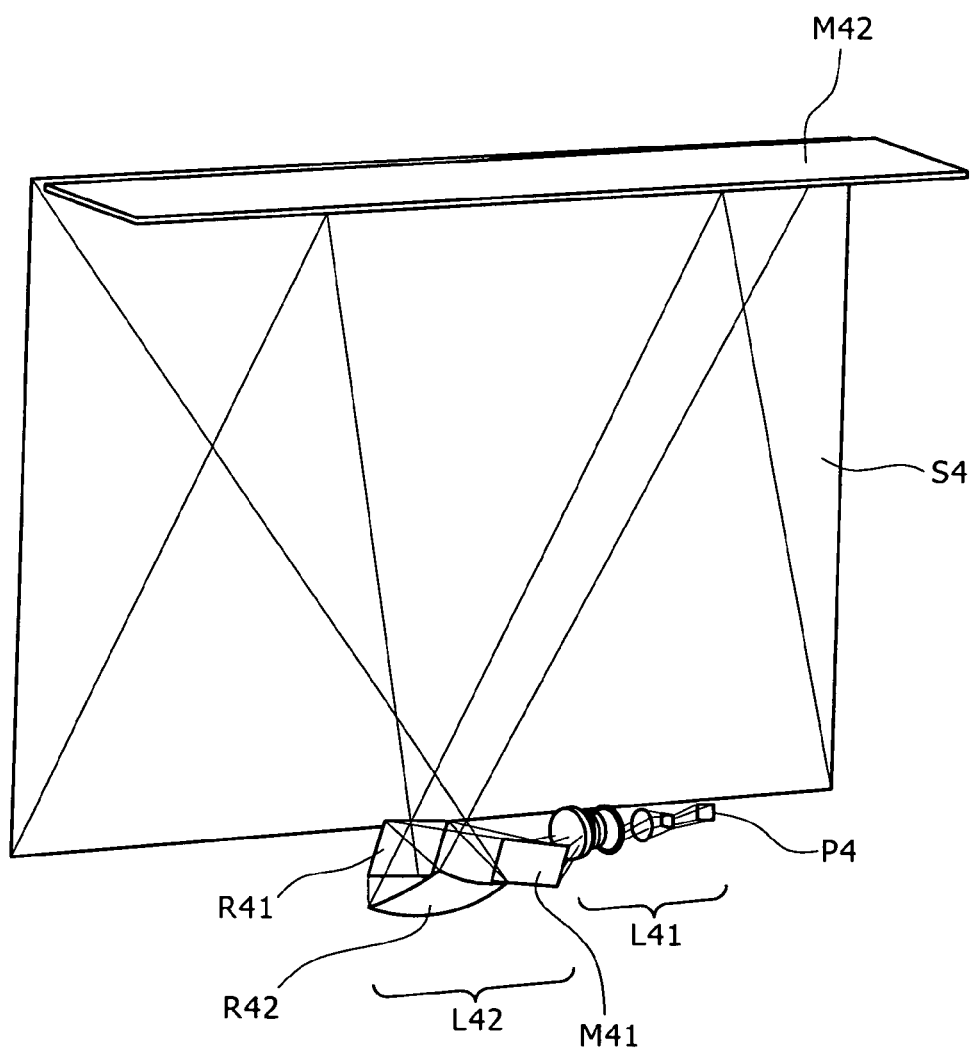
FIG. 33, as well as FIGS. 34 and 35, shows a configuration example of a rear projection television together with part of light trajectories and provides a perspective view, viewed from the rear of the screen.
Figure 34:
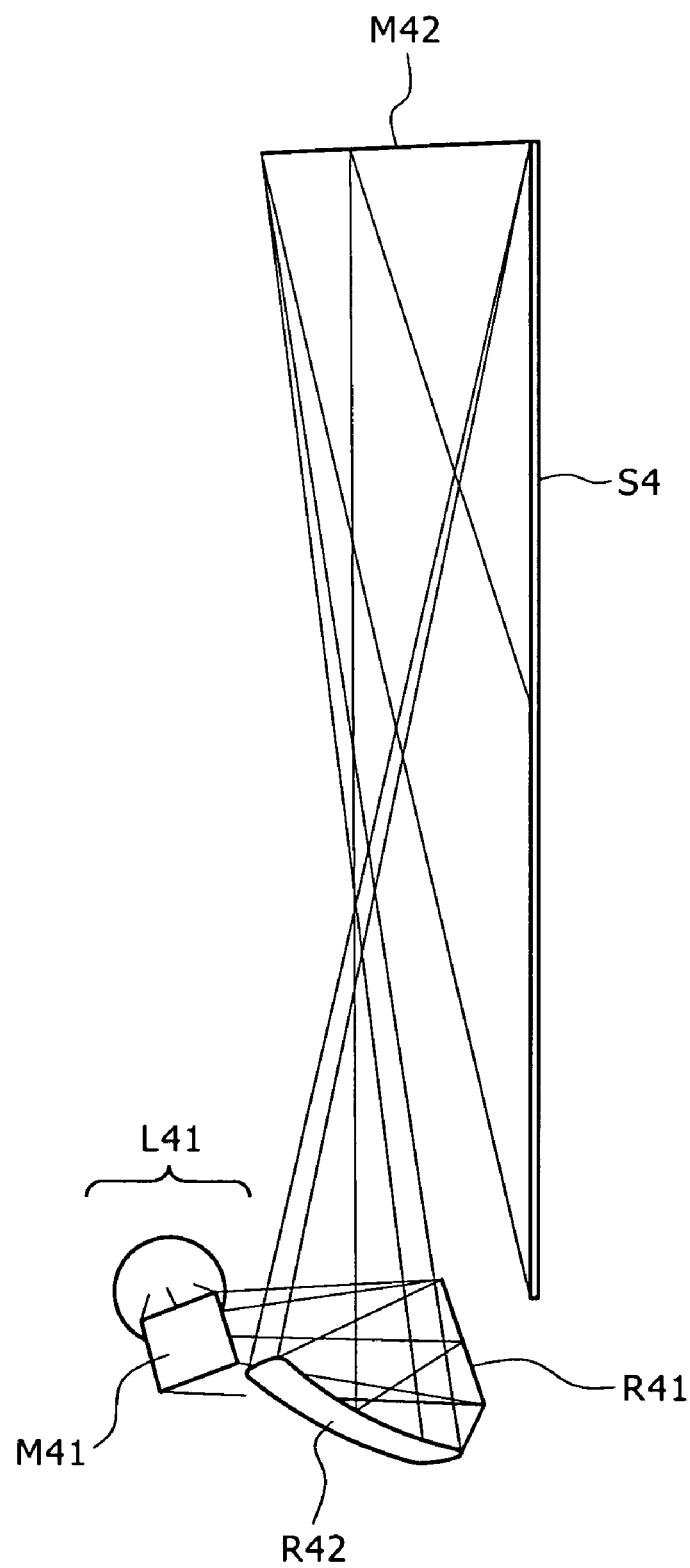
FIG. 34 is a side view.
Figure 35:
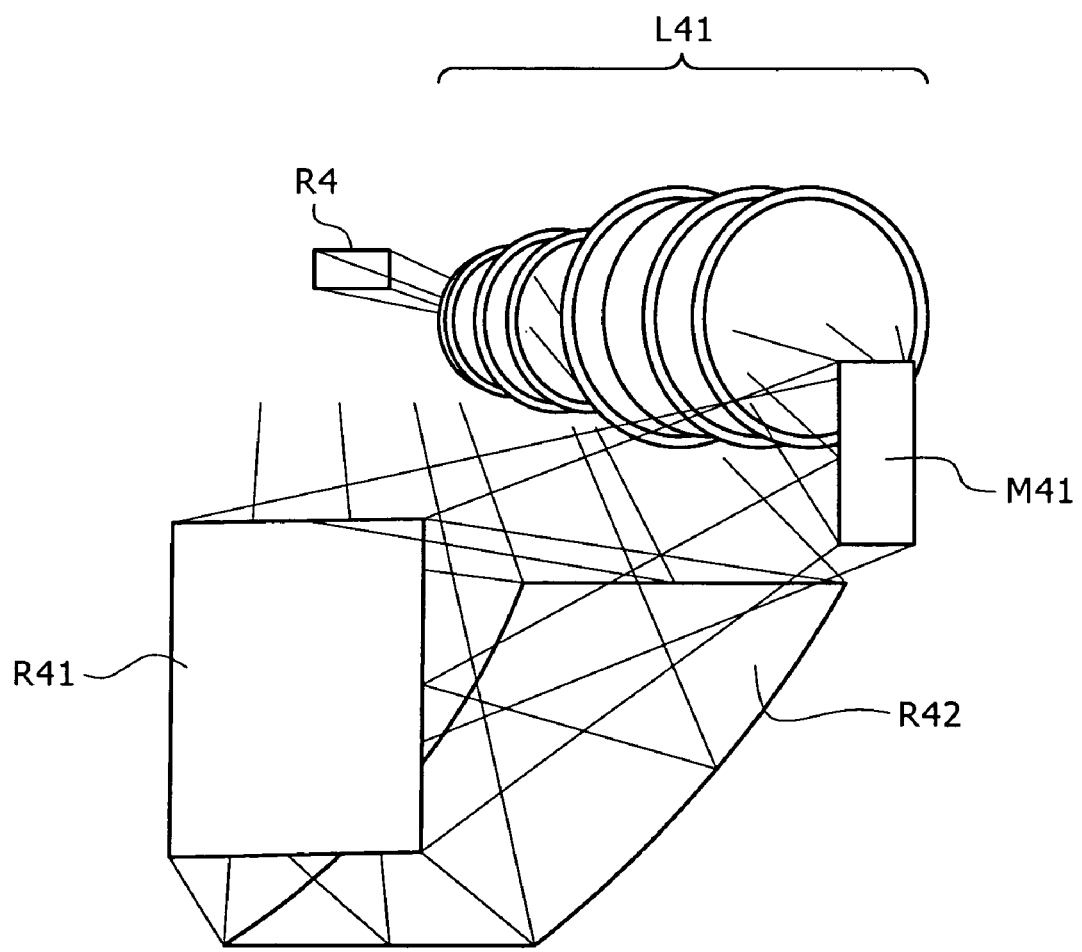
FIG. 35 is an enlarged perspective view showing the projection optical system.

To dispose the projection optical system according to numeric value example 4 inside the cabinet of the rear projection television, the projection optical system needs to be compacted by folding the light path on plane mirrors M41 and M42 as shown in FIGS. 33 and 34. FIGS. 33 and 34 show constructions of elaborately folding the light path by disposing the plane mirror M42 between the projection optical system and the screen S4 and the plane mirror M41 between the first optical system L41 and the second optical system L42. FIG. 34 is a side view. Since the plane mirrors M41 and M42 are used to fold the light path in this manner, the apparatus thickness can be 250 mm or less and the display bottom portion can be small. FIG. 35 partially enlarges the projection optical system in FIGS. 33 and 34. The projection-type image display apparatus according to the fourth embodiment is compacted by folding the light path using the plane mirrors M41 and M42. The invention is not limited to the above-mentioned method of folding the light path. For example, it may be preferable to dispose a plane mirror in the first optical system L41. Further, another plane mirror can be disposed between the plane mirror M42 and the concave reflector R42.

FIFTH EMBODIMENT

Figure 36:
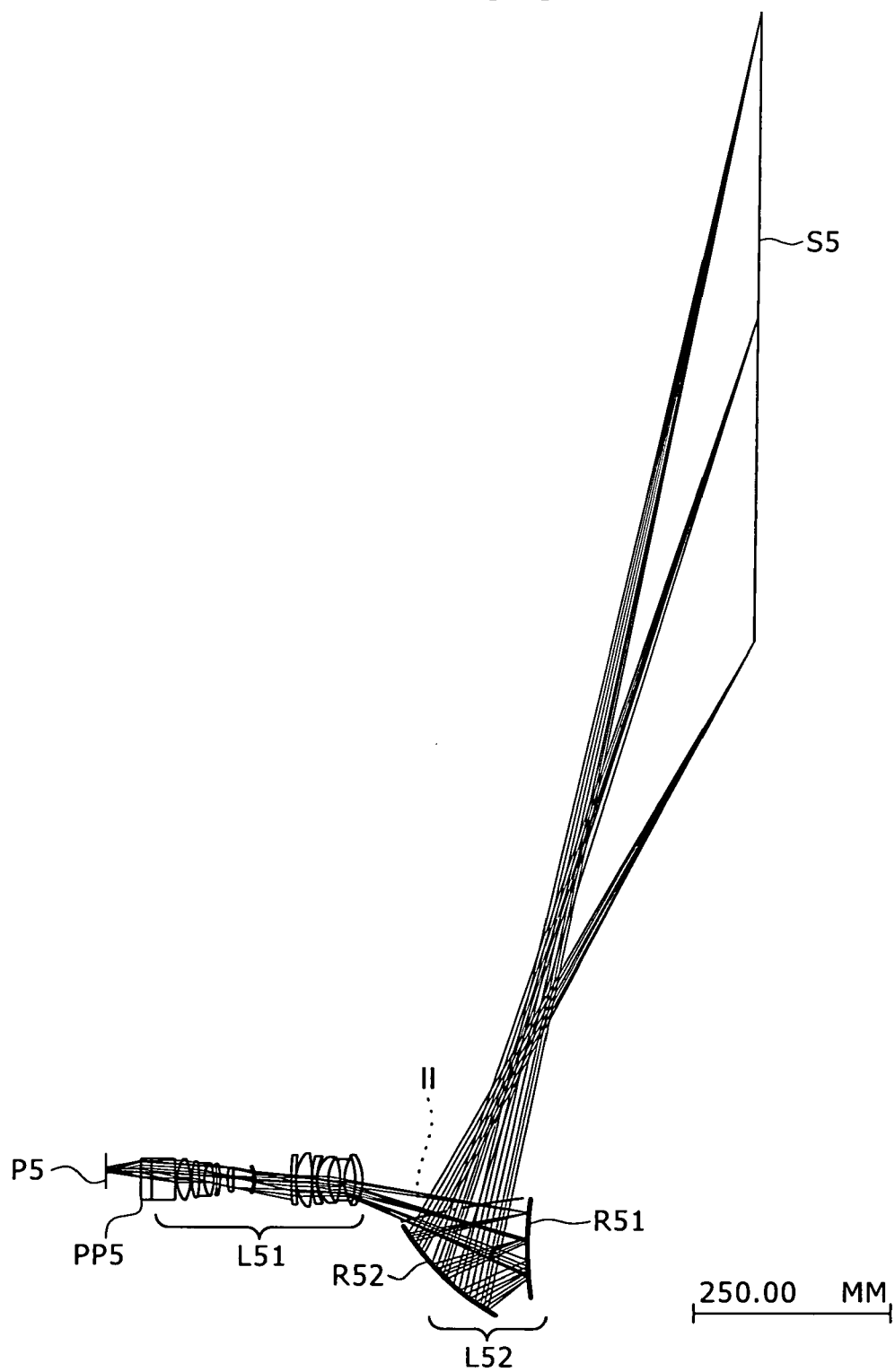
FIG. 36, as well as FIGS. 37 through 40, shows a fifth embodiment and outlines a projection optical system used for a projection-type image display apparatus.
Figure 37:
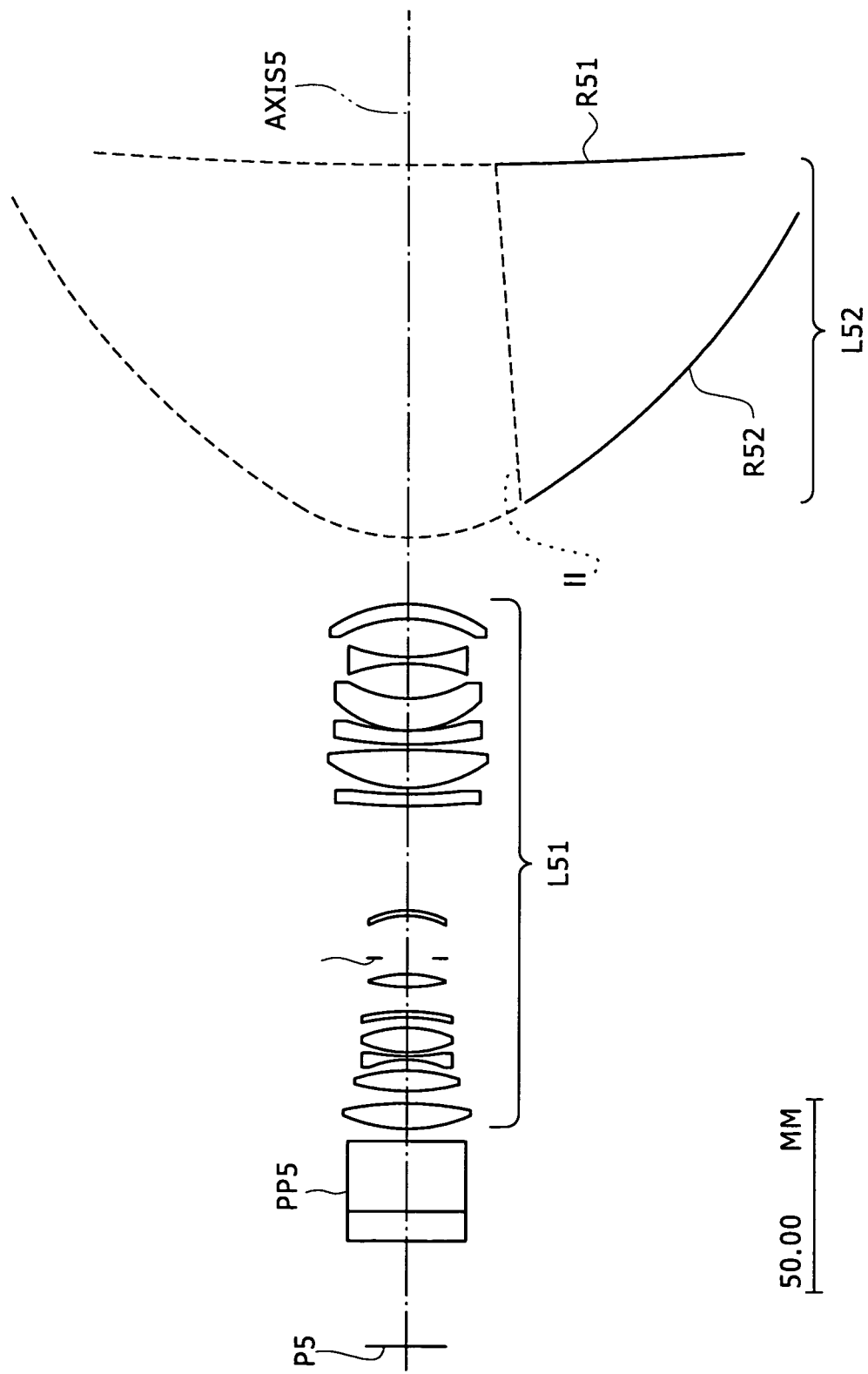
FIG. 37 is an enlarged view of the projection optical system.

FIG. 36 outlines the entire optical system of a projector (projection-type image display apparatus) using the projection optical system according to a fifth embodiment of the invention. FIG. 37 shows an enlarged view of the projection optical system.

In the diagram illustrating the fifth embodiment, P5 denotes an image display element. The image display element P5 forms the primary image surface. The image display element P5 can represent a reflective dot-matrix liquid crystal panel, a digital micro mirror device (DMD), and the like. In the diagram, PP5 denotes a polarizing beam splitter (PBS), a dichroic prism, a TIR (Total Internal Reflector) prism, and the like. STOP denotes a diaphragm. While the projector needs an illumination optical system to illuminate the image display element P5, the illumination optical system is omitted from FIGS. 36 and 37.

L51 denotes a first optical system composed of a refracting optical element. L52 denotes a second optical system composed of reflectors R51 and R52. The projection optical system is composed of the first optical system L51 and the second optical system L52 and guides the light (primary image surface) image-modulated by the image display element P5 to the screen S5 to form an image (secondary image surface) on the screen S5. The first optical system L51 forms an intermediate image at position II in FIGS. 36 and 37. The image is then reflected on reflectors R51 and R52 to form a pupil image that is then formed on the screen S5. As shown in FIG. 37, the respective optical surfaces of the projection optical system are rotationally symmetric about an optical axis AXIS5. In FIG. 37, a broken line indicates an unused and therefore removed part of the reflectors R51 and R52 of the second optical system L52.

Table 6 shows data for numeric value example 5 of applying specific numeric values to the projection optical system according to the fifth embodiment.

TABLE 6

| | | Curvature radius | Interval | Glass (e-line refractive index/Abbe number) |
|---|---|---|---|---|
| Display element surface | | INF | 1.400 | |
| 1 | | INF | 20.700 | |
| 2 | | INF | 12.000 | 1.83962/42.8 |
| 3 | | INF | 27.300 | 1.51872/64.0 |
| 4 | | INF | 6.050 | |
| 5 | | 50.01335 | 12.300 | 1.49845/81.2 |
| 6 | | −102.48537 | 3.027 | |
| 7 | | 69.66588 | 8.000 | 1.49845/81.2 |
| 8 | | −102.39250 | 4.516 | |
| 9 | | −49.22953 | 1.810 | 1.81184/33.0 |
| 10 | | 57.85879 | 1.068 | |
| 11 | | 36.59180 | 10.025 | 1.49845/81.2 |
| 12 | | −44.14826 | 5.030 | |
| 13 | | −35.10091 | 1.510 | 1.81184/33.0 |
| 14 | | −109.43158 | 10.879 | |
| 15 | | 125.64456 | 4.259 | 1.85505/23.6 |
| 16 | | −92.16590 | 6.182 | |
| Diaphragm | | INF | 17.304 | |
| 17 | | −25.90402 | 1.800 | 1.83962/42.8 |
| 18 | | −35.06784 | 43.616 | |
| 19 | Aspheric surface | 59.62194 | 5.000 | 1.51131/56.4 |
| 20 | Aspheric surface | 61.51696 | 1.000 | |
| 21 | | 51.89543 | 15.200 | 1.59142/61.0 |
| 22 | | −573.87162 | 3.000 | |
| 23 | | 163.59945 | 5.117 | 1.81263/25.3 |
| 24 | | 72.87238 | 0.300 | |
| 25 | | 38.56059 | 13.000 | 1.67340/46.9 |
| 26 | | 46.24911 | 13.439 | |
| 27 | | −77.70400 | 2.470 | 1.80831/46.3 |
| 28 | | 50.57931 | 15.590 | |
| 29 | | −62.19532 | 7.955 | 1.81081/40.5 |
| 30 | | −49.34022 | 171.604 | |
| 31 | Aspheric surface | 1.01174E−05 | −149.000 | Reflector (first mirror) |
| 32 | Aspheric surface | 72.72183 | 387.172 | Reflector (second mirror) |
| Projected image surface | | INF | | |

Aspheric coefficient for surface 19

| K | −1.420362 | | | | | | |
|---|---|---|---|---|---|---|---|
| A4 | −0.131048E−04 | A6 | 0.526113E−08 | A8 | 0.345041E−12 | A10 | 0.611802E−16 |

Aspheric coefficient for surface 20

| K | −6.286742 | | | | | | |
|---|---|---|---|---|---|---|---|
| A4 | −0.104735E−04 | A6 | 0.572168E−08 | A8 | −0.880556E−12 | A10 | 0.356875E−15 |

Aspheric coefficient for surface 31

| K | −28531.19104 | | | | | | |
|---|---|---|---|---|---|---|---|
| A4 | −0.523359E−07 | A6 | 0.157209E−10 | A8 | −0.172128E−14 | A10 | 0.101543E−18 |
| A12 | −0.309504E−23 | A14 | 0.381546E−28 | | | | |

Aspheric coefficient for surface 32

| K | −2.417695 | | | | | | |
|---|---|---|---|---|---|---|---|
| A4 | 0.116220E−06 | A6 | −0.588887E−11 | A8 | 0.248721E−15 | A10 | −0.212607E−20 |
| A12 | −0.170341E−24 | A14 | 0.475557E−29 | | | | |

According to numeric value example 5, the image display element P5 has an aspect ratio of 16:9, contains 1920×1080 pixels, and sizes to 0.61 inches. The image display element P5 is enlarged to 55.8 inches for projection. The F number is 3.0. The pixel size is approximately 7 μm on the image display element P5 and approximately 0.64 mm on the screen S5.

Figure 38:
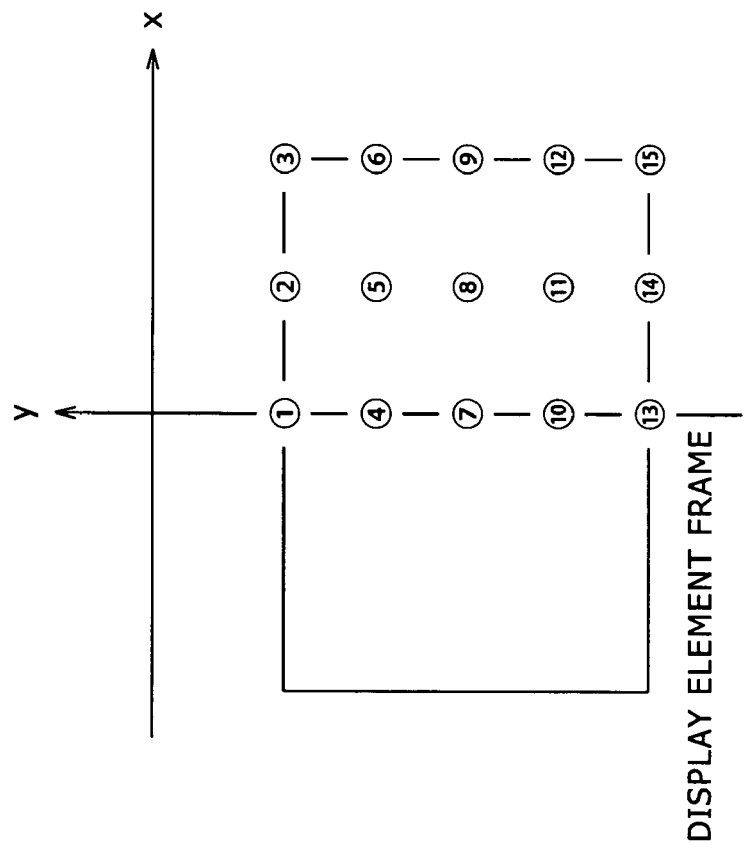
FIG. 38 shows evaluation points on an image display element.
Figure 39:
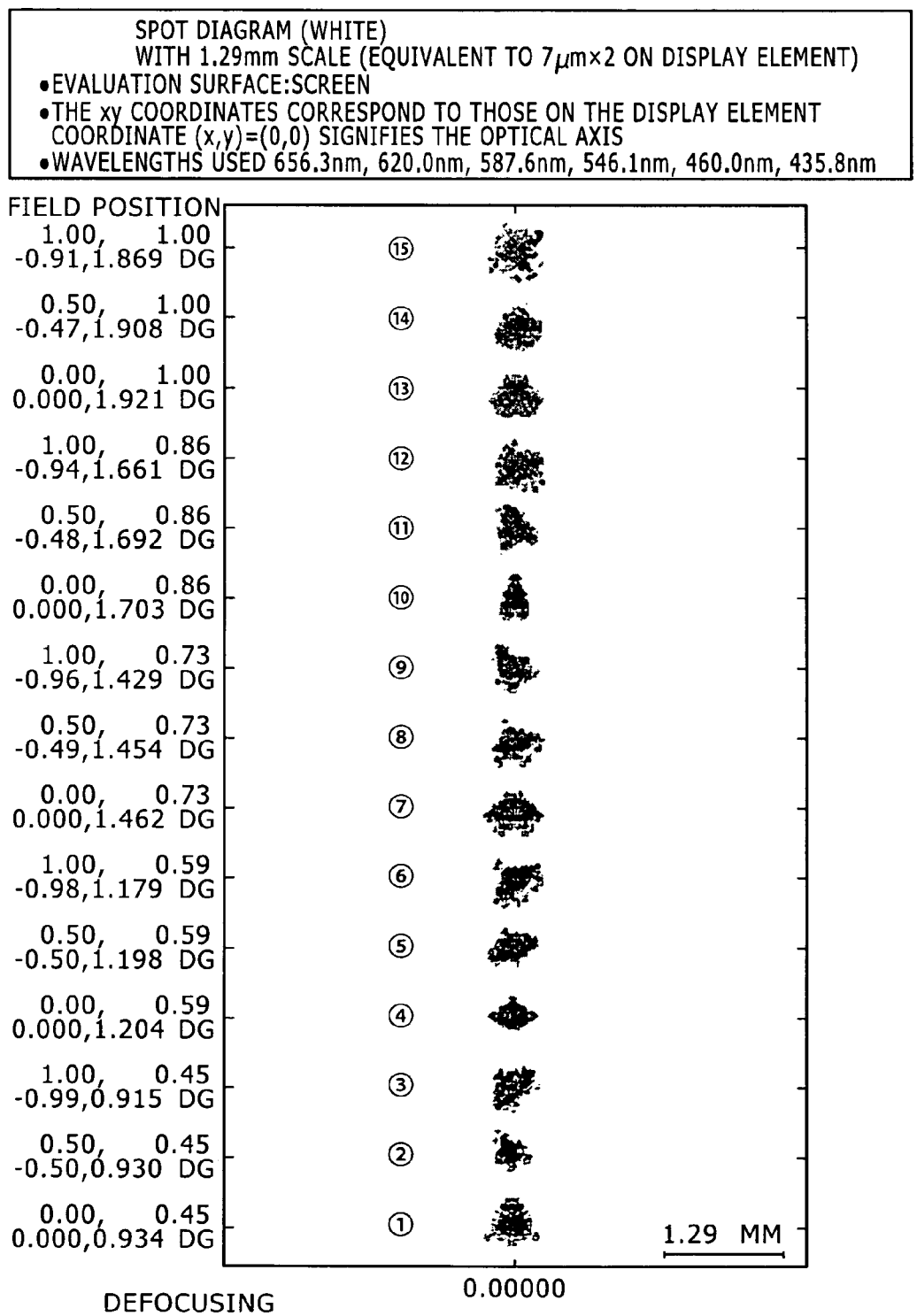
FIG. 39 is a spot diagram showing light radiated from the evaluation points shown in FIG. 38 onto a screen.
Figure 40:
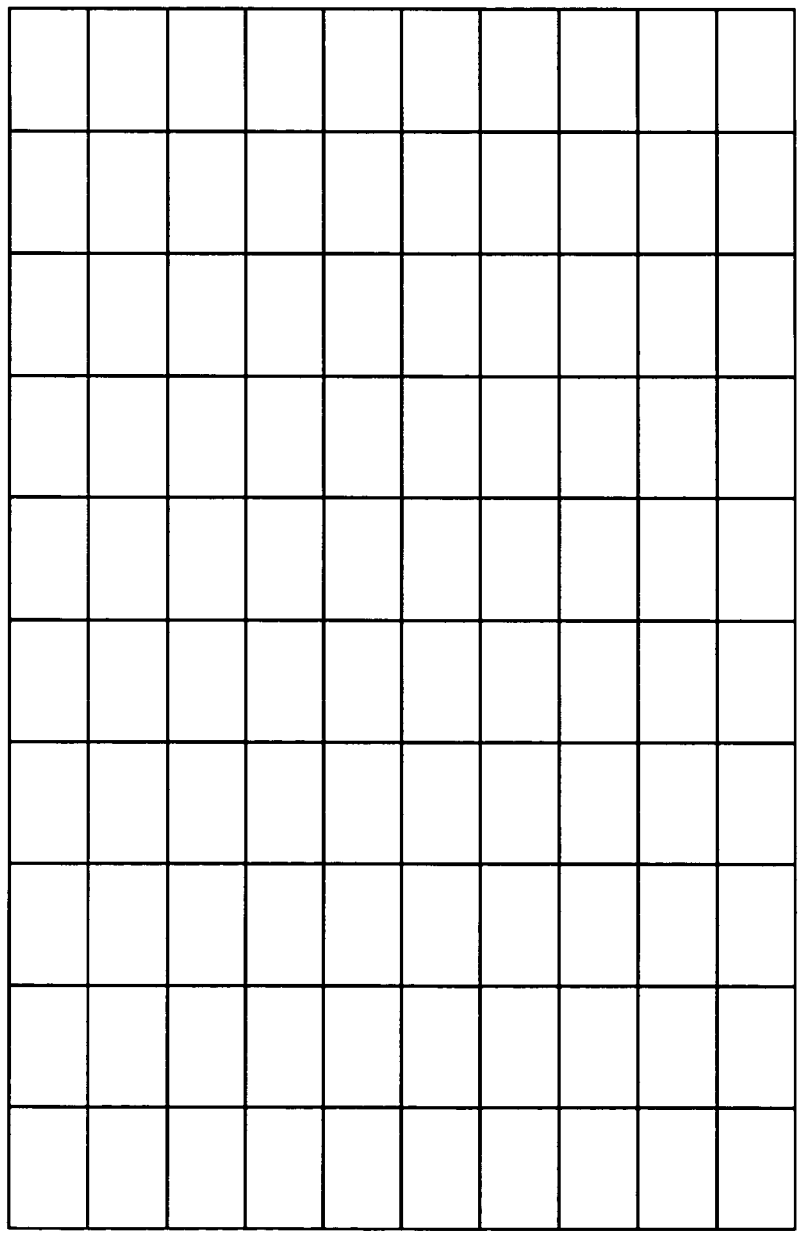
FIG. 40 shows distortion on the screen.

FIG. 39 shows a spot diagram for the projection optical system according to numeric value example 5. FIG. 40 shows distortion. Field angles (1) through (15) shown in the spot diagram are respectively generated from positions (1) through (15) on the image display element P5 shown in FIG. 38. Reference wavelengths are 656.28 nm, 620.0 nm, 587.56 nm, 546.07 nm, 460.0 nm, and 435.84 nm. The scale for FIG. 39 is twice as large as one pixel on the screen S5. As shown in FIG. 39, the sufficient image formation capability results. As shown in FIG. 40, no remarkable image distortion is found and the sufficient capability results.

When the projection optical system according to the fifth embodiment is applied to a projector (projection-type image display apparatus), the projection optical system can be slimed by disposing plane mirrors at appropriate positions similarly to the above-mentioned first and fourth embodiments.

SIXTH EMBODIMENT

Figure 41:
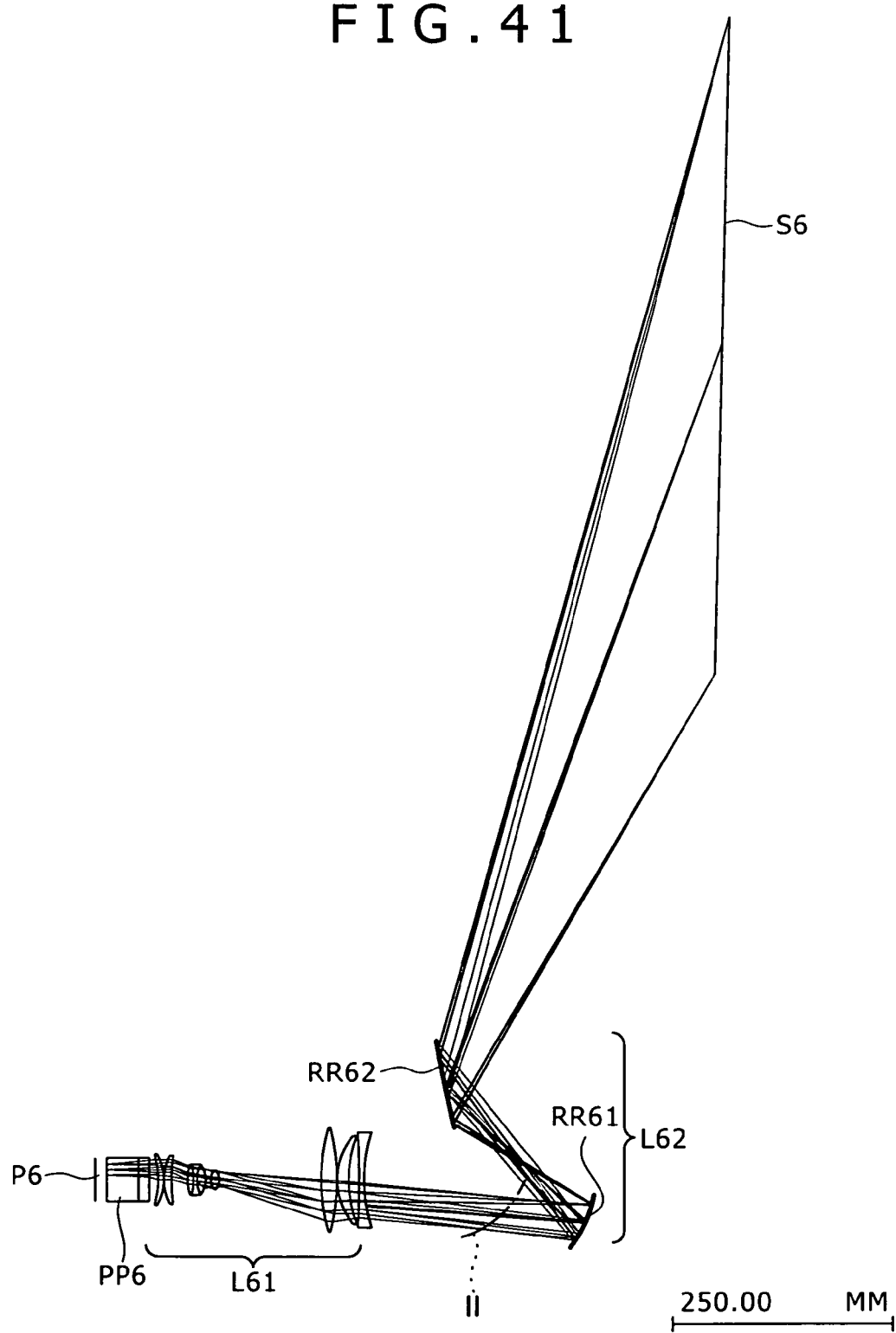
FIG. 41, as well as FIGS. 42 through 45, shows a sixth embodiment and outlines a projection optical system used for a projection-type image display apparatus.
Figure 42:
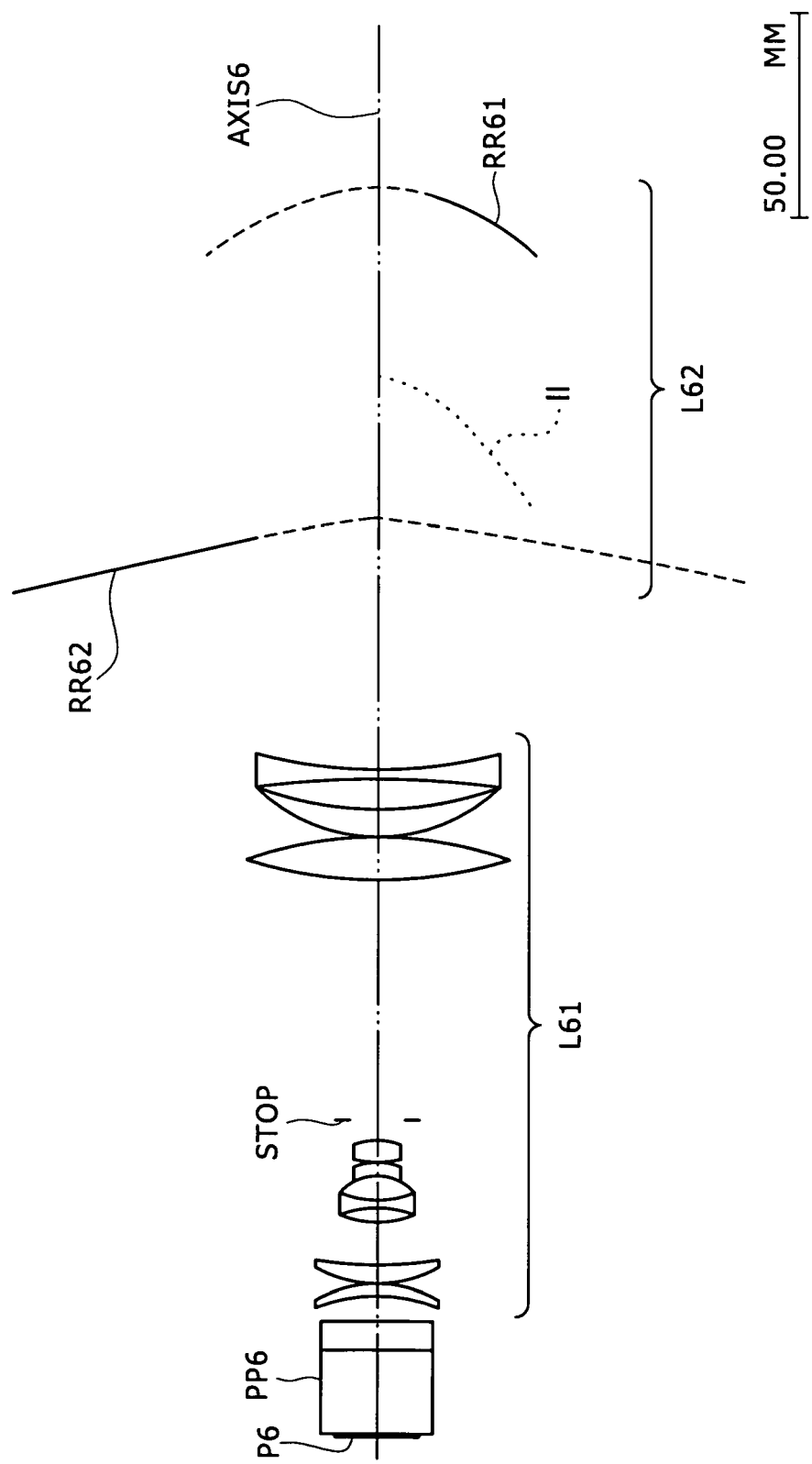
FIG. 42 is an enlarged view of the projection optical system.

FIG. 41 outlines the entire optical system of a projector (projection-type image display apparatus) using the projection optical system according to a sixth embodiment of the invention. FIG. 42 shows an enlarged view of the projection optical system.

In the diagram illustrating the sixth embodiment, P6 denotes an image display element. The image display element P6 forms the primary image surface. The image display element P6 can represent a reflective dot-matrix liquid crystal panel, a digital micro mirror device (DMD), and the like. In the diagram, PP6 denotes a polarizing beam splitter (PBS), a dichroic prism, a TIR (Total Internal Reflector) prism, and the like. STOP denotes a diaphragm. While the projector needs an illumination optical system to illuminate the image display element P6, the illumination optical system is omitted from FIGS. 41 and 42.

L61 denotes a first optical system composed of a refracting optical element. L62 denotes a second optical system composed of reflectors RR61 and RR62. The projection optical system is composed of the first optical system L61 and the second optical system L62 and guides the light (primary image surface) image-modulated by the image display element P6 to the screen S6 to form an image (secondary image surface) on the screen S6. The first optical system L61 forms an intermediate image at position II in FIGS. 41 and 42. The image is then reflected on reflectors RR61 and RR62 to form a pupil image that is then formed on the screen S6. In this case, RR61 denotes a concave reflector and RR62 denotes a convex reflector toward the secondary image surface in the order of a light beam path from the image display element P6. As shown in FIG. 42, the respective optical surfaces of the projection optical system are rotationally symmetric about an optical axis AXIS6. In FIG. 42, a broken line indicates an unused and therefore removed part of the reflectors RR61 and RR62 of the second optical system L62.

Table 7 shows data for numeric value example 6 of applying specific numeric values to the projection optical system according to the sixth embodiment.

TABLE 7

| F number | | F/3.0 | |
|---|---|---|---|
| Inch size | | 50" | |

| | Curvature radius | Interval | Glass (e-line refractive index/Abbe number) |
|---|---|---|---|
| Display element surface | INF | 1.400 | |
| 1 | INF | 27.300 | 1.51872/64.00 |
| 2 | INF | 12.000 | 1.83962/42.75 |
| 3 | INF | 8.613 | |
| 4 | −66.70934 | 4.619 | 1.76167/27.31 |
| 5 | −40.20806 | 1.466 | |
| 6 | 33.43195 | 7.449 | 1.76167/27.31 |
| 7 | 131.35118 | 14.577 | |
| 8 | 59.72796 | 5.955 | 1.48914/70.24 |
| 9 | −30.09630 | 3.000 | 1.75456/34.77 |
| 10 | 18.28717 | 0.100 | |
| 11 | 18.17450 | 7.246 | 1.48914/70.24 |
| 12 | −23.90429 | 1.977 | |
| 13 | −21.85215 | 3.000 | 1.81081/40.49 |
| 14 | −303.96553 | 0.100 | |
| 15 | 109.80180 | 7.224 | 1.48914/70.24 |
| 16 | −28.10454 | 0.100 | |
| Diaphragm | INF | 99.059 | |
| 17 | 182.80303 | 15.241 | 1.67764/31.92 |
| 18 | −135.37528 | 0.100 | |
| 19 | 64.12991 | 10.744 | 1.52033/58.69 |
| 20 | 119.23170 | 10.935 | |
| 21 | −280.88707 | 3.000 | 1.72793/37.72 |
| 22 | 114.79624 | 216.118 | |
| 23 | Aspheric surface −73.93950 | −120.000 | Reflector (first mirror) |
| 24 | Aspheric surface −69.01404 | 229.652 | Reflector (second mirror) |
| Projected image surface | | 0.000 | |

Aspheric coefficient for surface 23

K   −8.47354e−001
A4  −4.50856e−007  A6  −5.49282e−011  A8  7.19838e−015  A10  −3.75857e−019

Aspheric coefficient for surface 24

K   −1.43979e+001
A4  3.27859e−008  A6  −1.83925e−012  A8  5.76078e−017  A10  −7.70233e−022

According to numeric value example 6, the image display element P6 represents a liquid crystal device such as reflective dot matrix liquid crystal and is designed to be telecentric. The image display element P6 has an aspect ratio of 16:9, contains 1920×1080 pixels, and sizes to 0.61 inches. The image display element P6 is enlarged to 50 inches for projection. The F number is 3.0. The pixel size is approximately 7 μm on the image display element P6 and approximately 0.58 mm on the screen S6.

Figure 43:
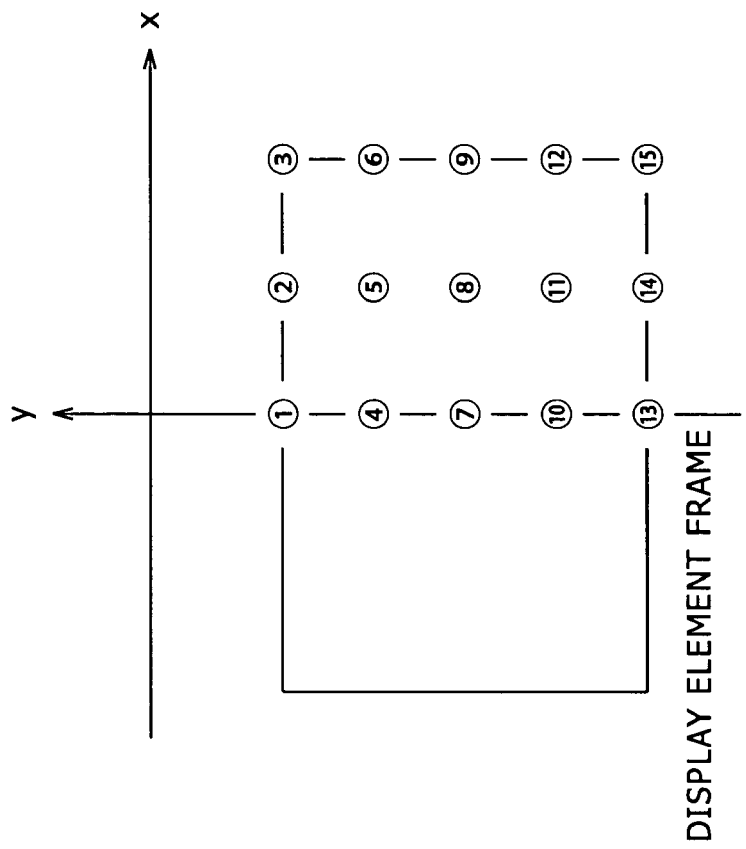
FIG. 43 shows evaluation points on an image display element.
Figure 44:
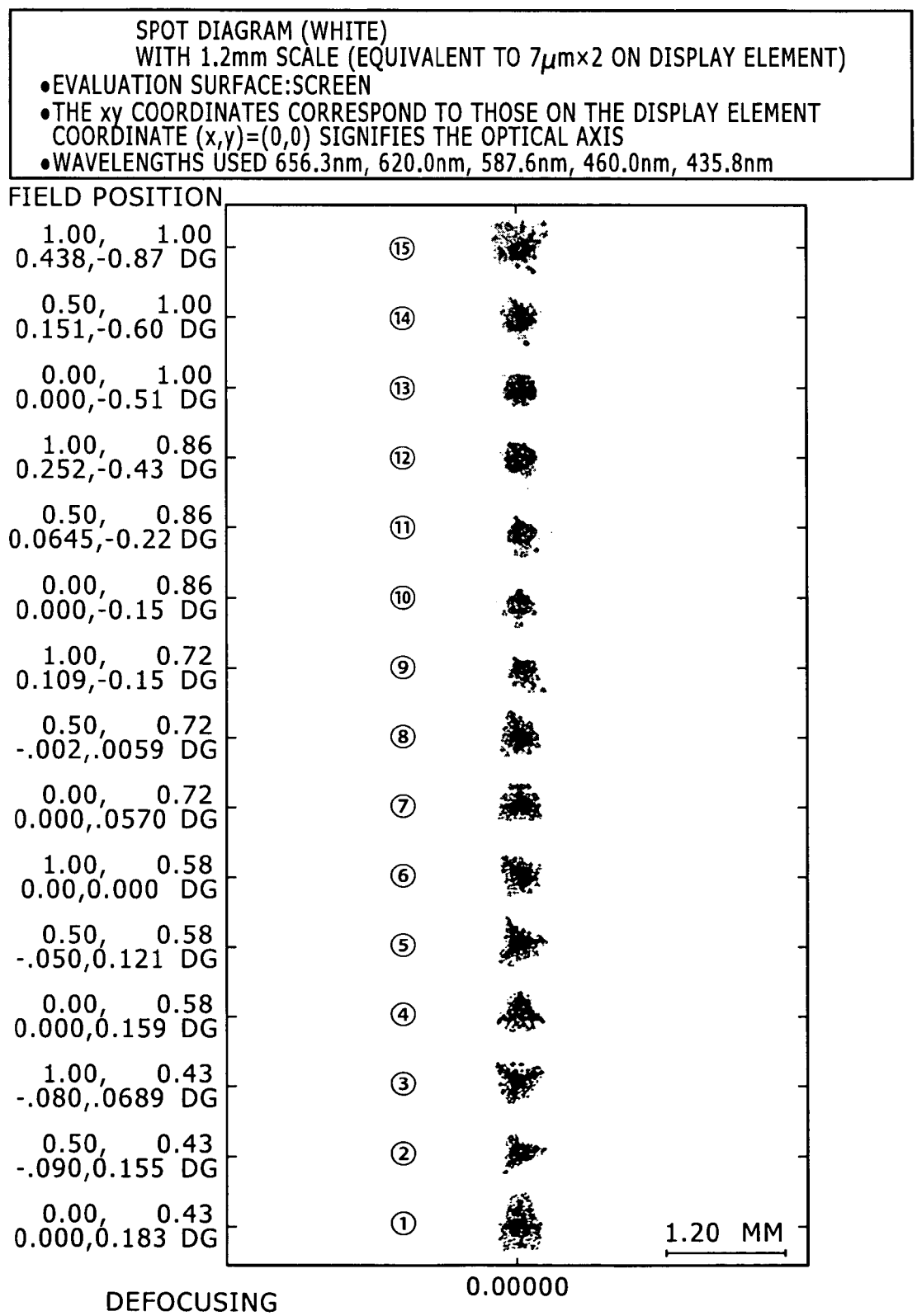
FIG. 44 is a spot diagram showing light radiated from the evaluation points shown in FIG. 43 onto a screen.
Figure 45:
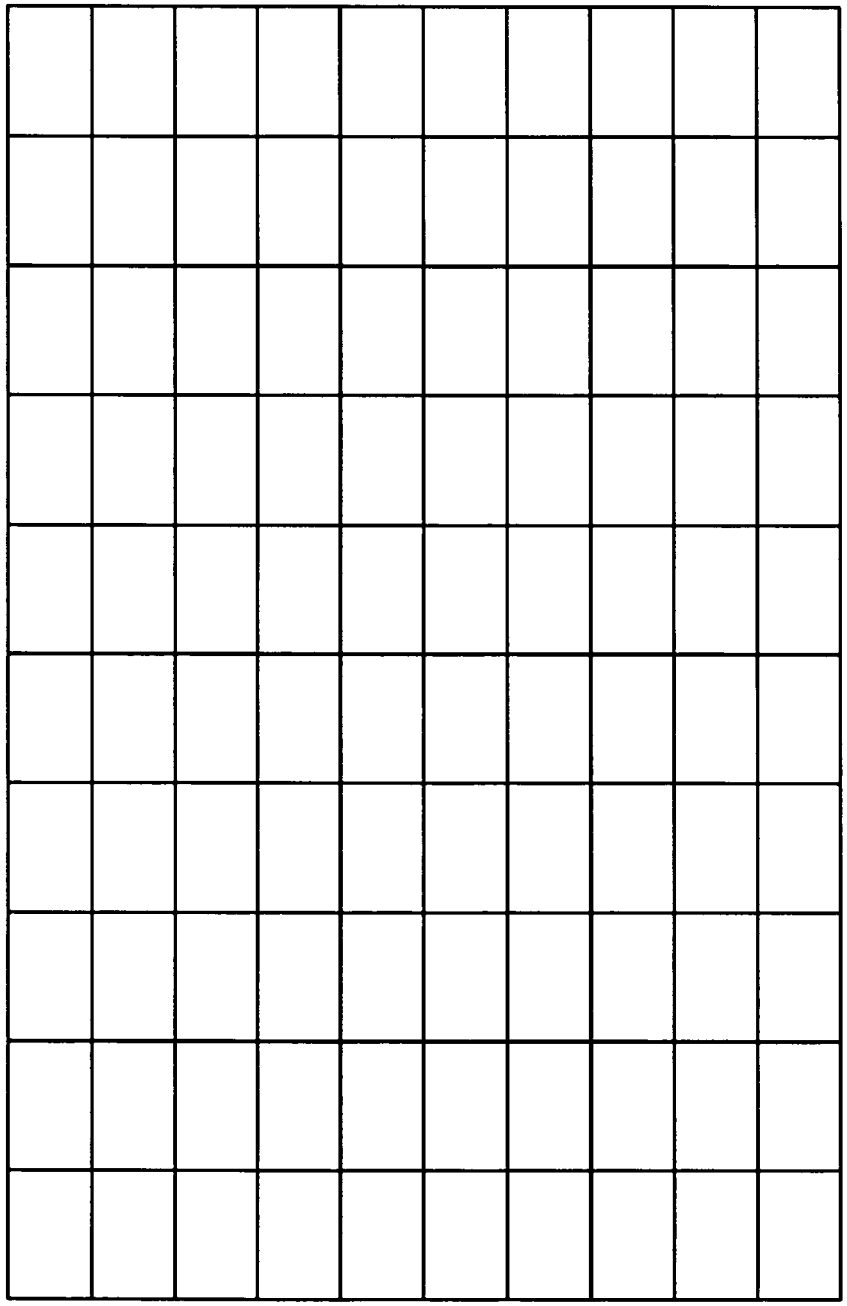
FIG. 45 shows distortion on the screen.

FIG. 44 shows a spot diagram for the projection optical system according to numeric value example 6. FIG. 45 shows distortion. Field angles (1) through (15) shown in the spot diagram are respectively generated from positions (1) through (15) on the image display element P6 shown in FIG. 43. Reference wavelengths are 656.28 nm, 620.0 nm, 587.56 nm, 546.07 nm, 460.0 nm, and 435.84 nm. The scale for FIG. 44 is twice as large as one pixel on the screen. As shown in FIG. 44, the sufficient image formation capability results. As shown in FIG. 45, no remarkable image distortion is found and the sufficient capability results.

When the projection optical system according to the sixth embodiment is applied to a projector (projection-type image display apparatus), the projection optical system can be slimed by disposing plane mirrors at appropriate positions similarly to the above-mentioned first and fourth embodiments.

SEVENTH EMBODIMENT

Figure 46:
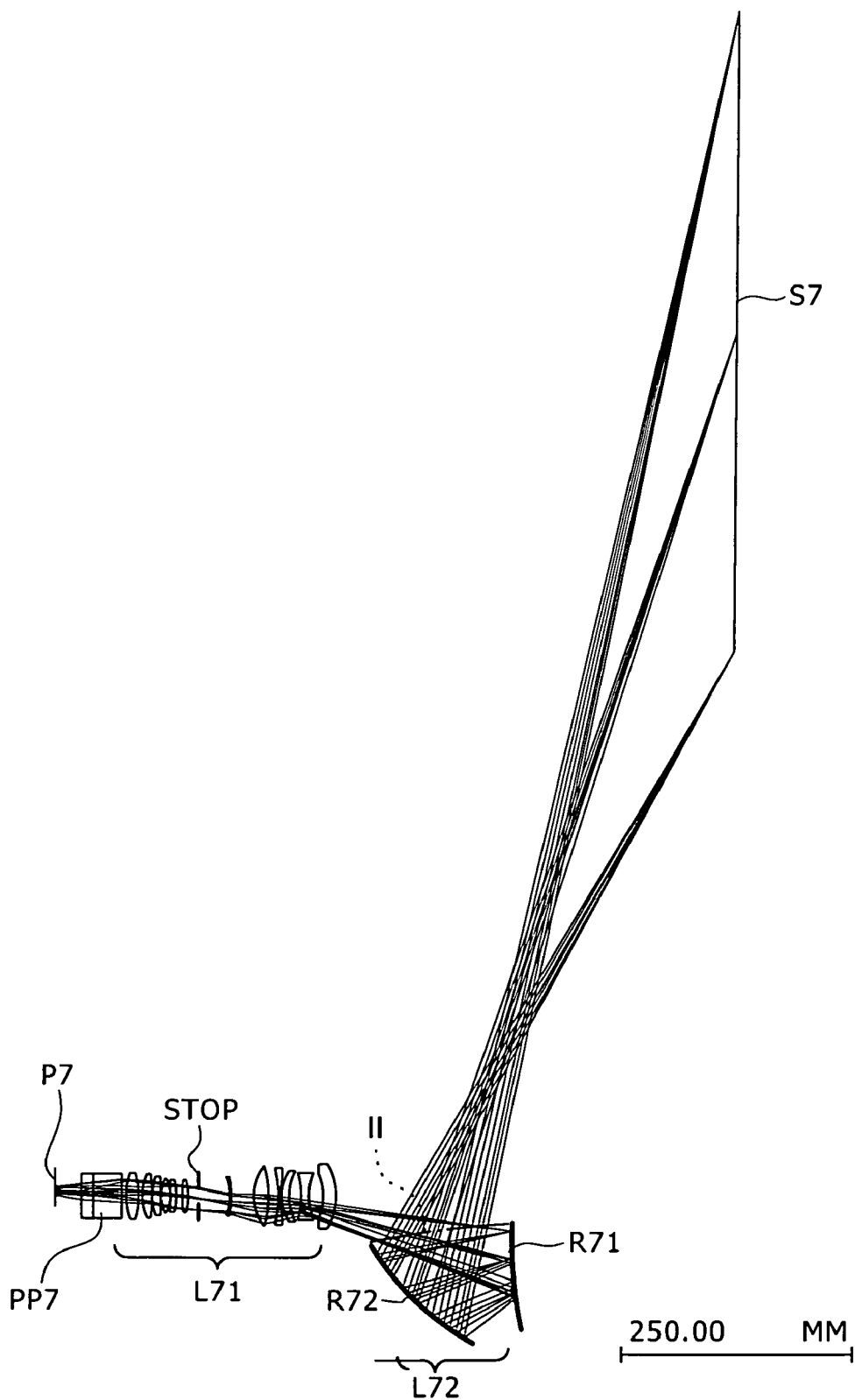
FIG. 46, as well as FIGS. 47 through 50, shows a seventh embodiment and outlines a projection optical system used for a projection-type image display apparatus.
Figure 47:
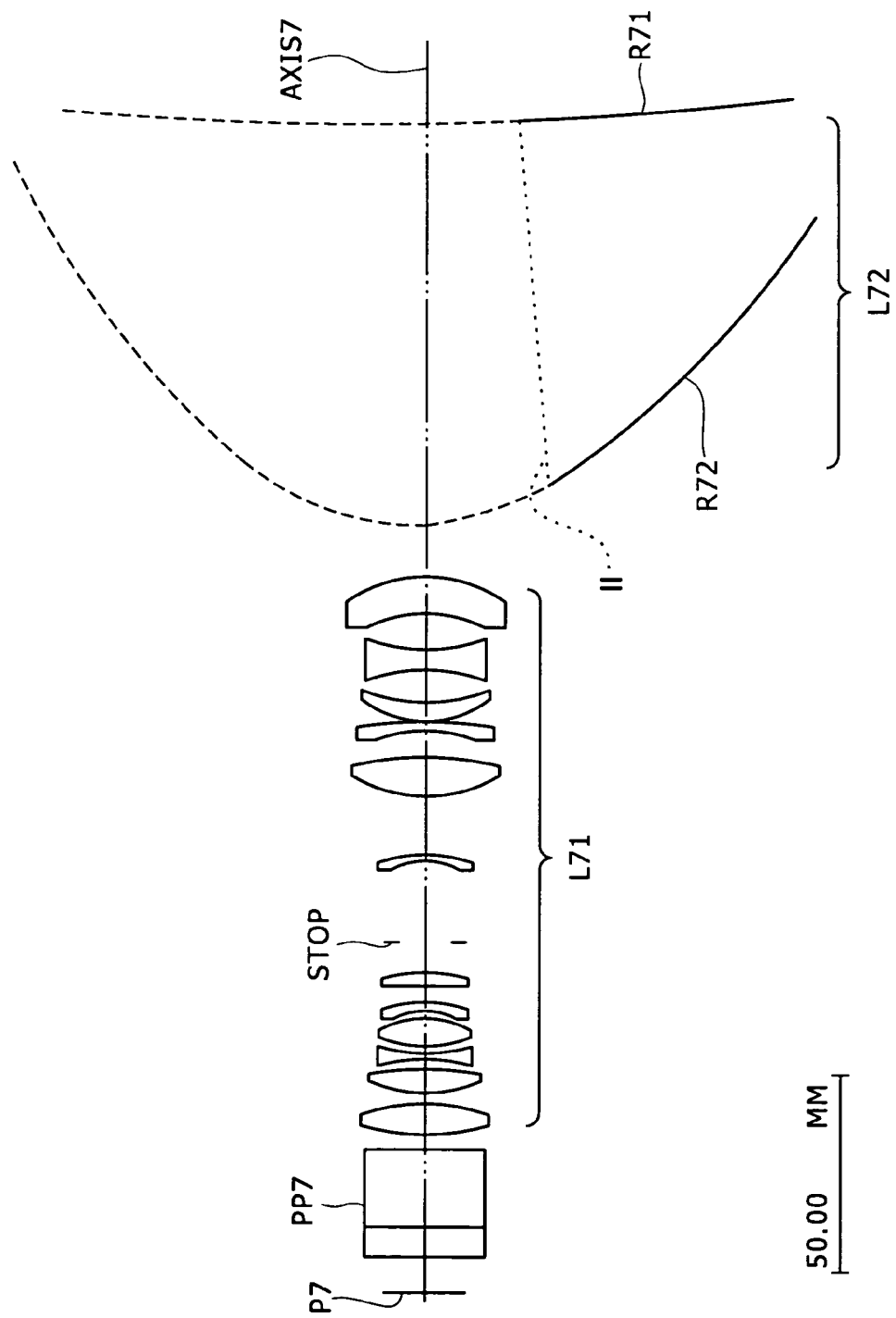
FIG. 47 is an enlarged view of the projection optical system.

FIG. 46 outlines the entire optical system of a projector (projection-type image display apparatus) using the projection optical system according to a seventh embodiment of the invention. FIG. 47 shows an enlarged view of the projection optical system.

In the diagram illustrating the seventh embodiment, P7 denotes an image display element. The image display element P7 forms the primary image surface. The image display element P7 can represent a reflective dot-matrix liquid crystal panel, a digital micro mirror device (DMD), and the like. In the diagram, PP7 denotes a polarizing beam splitter (PBS), a dichroic prism, a TIR (Total Internal Reflector) prism, and the like. STOP denotes a diaphragm. While the projector needs an illumination optical system to illuminate the image display element P7, the illumination optical system is omitted from FIGS. 46 and 47.

L71 denotes a first optical system composed of a refracting optical element. L72 denotes a second optical system composed of reflectors R71 and R72. The projection optical system is composed of the first optical system L71 and the second optical system L72 and guides the light (primary image surface) image-modulated by the image display element P7 to the screen S7 to form an image (secondary image surface) on the screen S7. The first optical system L71 forms an intermediate image at position II in FIGS. 46 and 47. The image is then reflected on reflectors R71 and R72 to form a pupil image that is then formed on the screen S7. As shown in FIG. 47, the respective optical surfaces of the projection optical system are rotationally symmetric about an optical axis AXIS7. In FIG. 47, a broken line indicates an unused and therefore removed part of the reflectors R71 and R72 of the second optical system L72.

Table 8 shows data for numeric value example 7 of applying specific numeric values to the projection optical system according to the seventh embodiment.

TABLE 8

| F number | | F/3.0 | |
|---|---|---|---|
| Inch size | | 52.5" | |

| | Curvature radius | Interval | Glass (e-line refractive index/Abbe number) |
|---|---|---|---|
| Display element surface | INF | 1.400 | |
| 1 | INF | 20.700 | |
| 2 | INF | 12.000 | 1.83962/42.8 |
| 3 | INF | 27.300 | 1.51872/64.0 |
| 4 | INF | 6.050 | |
| 5 | 59.22241 | 12.300 | 1.49845/81.2 |
| 6 | −86.13954 | 4.172 | |
| 7 | 44.25213 | 9.409 | 1.49845/81.2 |
| 8 | −96.55688 | 4.207 | |
| 9 | −50.21938 | 1.779 | 1.81184/33.0 |
| 10 | 34.23739 | 3.003 | |
| 11 | 38.84939 | 10.553 | 1.49845/81.2 |
| 12 | −33.38322 | 2.575 | |
| 13 | −35.32416 | 1.574 | 1.81184/33.0 |
| 14 | −294.59246 | 8.563 | |
| 15 | −2771.84910 | 5.043 | 1.85505/23.6 |
| 16 | −49.26150 | 10.336 | |
| Diaphragm | INF | 32.667 | |
| 17 | −31.30247 | 1.800 | 1.83962/42.8 |
| 18 | −41.95428 | 21.541 | |
| 19 | 45.68213 | 15.174 | 1.59142/61.0 |
| 20 | −179.12544 | 11.472 | |
| 21 | −84.96068 | 2.526 | 1.81263/25.3 |
| 22 | −513.97498 | 0.300 | |
| 23 | 38.82080 | 7.423 | 1.67340/46.9 |
| 24 | 55.78713 | 11.970 | |
| 25 | −68.01291 | 8.000 | 1.80831/46.3 |
| 26 | 45.75187 | 14.403 | |
| 27 | −55.92187 | 13.306 | 1.81081/40.5 |
| 28 | −48.48920 | 170.904 | |
| 29 | Aspheric surface 1.01174E−05 | −151.155 | Reflector (first mirror) |

TABLE 8-continued

| 30 | Aspheric surface | 68.49207 | 364.319 | Reflector (second mirror) |
|---|---|---|---|---|
| Projected image surface | | INF | | |

| Aspheric coefficient for surface 29 | | | | | | | |
|---|---|---|---|---|---|---|---|
| K | −28531.19104 | | | | | | |
| A4 | 0.124362E−07 | A6 | 0.196046E−11 | A8 | −0.206541E−15 | A10 | 0.103413E−19 |
| A12 | −0.290651E−24 | A14 | 0.357592E−29 | | | | |

| Aspheric coefficient for surface 30 | | | | | | | |
|---|---|---|---|---|---|---|---|
| K | −2.4470 | | | | | | |
| A1 | −1.1474E−02 | A3 | 1.3489E−06 | A4 | 1.1430E−07 | A5 | 1.8548E−11 |
| A6 | −6.0609E−12 | A8 | 2.8004E−16 | A10 | −6.6302E−21 | A12 | 6.8785E−26 |
| A14 | 4.6396E−31 | | | | | | |

According to numeric value example 7, the 30th surface, i.e., a concave reflector R72 contains an aspheric coefficient of odd-numbered degree. Therefore, the above-mentioned equation 2 defines the shape of the 30th surface.

According to numeric value example 7, the image display element P7 has an aspect ratio of 16:9, contains 1920×1080 pixels, and sizes to 0.61 inches. The image display element P7 is enlarged to 52.5 inches for projection. The F number is 3.0. The pixel size is approximately 7 μm on the image display element and approximately 0.605 mm on the screen S7.

Figure 48:
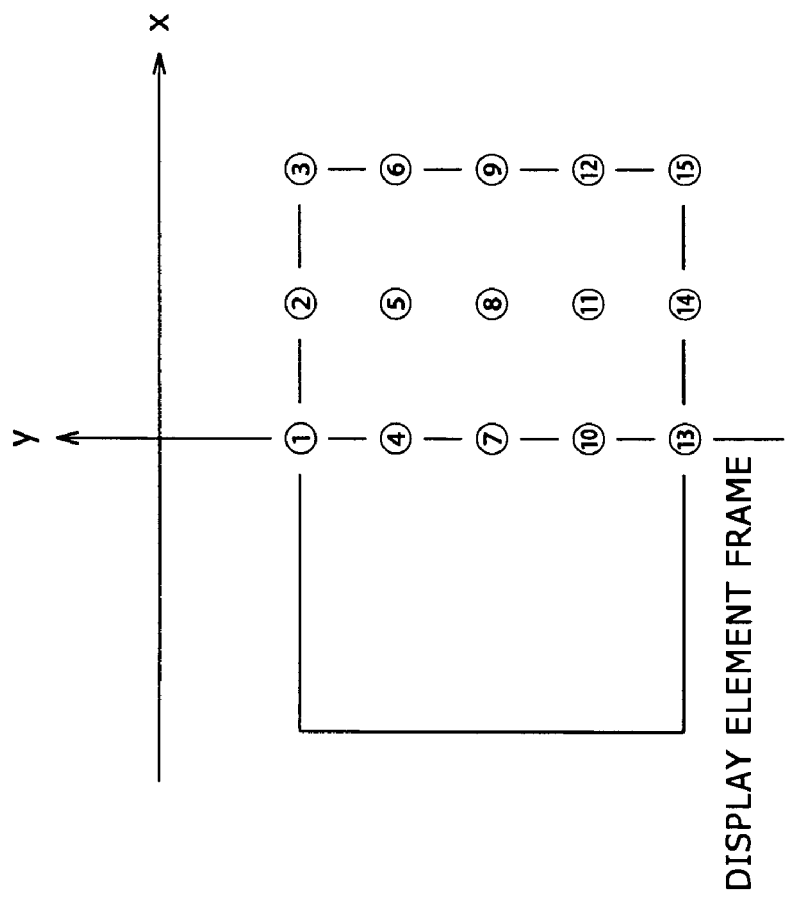
FIG. 48 shows evaluation points on an image display element.
Figure 49:
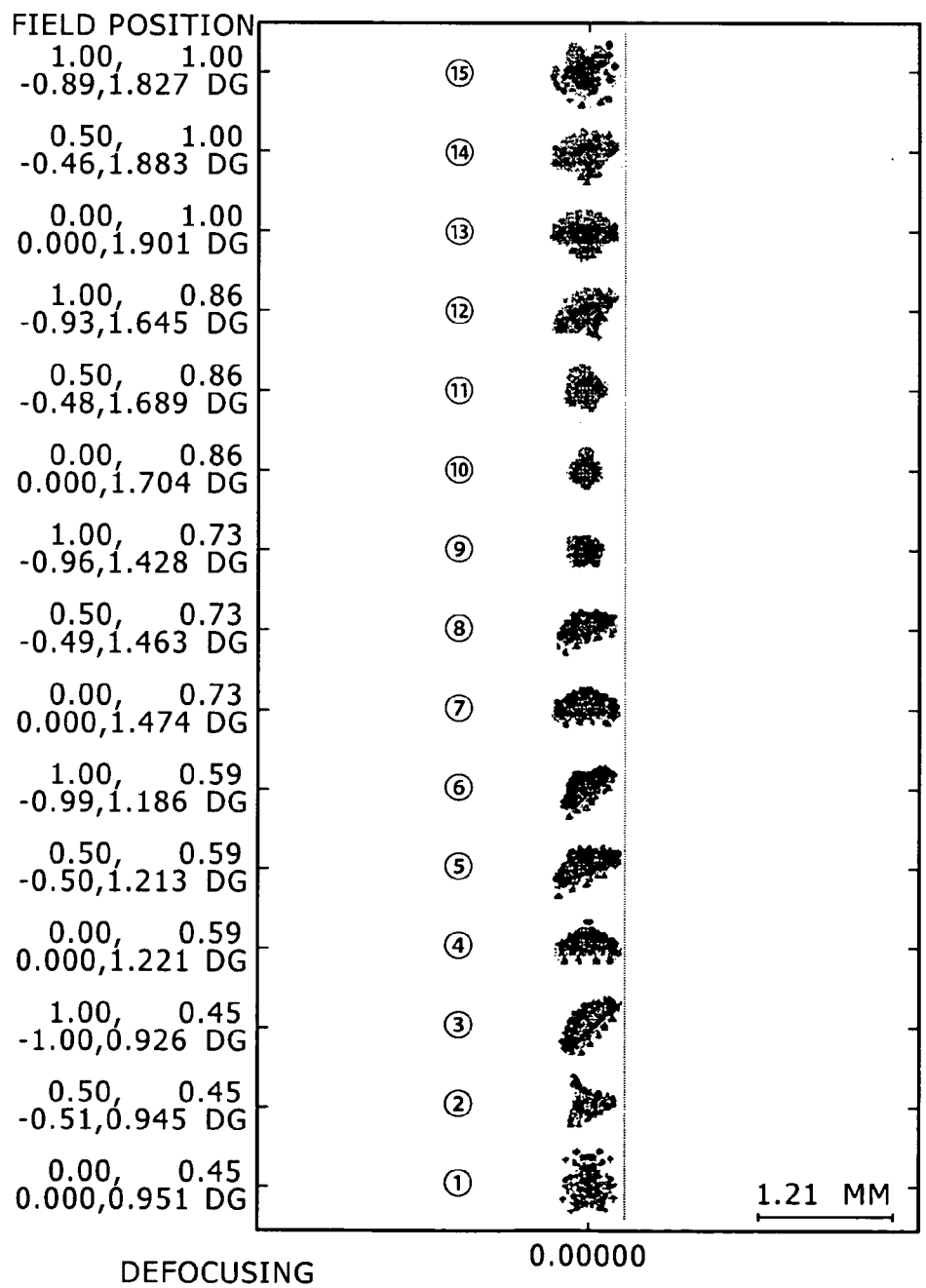
FIG. 49 is a spot diagram showing light radiated from the evaluation points shown in FIG. 48 onto a screen.
Figure 50:
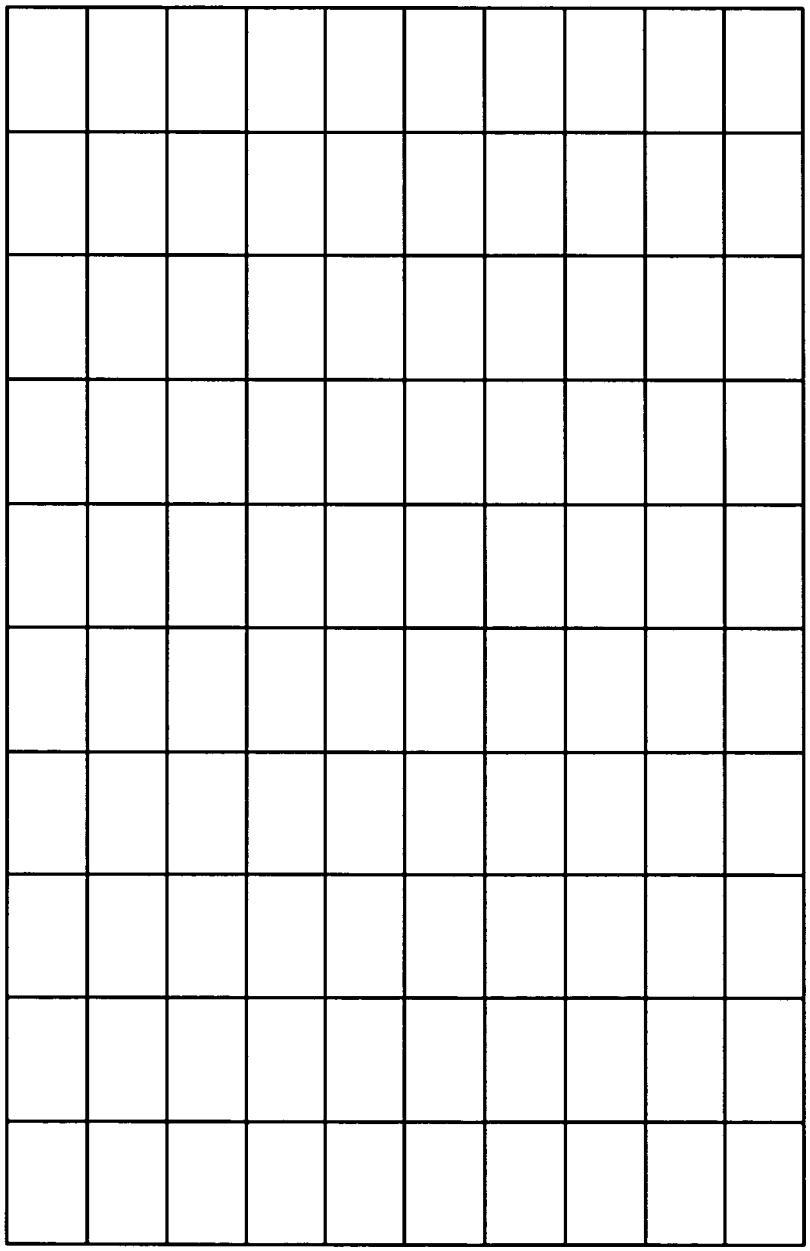
FIG. 50 shows distortion on the screen.

FIG. 49 shows a spot diagram for the projection optical system according to numeric value example 7. FIG. 50 shows distortion. Field angles (1) through (15) shown in the spot diagram are respectively generated from positions (1) through (15) on the image display element P7 shown in FIG. 48. Reference wavelengths are 656.28 nm, 620.0 nm, 587.56 nm, 546.07 nm, 460.0 nm, and 435.84 nm. The scale for FIG. 49 is twice as large as one pixel on the screen S7. As shown in FIG. 49, the sufficient image formation capability results. As shown in FIG. 50, no remarkable image distortion is found and the sufficient capability results.

When the projection optical system according to the seventh embodiment is applied to a projector (projection-type image display apparatus), the projection optical system can be slimed by disposing plane mirrors at appropriate positions similarly to the above-mentioned first and fourth embodiments.

EIGHTH EMBODIMENT

Figure 51:
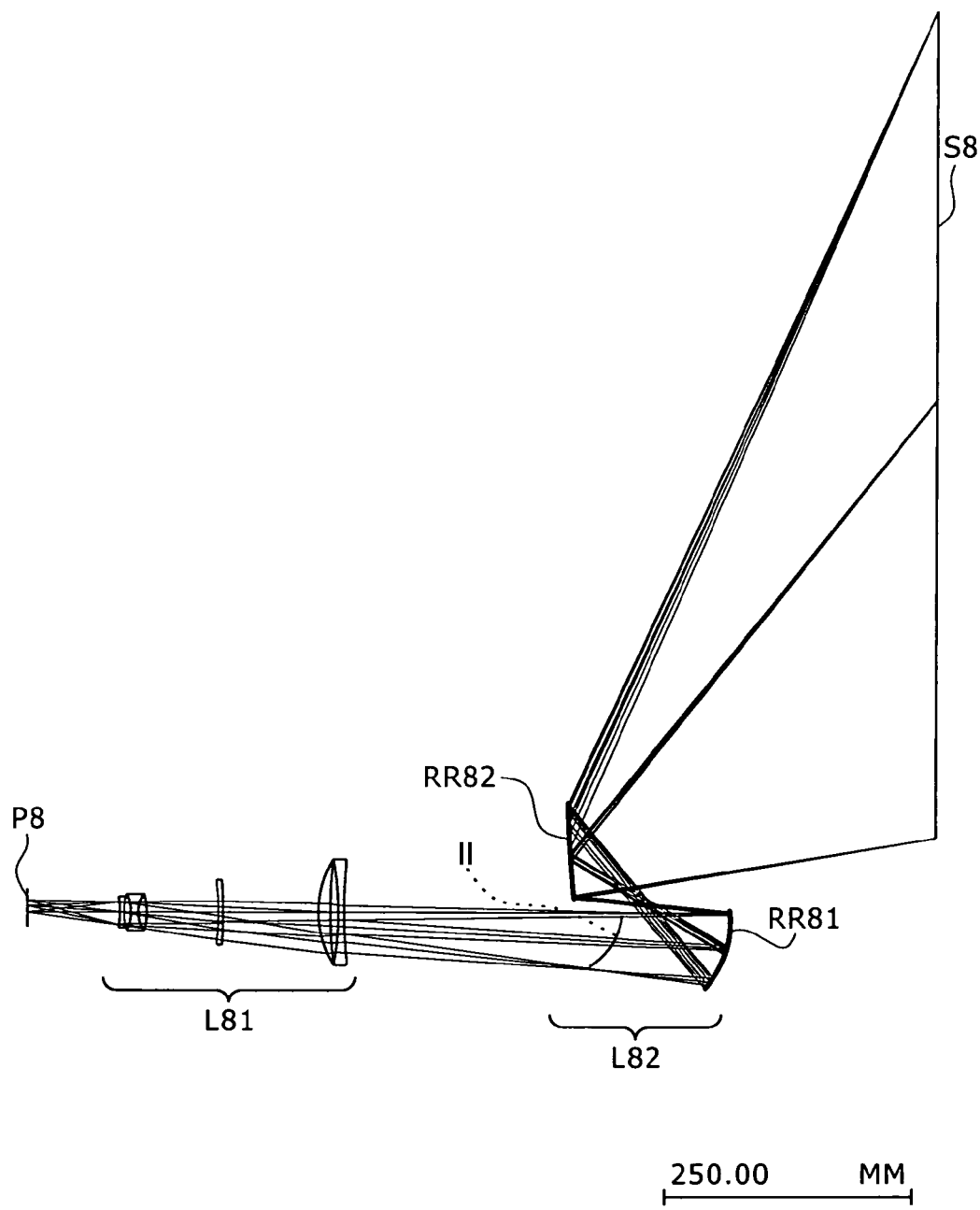
FIG. 51, as well as FIGS. 52 through 55, shows an eighth embodiment and outlines a projection optical system used for a projection-type image display apparatus.
Figure 52:
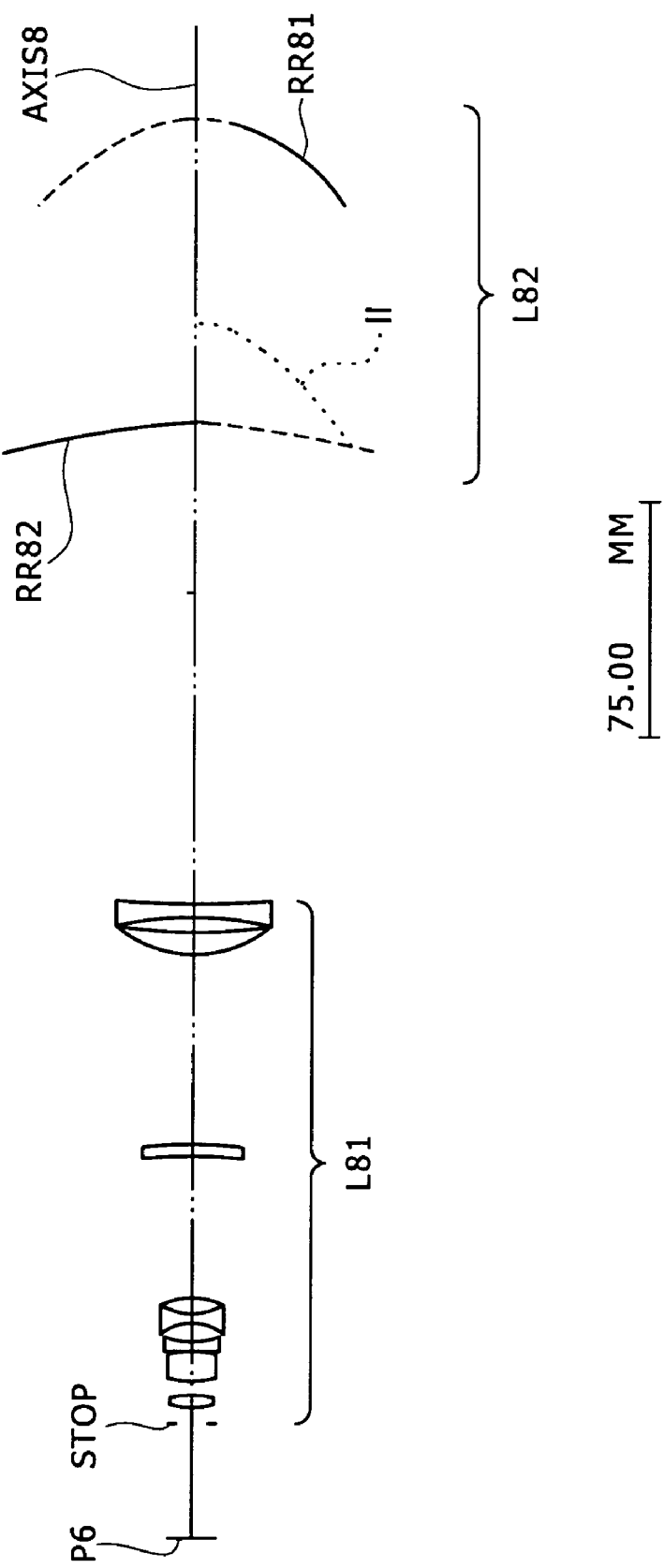
FIG. 52 is an enlarged view of the projection optical system.

FIG. 51 outlines the entire optical system of a projector (projection-type image display apparatus) using the projection optical system according to an eighth embodiment of the invention. FIG. 52 shows an enlarged view of the projection optical system.

In the diagram illustrating the eighth embodiment, P8 denotes an image display element. A primary image surface is formed on the image display element P8. The image display element P8 can represent a digital micro mirror device (DMD). While the projector needs an illumination optical system to illuminate the image display element P8, the illumination optical system is omitted from FIGS. 51 and 52.

L81 denotes a first optical system composed of a refracting optical element. L82 denotes a second optical system composed of reflectors RR81 and RR82. The projection optical system is composed of the first optical system L81 and the second optical system L82 and guides the light (primary image surface) image-modulated by the image display element P8 to the screen S8 to form an image (secondary image surface) on the screen S8. The first optical system L81 forms an intermediate image at position II in FIGS. 51 and 52. The image is then reflected on reflectors RR81 and RR82 to form a pupil image that is then formed on the screen S8. As shown in FIG. 52, the respective optical surfaces of the projection optical system are rotationally symmetric about an optical axis AXIS8. In FIG. 52, a broken line indicates an unused and therefore removed part of the reflectors RR81 and RR82 of the second optical system L82.

Table 9 shows data for numeric value example 8 of applying specific numeric values to the projection optical system according to the eighth embodiment.

TABLE 9

| F number | | F/3.0 | |
|---|---|---|---|
| Inch size | | 55.8" | |

| | Curvature radius | Interval | Glass (e-line refractive index/Abbe number) |
|---|---|---|---|
| Display element surface | INF | 54.000 | |
| Diaphragm | INF | 0.100 | |
| 1 | 71.13311578 | 3.000 | 1.76167/27.31 |
| 2 | −132.8219538 | 6.435 | |
| 3 | 87.24914913 | 9.995 | 1.76167/27.31 |
| 4 | −111.03702 | 0.100 | |
| 5 | −477.69876 | 3.000 | 1.80932/39.39 |
| 6 | 34.30104 | 1.000 | |
| 7 | 42.77973 | 6.841 | 1.56605/60.58 |
| 8 | −22.24372 | 3.000 | 1.73432/28.10 |
| 9 | 49.09361 | 0.100 | |
| 10 | 44.96886 | 5.684 | 1.48914/70.24 |
| 11 | −52.48688 | 51.478 | |

TABLE 9-continued

| | | | | |
|---|---|---|---|---|
| 12 | | −931.71066 | 5.000 | 1.76167/27.31 |
| 13 | | −302.78002 | 70.336 | |
| 14 | | 94.02440 | 7.538 | 1.76167/27.31 |
| 15 | | 298.10396 | 6.199 | |
| 16 | | −186.511621 | 5.000 | 1.74794/44.63 |
| 17 | | 1081.95709 | 285.517 | |
| 18 | Aspheric surface | −83.79108 | −110.000 | Reflector (first mirror) |
| 19 | Aspheric surface | −177.21176 | 260.000 | Reflector (second mirror) |
| Projected image surface | | INF | 1.000 | |

Aspheric coefficient for surface 18

| | | | | | | | |
|---|---|---|---|---|---|---|---|
| K | −6.03097e−001 | | | | | | |
| A4 | 2.98655e−007 | A6 | −1.62107e−011 | A8 | 1.53773e−015 | A10 | −2.42130e−020 |
| A12 | −2.52893e−024 | | | | | | |

Aspheric coefficient for surface 19

| | | | | | | | |
|---|---|---|---|---|---|---|---|
| K | −2.90510e+001 | | | | | | |
| A4 | 7.12285e−008 | A6 | −8.49805e−012 | A8 | 6.28723e−016 | A10 | −2.49940e−020 |
| A12 | 3.55011e−025 | | | | | | |

According to numeric value example 8, a DMD is used as the image display element P8 that has an aspect ratio of 16:9, contains 1280×768 pixels, and sizes to 0.7 inches. The image display element P8 is enlarged to 55.8 inches for projection. The F number is 3. The pixel size is approximately 12 μm on the image display element P8 and approximately 0.86 mm on the screen S8. A diaphragm STOP is provided between the image display element P8 and the projection optical system. ON light is reflected on the image display element P8, passes through the diaphragm STOP and the projection optical system, and then reaches the screen S8. The diaphragm STOP interrupts OFF light. The ON light passes through the diaphragm STOP and enters the refracting optical system L81 to form an intermediate image at the position II in FIGS. 51 and 52. The ON light is then reflected on the reflector RR81 to form a pupil image. The image is reflected on the reflector RR82 to be formed on the screen S8.

Figure 53:
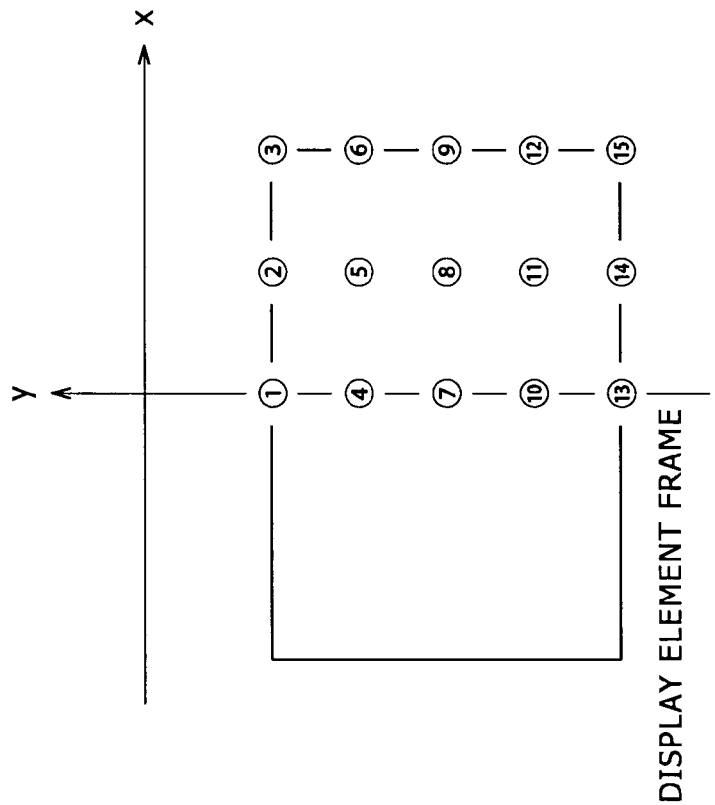
FIG. 53 shows evaluation points on an image display element.
Figure 54:
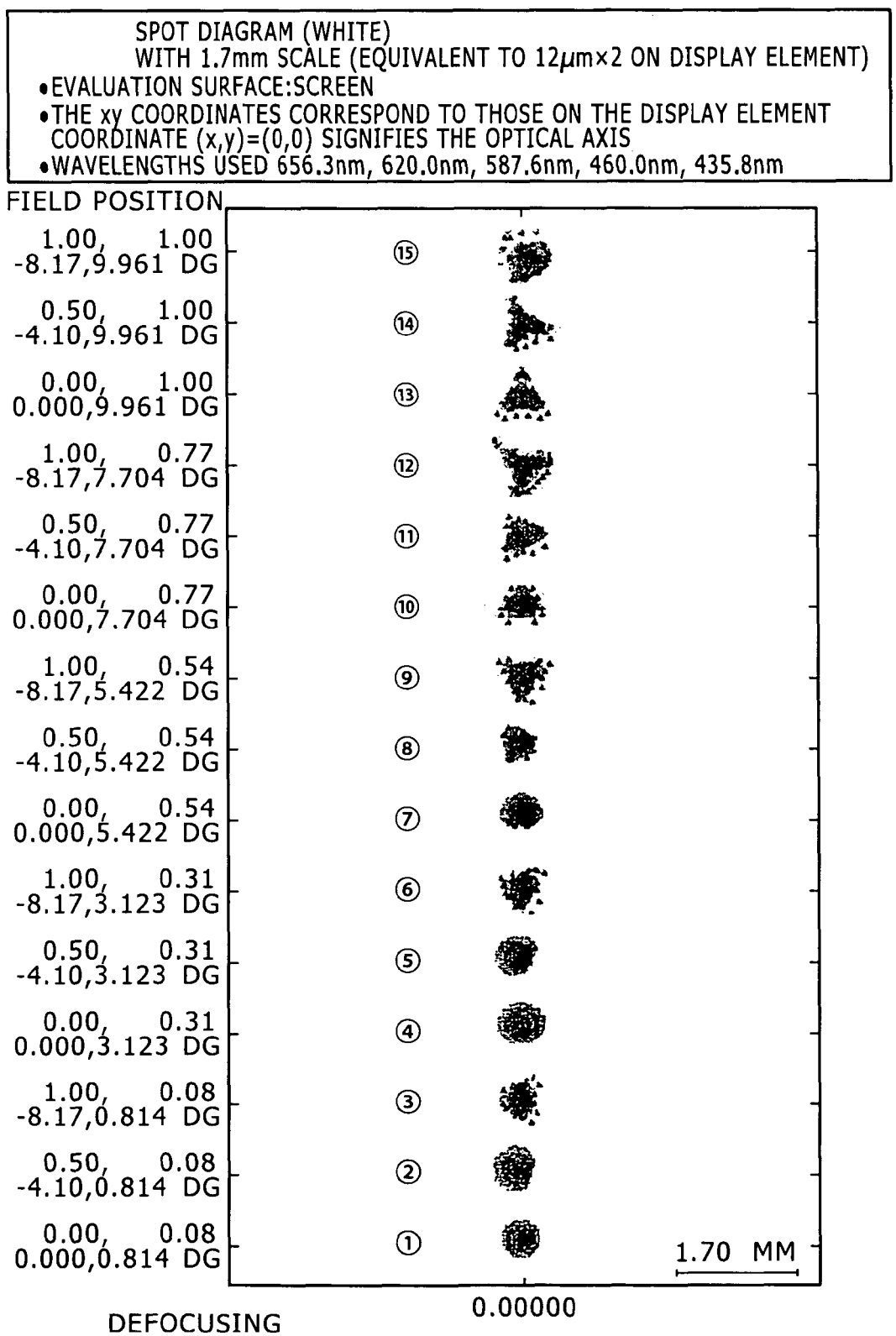
FIG. 54 is a spot diagram showing light radiated from the evaluation points shown in FIG. 53 onto a screen.
Figure 55:
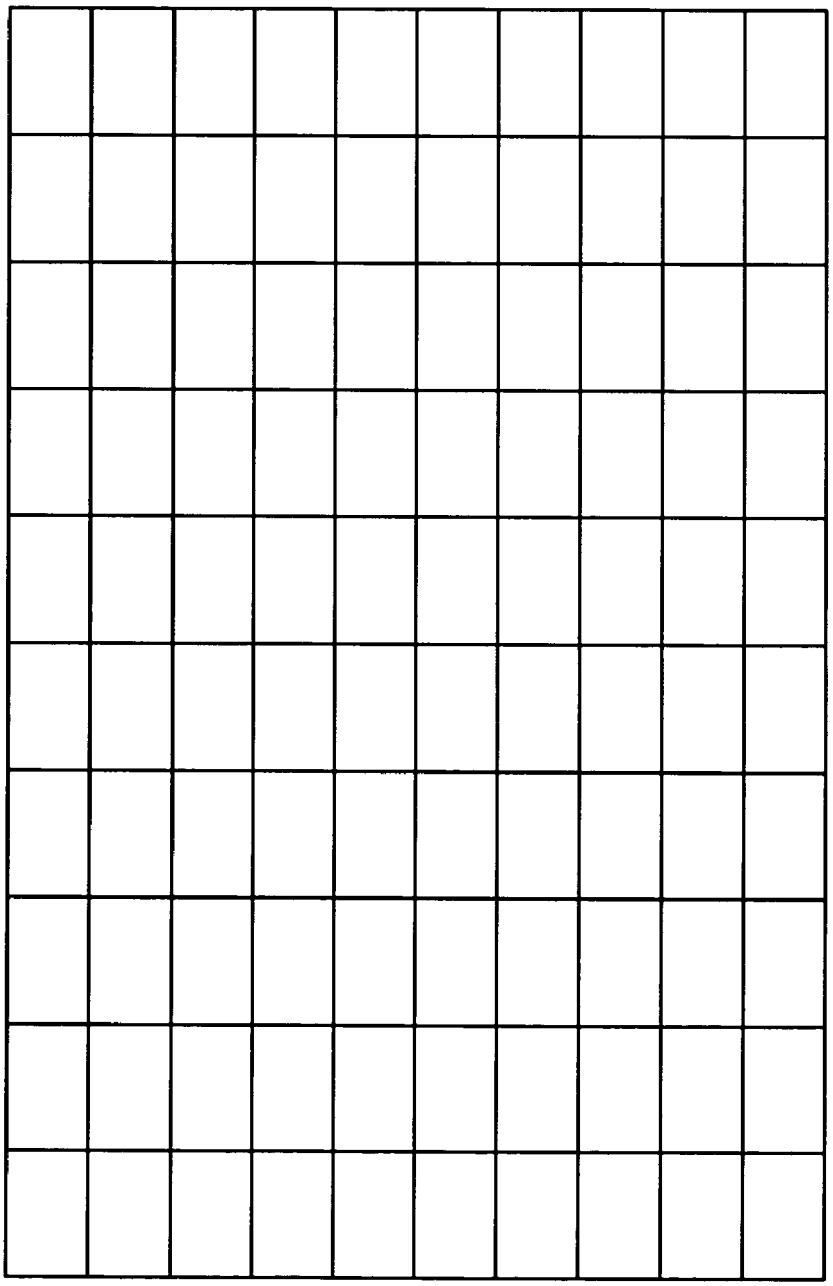
FIG. 55 shows distortion on the screen.

FIG. 54 shows a spot diagram for the projection optical system according to numeric value example 8. FIG. 55 shows distortion. Field angles (1) through (15) shown in the spot diagram are respectively generated from positions (1) through (15) on the image display element shown in FIG. 53. Reference wavelengths are 656.28 nm, 620.0 nm, 587.56 nm, 546.07 nm, 460.0 nm, and 435.84 nm. The scale for FIG. 54 is twice as large as one pixel on the screen S8. As shown in FIG. 54, the sufficient image formation capability results. As shown in FIG. 55, no remarkable image distortion is found and the sufficient capability results.

When the projection optical system according to the eighth embodiment is applied to a projector (projection-type image display apparatus), the projection optical system can be slimed by disposing plane mirrors at appropriate positions similarly to the above-mentioned first through fourth embodiments.

NINTH EMBODIMENT

Figure 56:
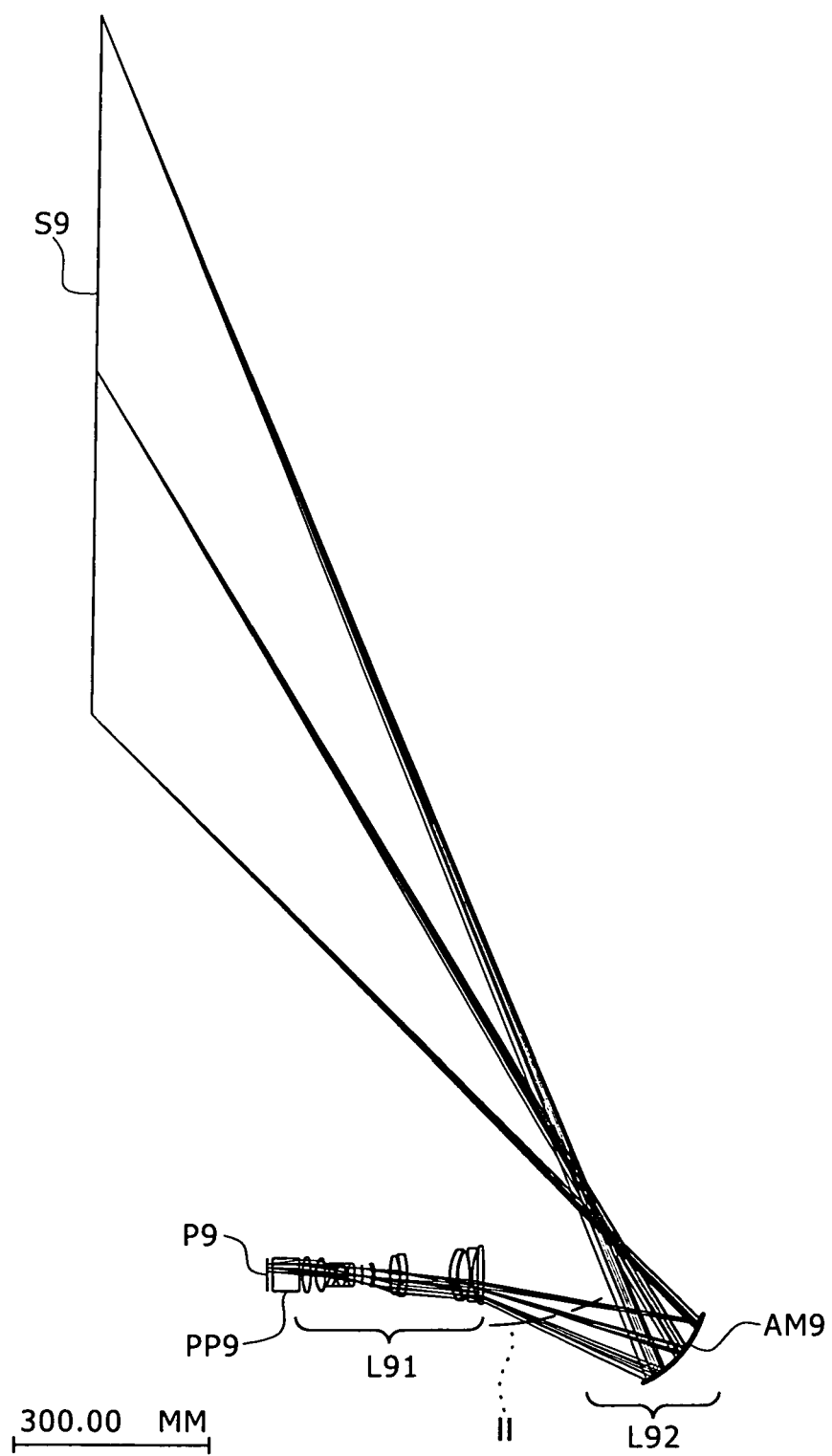
FIG. 56, as well as FIGS. 57 through 60, show a ninth embodiment and outlines a projection optical system used for a projection-type image display apparatus.
Figure 57:
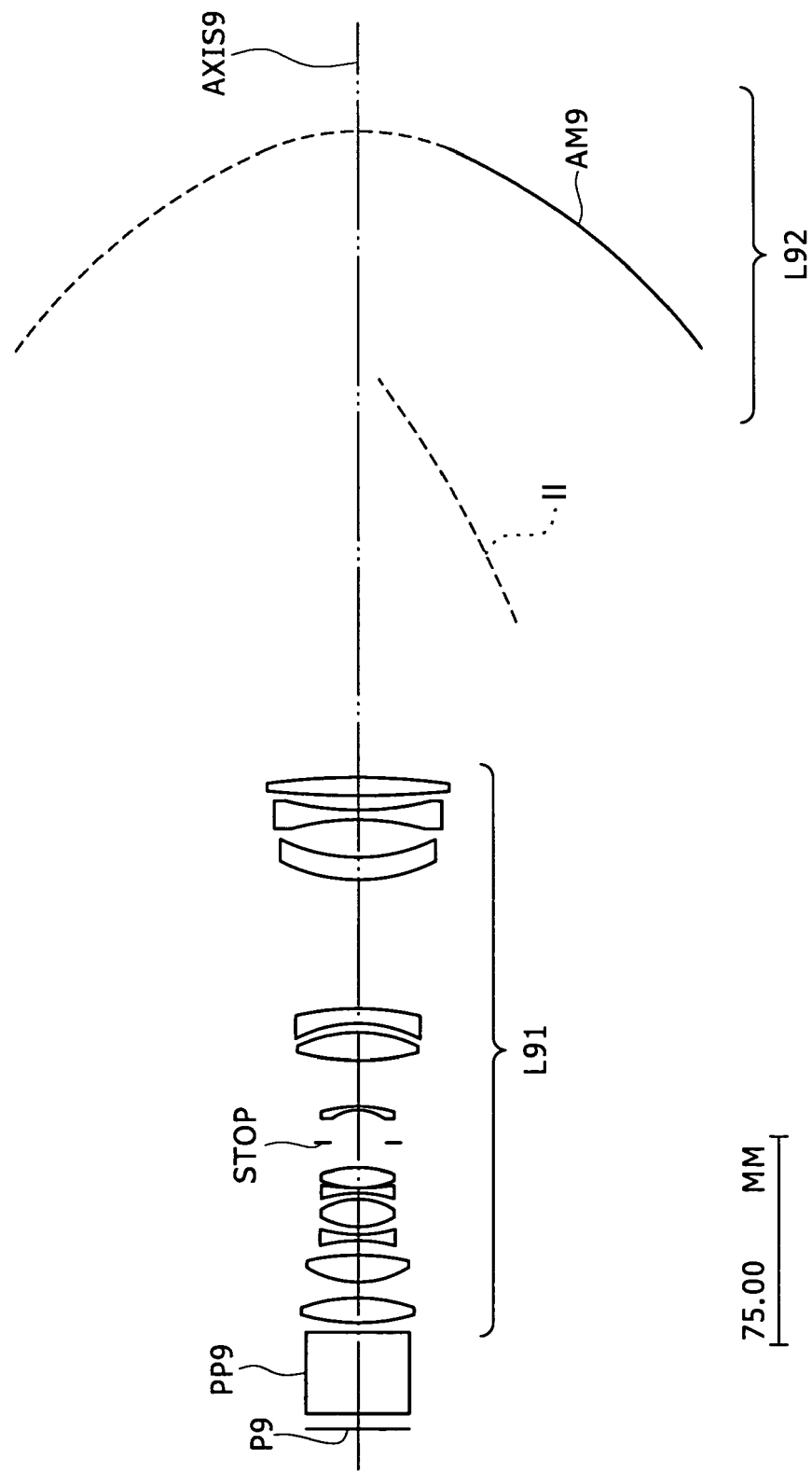
FIG. 57 is an enlarged view of the projection optical system.

FIG. 56 outlines the entire optical system of a projector (projection-type image display apparatus) using the projection optical system according to a ninth embodiment of the invention. FIG. 57 shows an enlarged view of the projection optical system.

In the diagram illustrating the ninth embodiment, P9 denotes an image display element. The image display element P9 forms the primary image surface. The image display element P9 can represent a reflective dot-matrix liquid crystal panel, a digital micro mirror device (DMD), and the like. In the diagram, PP9 denotes a polarizing beam splitter (PBS), a dichroic prism, a TIR (Total Internal Reflector) prism, and the like. STOP denotes a diaphragm. While the projector needs an illumination optical system to illuminate the image display element P9, the illumination optical system is omitted from FIGS. 56 and 57.

L91 denotes a first optical system composed of a refracting optical element. L92 denotes a second optical system composed of a reflector AM9. The projection optical system is composed of the first optical system L91 and the second optical system L92 and guides the light (primary image surface) image-modulated by the image display element P9 to the screen S9 to form an image (secondary image surface) on the screen S9. That is, the first optical system L91 forms an intermediate image at position II in FIGS. 56 and 57. The image is then reflected on a reflector AM9 to form a pupil image that is then formed on the screen S9. As shown in FIG. 57, the respective optical surfaces of the projection optical system are rotationally symmetric about an optical axis AXIS9. In FIG. 57, a broken line indicates an unused and therefore removed part of the concave reflector AM9 of the second optical system L92.

Table 10 shows data for numeric value example 9 of applying specific numeric values to the projection optical system according to the ninth embodiment.

TABLE 10

| F number | | F/3.0 | |
|---|---|---|---|
| Inch size | | 62.6" | |

| | Curvature radius | Interval | Glass (e-line refractive index/Abbe number) |
|---|---|---|---|
| Display element surface | INF | 0.900 | |
| 1 | INF | 30.000 | 1.51872/64.0 |
| 2 | INF | 5.000 | |

TABLE 10-continued

| | | | | |
|---|---|---|---|---|
| 3 | | 62.65902 | 9.402 | 1.48914/70.2 |
| 4 | | −82.6989 | 6.176 | |
| 5 | | 36.38095 | 10.475 | 1.49845/81.2 |
| 6 | | −81.168 | 6.000 | |
| 7 | | −37.1714 | 1.539 | 1.64940/31.7 |
| 8 | | 27.24078 | 3.912 | |
| 9 | | 33.08227 | 10.504 | 1.49845/81.2 |
| 10 | | −28.5041 | 2.809 | |
| 11 | | −26.4725 | 1.341 | 1.61864/34.5 |
| 12 | | 60.76307 | 1.402 | |
| 13 | | 87.88232 | 6.476 | 1.75520/27.5 |
| 14 | | −32.7878 | 9.119 | |
| Diaphragm | | INF | 13.175 | |
| 15 | | −27.9681 | 1.500 | 1.54285/47.0 |
| 16 | | −52.9861 | 18.502 | |
| 17 | | 91.05025 | 10.217 | 1.75450/51.6 |
| 18 | | −58.8245 | 3.649 | |
| 19 | | −49.6999 | 5.690 | 1.84666/23.8 |
| 20 | | −117.323 | 50.536 | |
| 21 | | 68.55467 | 8.000 | 1.48914/70.2 |
| 22 | | 46.45361 | 14.599 | |
| 23 | | −149.905 | 3.005 | 1.48914/70.2 |
| 24 | | 115.63 | 5.973 | |
| 25 | | 426.1313 | 6.000 | 1.84829/29.7 |
| 26 | | −670.278 | 250.000 | |
| 27 | Aspheric surface | −88.935 | −700.000 | Reflector (first mirror) |
| Projected image surface | | | | |

| Aspheric coefficient for surface 27 | | | | |
|---|---|---|---|---|
| K | −2.641049 | | | |
| A4 | −0.111535E−06 | A6 0.386529E−11 | A8 −0.317841E−16 | A10 −0.822479E−20 |
| A12 | 0.452284E−24 | A14 −0.631588E−29 | A16 −0.186046E−33 | A18 0.528090E−38 |

According to numeric value example 9, the image display element P9 represents a liquid crystal device such as reflective dot matrix liquid crystal and is designed to be telecentric. The image display element P9 has an aspect ratio of 16:9, contains 1920×1080 pixels, and sizes to 0.61 inches. The image display element P6 is enlarged to 62.6 inches for projection. The F number is 3.0. The pixel size is approximately 7 μm on the image display element P9 and approximately 0.725 mm on the screen.

Figure 58:
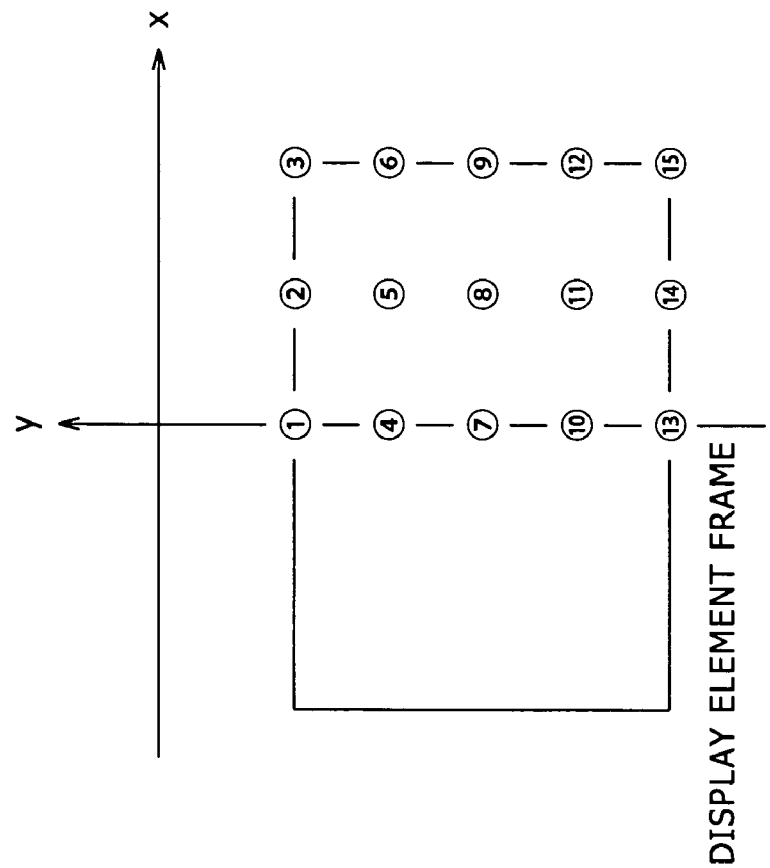
FIG. 58 shows evaluation points on an image display element.
Figure 59:
FIG. 59 is a spot diagram showing light radiated from the evaluation points shown in FIG. 58 onto a screen.
Figure 60:
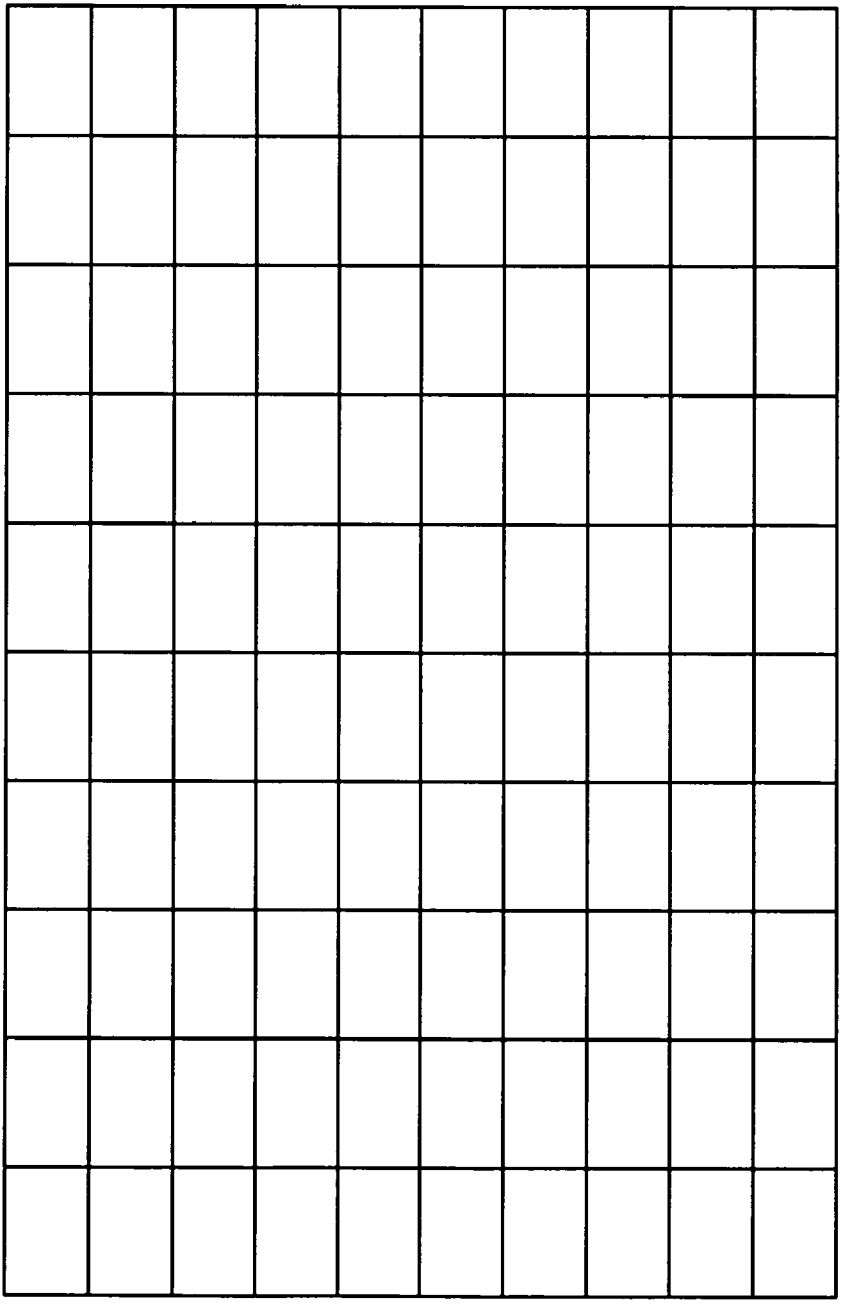
FIG. 60 shows distortion on the screen.

FIG. 59 shows a spot diagram for the projection optical system according to numeric value example 9. FIG. 60 shows distortion. Field angles (1) through (15) shown in the spot diagram are respectively generated from positions (1) through (15) on the image display element P9 shown in FIG. 58. Reference wavelengths are 656.28 nm, 620.0 nm, 587.56 nm, 546.07 nm, 460.0 nm, and 435.8.4 nm. The scale for FIG. 59 is twice as large as one pixel on the screen S9. As shown in FIG. 59, the sufficient image formation capability results. As shown in FIG. 60, no remarkable image distortion is found and the sufficient capability results.

When the projection optical system according to the ninth embodiment is applied to a projector (projection-type image display apparatus), the projection optical system can be slimed by disposing plane mirrors at appropriate positions similarly to the above-mentioned first and fourth embodiments.

Table 11 lists related data and corresponding data for conditional equations (1), (2), and (3) according to the above-mentioned numeric value examples 3 to 9.

TABLE 11

| | Numeric value example 3 | Numeric value example 4 | Numeric value example 5 | Numeric value example 6 | Numeric value example 7 | Numeric value example 8 | Numeric value example 9 | Remarks |
|---|---|---|---|---|---|---|---|---|
| Data associated with conditional equations | | | | | | | | |
| Si1 | 186 | 183 | 180 | 155 | 185 | 230 | 152 | Distance between the first optical system and the intermediate image surface (screen bottom) |
| Si2 | 106 | 112 | 100 | 139 | 103 | 211 | 99 | Distance between the first optical system and the intermediate image surface (screen center) |
| Si3 | 42 | 50 | 42 | 124 | 37 | 179 | 46 | Distance between the first optical system and the intermediate image surface (screen top) |
| Ls | 211.99 | 131.25 | 213.40 | 195.89 | 214.10 | 184.81 | 210.00 | Total lens length of the first optical system |
| R | 67.521 | 68.816 | 72.722 | 73.940 | 68.492 | 83.791 | 88.935 | Curvature radius of the concave reflector |
| K | −2.69 | −2.34 | −2.42 | −0.85 | −2.45 | −0.60 | −2.64 | Conic constant of the concave reflector |
| Data corresponding to conditional equations | | | | | | | | |
| Si1/Ls | 0.88 | 1.39 | 0.84 | 0.79 | 0.86 | 1.24 | 0.72 | Si/Ls <2 |
| Si2/Ls | 0.50 | 0.85 | 0.47 | 0.71 | 0.48 | 1.14 | 0.47 | Si/Ls <2 |
| Si3/Ls | 0.20 | 0.38 | 0.20 | 0.63 | 0.17 | 0.97 | 0.22 | Si/Ls <2 |

TABLE 11-continued

|  | Numeric value example 3 | Numeric value example 4 | Numeric value example 5 | Numeric value example 6 | Numeric value example 7 | Numeric value example 8 | Numeric value example 9 | Remarks |
|---|---|---|---|---|---|---|---|---|
| \|R\|/2 | 33.760 | 34.408 | 36.361 | 36.970 | 34.246 | 41.896 | 44.468 | S12 > \|R\|/2 SR12 > \|R\|/2 |
| S12 | 321.0 | 323.4 | 320.6 | 216.1 | 322.1 | 285.5 | 250.0 |  |
| SR12 | 149.0 | 140.0 | 149.0 | 120.0 | 151.2 | 110.0 | (–) |  |

It can be understood that the above-mentioned numeric value examples 3 to 9 all satisfy conditional equations (1), (2), and (3).

FIG. 61 shows intermediate image positions for the first optical system L41 according to the above-mentioned embodiment 4. In FIG. 61, Si1, Si2, and Si3 denote distances between the first optical system L41 and intermediate image positions corresponding to the lowest, meddle, and highest field angles on the screen, respectively. The positions correspond to points (1), (7), and (13) in FIG. 22. The distances are Si1≈183 mm, Si2≈112 mm, and Si3≈50 mm. Length Ls of the first optical system L41 is 131.25 mm and satisfies conditional equation (1). Any of numeric value examples 3 through 9 satisfy not only conditional equation (1), but also conditional equations (2) and (3) (see Table 11).

When the above-mentioned features and effects are properly used, it is possible to appropriately correct the distortion and compactly construct the projection optical system excellent in the image formation capability using a small number of reflectors.

The above-mentioned embodiments have described the projection-type image display apparatus for projection on the transmissive screen. It is obvious that the projection-type image display apparatus according to the invention is applicable as an apparatus for projection on a reflective screen.

The above-mentioned embodiments have described the first optical system and the second optical system composed of the surfaces that are rotationally symmetric about the common optical axis. In addition, the invention is also applicable to surfaces that are not rotationally symmetric.

The above-mentioned embodiments and numeric value examples have represented the specific shapes and numeric values for the components as mere examples of embodying the invention. These specifics must not cause the technical scope of the invention to be interpreted restrictively.

INDUSTRIAL APPLICABILITY

The invention can provide the projection optical system that features a small depth and height and a large enlargement factor. The projection optical system is particularly appropriately applied to a large rear projection television. In addition, the projection optical system is appropriate for enlarged projection onto a reflective screen and the like in a limited space such as a narrow room.

The invention claimed is:

1. A projection-type image display apparatus comprising:
a light source;
a modulator for modulating and outputting light radiated from the light source based on a video signal; and
a projection optical system for enlarged projection from a primary image surface toward the modulator to a secondary image surface toward a screen,
wherein the projection optical system comprises:
a first optical system that forms an intermediate image of the primary image surface; and
a second optical system having a concave reflector that forms the secondary image surface according to the intermediate image,
wherein the concave reflector is unique to the second optical system and has an unused part removed when placed to the side of the secondary image surface, and
wherein as a light beam travels from the center of the primary image surface to the center of the secondary image surface it crosses an optical axis of the first optical system, reflects on the concave reflector, crosses the optical axis again, and reaches the secondary image surface.

2. The projection-type image display apparatus according to claim 1,
wherein the first optical system and the second optical system include surfaces that are rotationally symmetric about a common optical axis.

3. The projection-type image display apparatus according to claim 1,
wherein the screen is transmissive;
wherein the screen is disposed at the front of a cabinet that contains the light source, the modulator, and the projection optical system; and
wherein the projection optical system provides enlarged projection onto the transmissive screen from its rear.

4. The projection-type image display apparatus according to claim 3,
wherein the projection optical system is provided at the bottom of the cabinet; and
wherein there is provided a plane mirror that is disposed at the top of the cabinet, reflects light output from the projection optical system, and deflect the light so as to reach the transmissive screen.

5. The projection-type image display apparatus according to claim 4,
wherein the second optical system forms a pupil for the intermediate image onto the secondary image surface outside a light flux traveling from the plane mirror to the transmissive screen surface.

6. The projection-type image display apparatus according to claim 1,
wherein as a light beam travels from the center of the primary image surface to the center of the secondary image surface it crosses the optical axis within a vertical plane; and
wherein there is provided a reflector that reflects the light beam between the first and second optical systems and deflects the light beam within a horizontal plane.

7. The projection-type image display apparatus according to any of claims 1 through 6, comprising:
at least one plane reflector for freely directing a light path reflected on the concave reflector,
wherein conditional equation (4) below is satisfied where θ is an angle formed between the screen and an outmost light beam that is directed toward the screen from a plane reflector positioned immediately before the screen and passes a position farthest from the screen:

$$0.6 > \theta > 0.05 \quad (4).$$

* * * * *